Figure 1:
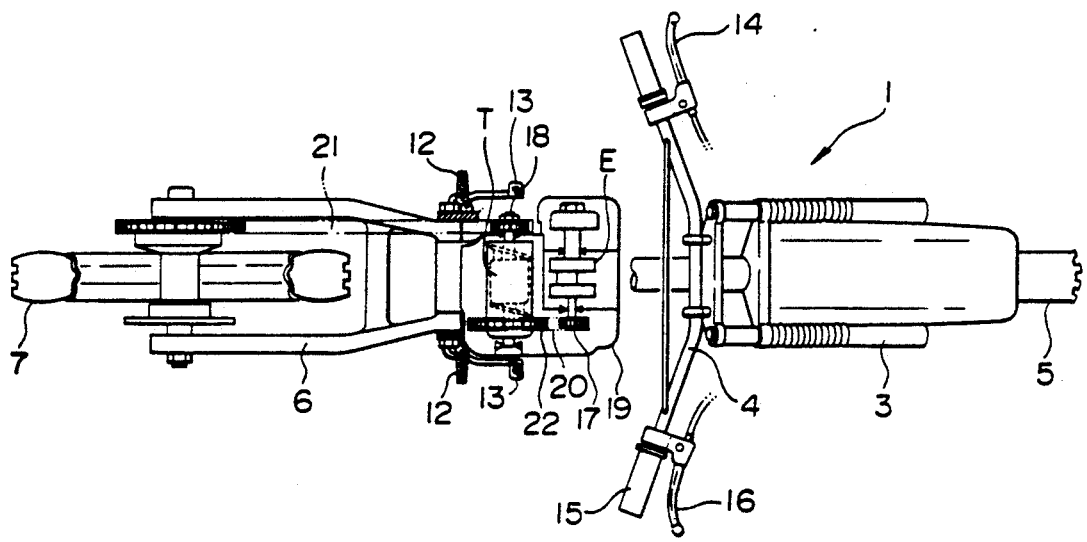

United States Patent [19]

Hayashi et al.

[11] Patent Number: 5,085,053
[45] Date of Patent: Feb. 4, 1992

[54] SWASHPLATE ASSEMBLY FOR A SWASHPLATE TYPE HYDRAULIC PRESSURE DEVICE

[75] Inventors: Tsutomu Hayashi, Tokyo; Noritaka Koga; Kiyoshi Katahira, both of Saitama; Atuo Hojo, Tokyo; Toshifumi Ito, Saitama; Mitsuru Saito, Tokyo; Yoshihiro Nakajima, Tokyo; Shinkichi Miyazawa, Tokyo; Yoshihiro Yoshida, Tokyo, all of Japan

[73] Assignee: Honda Giken Kogyo Kabushiki Kaisha, Tokyo, Japan

[21] Appl. No.: 483,277

[22] Filed: Feb. 20, 1990

Related U.S. Application Data

[63] Continuation of Ser. No. 291,441, Dec. 28, 1988, abandoned.

[30] Foreign Application Priority Data

| Dec. 28, 1987 | [JP] | Japan | 62-332442 |
| Nov. 25, 1988 | [JP] | Japan | 63-297391 |
| Nov. 25, 1988 | [JP] | Japan | 63-297392 |
| Nov. 25, 1988 | [JP] | Japan | 63-297393 |
| Nov. 25, 1988 | [JP] | Japan | 63-297394 |
| Nov. 25, 1988 | [JP] | Japan | 63-297395 |
| Nov. 25, 1988 | [JP] | Japan | 63-297396 |
| Nov. 25, 1988 | [JP] | Japan | 63-297397 |
| Nov. 25, 1988 | [JP] | Japan | 63-297398 |
| Nov. 25, 1988 | [JP] | Japan | 63-297399 |

[51] Int. Cl.$^5$ .............................................. F16D 39/00
[52] U.S. Cl. .................................... 60/488; 60/489; 60/487; 92/12.2; 92/71
[58] Field of Search .............. 92/158, 187, 12.2, 68, 92/70, 71; 91/499-506; 60/487, 488, 489; 180/305, 307

[56] References Cited

U.S. PATENT DOCUMENTS

| Re. 26,519 | 1/1969 | D'Amato . | |
| 1,263,180 | 4/1918 | Williams . | |
| 2,360,025 | 10/1944 | Wahlmark . | |
| 2,388,462 | 11/1945 | Beeh . | |
| 2,721,519 | 10/1955 | Henrichsen . | |
| 3,075,472 | 1/1963 | Garnier . | |
| 3,274,947 | 9/1966 | Jonkers et al. . | |
| 3,314,234 | 4/1967 | Orshansky, Jr. . | |
| 3,641,765 | 2/1972 | Hancock et al. | 60/53 A |
| 3,913,697 | 10/1975 | Greene | 180/14 A |

(List continued on next page.)

FOREIGN PATENT DOCUMENTS

| 475572 | 7/1951 | Canada . |
| 0206550 | 12/1986 | European Pat. Off. . |
| 0209286 | 1/1987 | European Pat. Off. . |
| 0243004 | 10/1987 | European Pat. Off. . |
| 0267752 | 5/1988 | European Pat. Off. . |

(List continued on next page.)

*Primary Examiner*—John T. Kwon
*Assistant Examiner*—Thomas Denion
*Attorney, Agent, or Firm*—Lyon & Lyon

[57] ABSTRACT

A power train for vehicles having a swashplate type continuously variable transmission having a swashplate hydraulic pump and a swashplate hydraulic motor, a transmission cylinder therebetween with a plurality of pump plunger holes and motor plunger holes formed therein. The transmission cylinder is rotatable about an axis and is coupled with the crankshaft of the engine. The pump swashplate is rotatable and disposed at an angle to the axis of the transmission cylinder and is coupled with pump plungers. A motor swashplate which is variably inclined relative to the axis of the cylinder and includes motor plungers associated with the cylinder. The swashplates have a number of spherical protruding portions which are abutted by spherical concave portions on the plungers with the concavities having a larger radius of curvature than the protruding portions with engagement varying from radially outwardly to radially inwardly of the axes of the plungers relative to the cylinder and radial forces are diametrically disposed to center the swashplate.

30 Claims, 40 Drawing Sheets

U.S. PATENT DOCUMENTS

| | | | |
|---|---|---|---|
| 4,145,883 | 3/1979 | Forster | 60/477 |
| 4,454,802 | 6/1984 | Cailliau et al. | 92/158 |
| 4,478,134 | 10/1984 | Kawahara et al. | 91/488 |
| 4,631,977 | 12/1986 | Kawashima | 74/606 A |
| 4,671,134 | 6/1987 | Kuo | 74/689 |
| 4,699,604 | 10/1987 | Yokoyama | 474/18 |
| 4,735,050 | 4/1988 | Hayashi et al. | 60/489 |
| 4,741,251 | 5/1988 | Hayashi et al. | 92/57 |
| 4,741,410 | 5/1988 | Tunmore | 180/307 |
| 4,745,748 | 5/1988 | Hayashi et al. | 60/489 |
| 4,748,898 | 6/1988 | Hayashi et al. | 92/12.2 |
| 4,781,022 | 11/1988 | Hayashi et al. | 60/489 |
| 4,827,721 | 5/1989 | Hayashi et al. | 60/489 |
| 4,862,767 | 9/1989 | Hauser | 180/305 |

FOREIGN PATENT DOCUMENTS

| | | | |
|---|---|---|---|
| 635595 | 6/1934 | Fed. Rep. of Germany | 60/487 |
| 880989 | 6/1953 | Fed. Rep. of Germany | |
| 961943 | 4/1957 | Fed. Rep. of Germany | |
| 1200135 | 9/1965 | Fed. Rep. of Germany | |
| 1289743 | 2/1969 | Fed. Rep. of Germany | |
| 1480553 | 6/1969 | Fed. Rep. of Germany | |
| 1500480 | 7/1969 | Fed. Rep. of Germany | |
| 2054586 | 5/1972 | Fed. Rep. of Germany | |
| 2202615 | 8/1973 | Fed. Rep. of Germany | 180/307 |
| 2460512 | 6/1976 | Fed. Rep. of Germany | 92/158 |
| 3125123 | 1/1983 | Fed. Rep. of Germany | |
| 3444850 | 2/1986 | Fed. Rep. of Germany | 92/158 |
| 2380439 | 10/1978 | France | |
| 57-76357 | 5/1982 | Japan | |
| 4963 | 1/1987 | Japan | |
| 62-167970 | 7/1987 | Japan | |
| 62-4963 | 10/1987 | Japan | |
| 224769 | 10/1987 | Japan | |
| 62-224770 | 10/1987 | Japan | |
| 62-273189 | 11/1987 | Japan | |
| 535555 | 4/1941 | United Kingdom | |
| 574991 | 1/1946 | United Kingdom | |
| 580543 | 9/1946 | United Kingdom | 92/158 |
| 2104976 | 3/1983 | United Kingdom | |

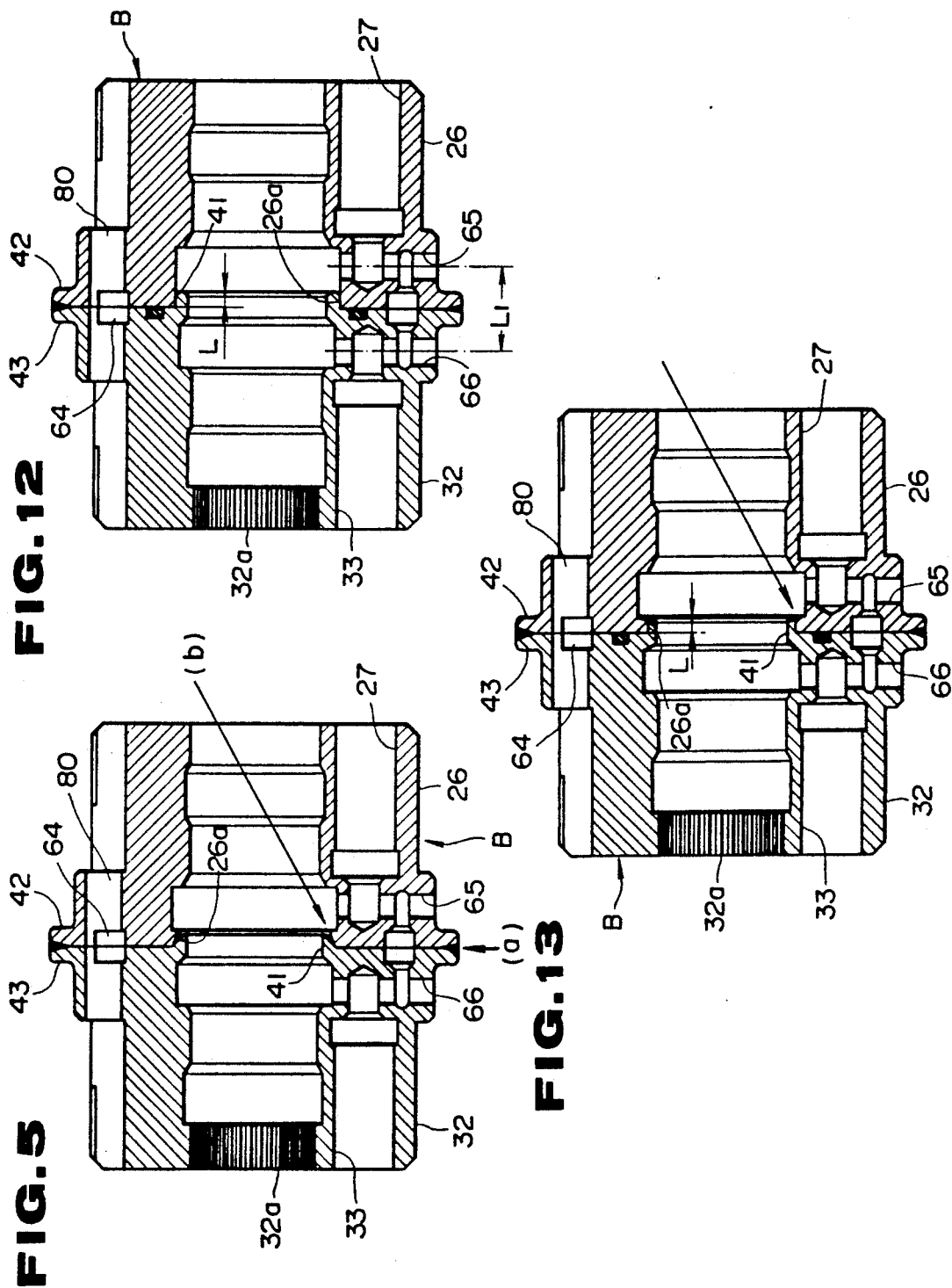

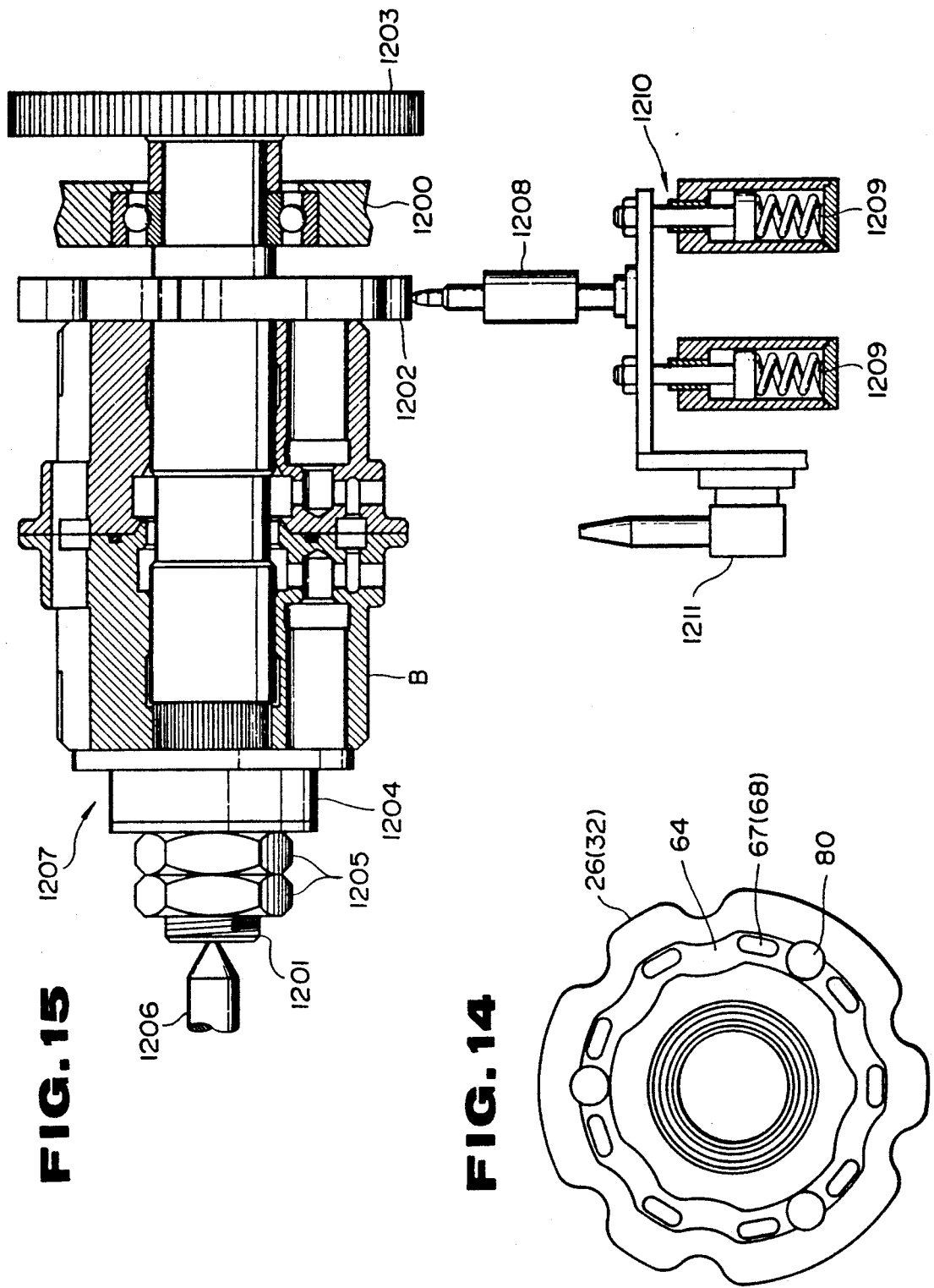

SWASHPLATE ASSEMBLY FOR A SWASHPLATE TYPE HYDRAULIC PRESSURE DEVICE

BACKGROUND OF THE INVENTION

This application is a continuation of application Ser. No. 291,441, filed Dec. 28, 1988 and now abandoned. The present invention relates to a swashplate type hydraulic pressure device applied to a hydraulic motor, and a hydraulic pump, comprising a cylinder, a number of plungers annularly disposed in the cylinder slidable in the axial direction of the cylinder and encircling the axis thereof, a swashplate holder disposed opposedly to the extreme ends of said plungers and rotatable relative to said cylinder, and a swashplate rotatably supported on the swashplate holder and being in abutment with spherical ends formed at the extreme ends of the plungers. In the case of a swashplate type hydraulic pump, oil pressure is generated by relative rotation between the cylinder and swashplate. In the case of a swashplate type hydraulic motor, reciprocating plungers respond to changes in the internal oil pressure and thereby rotate the swashplate of the hydraulic motor.

In previous hydraulic pressure devices of this kind, a spherical end of each plunger is placed in abutment with a flat surface of a swashplate or in abutment with indentations in the swashplate which conform to the plunger ends. In these conventional devices, the contact pressure between the plunger ends and the swashplate is high, and in addition, there is a large moment applied to the plungers themselves.

An example of the swashplate hydraulic system mentioned above is in the Japanese official gazette Tokukaisho 62-4963. In this example, the ends of the above mentioned plungers are formed hemispherically, and the swashplate has hemispherical concavities which conform to the shape of the plunger ends. In this system, the external force applied to the plungers has, in addition to the component which is parallel to the direction of plunger sliding, other components which are not parallel to the direction of sliding, and this large moment produces problems in the long-term operation of the device. In addition, this system which contains hemispherical concavities on the swashplate requires a relatively longer plunger and therefore increases the moment on the plunger. The presence of concavities in the swashplate also requires that the swashplate be relatively thick, in order to accommodate the concavities and maintain mechanical strength. A thick swashplate requires an upscaling of many of the components of the system, and this may sometimes be undesirable.

SUMMARY OF THE INVENTION

The present invention relates to a static hydraulic pressure type continuously variable transmission which comprises a cylinder, a number of plungers annularly disposed in the cylinder which are slidable in the axial direction of the cylinder and encircling the axis thereof, a swashplate holder disposed opposedly to the extreme ends of said plungers and rotatable relative to said cylinder, and a swashplate having hemispherically convex protuberances to conform to the ends of the plungers, said swashplate being rotatably supported on the swashplate holder and being in abutment with the hemispherically concave ends formed at the extreme ends of the plungers; and more specifically the present invention seeks to solve the problems of the large moment applied to the plungers, the excessive length of the plunger arms, and the large thickness of the swashplate. In the present invention, the plungers are reduced in length and the present invention has the two-fold effect of reducing the moment of the plunger and allowing a reduction in the overall length of the device. The hemispherical protuberances on the swashplate allow the swashplate to be made thinner than a swashplate containing concavities because the thickness of the swashplate does not have to be great in order to accommodate concavities. This thinner swashplate allows an overall reduction in the accompanying parts and thereby decreases the scale of the device.

BRIEF DESCRIPTIONS OF THE DRAWINGS

FIG. 1 S plan view of a motorcycle using a static hydraulic pressure type continuously variable transmission of the present invention.

Figure 2:
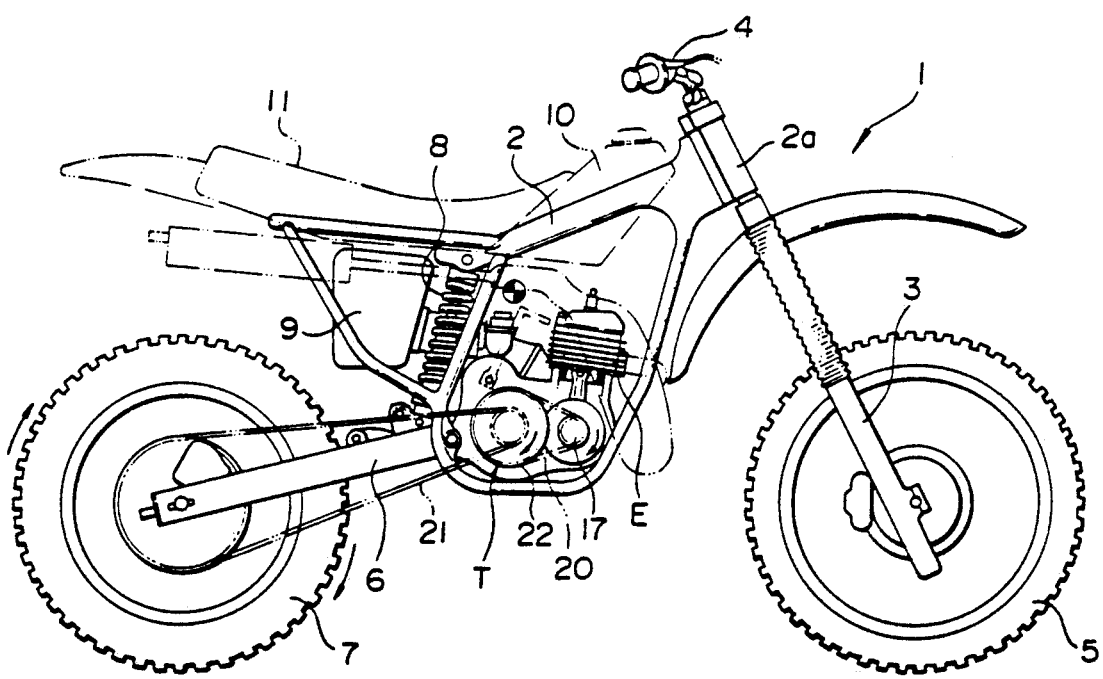

FIG. 2. A side view of the motorcycle in FIG. 1.

Figure 3:
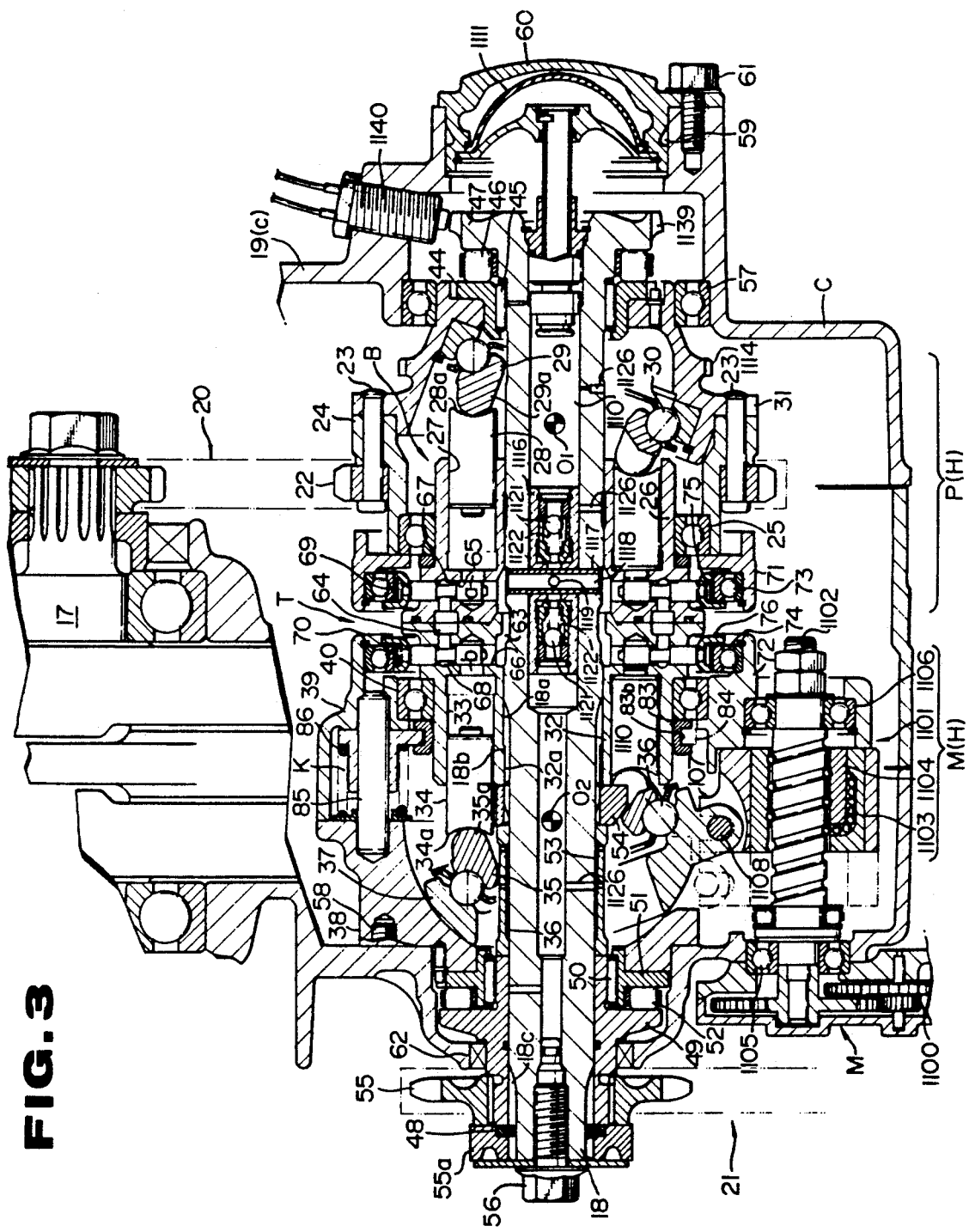

FIG. 3. A sectional view of a static hydraulic pressure type continuously variable transmission of the present invention.

Figure 4:
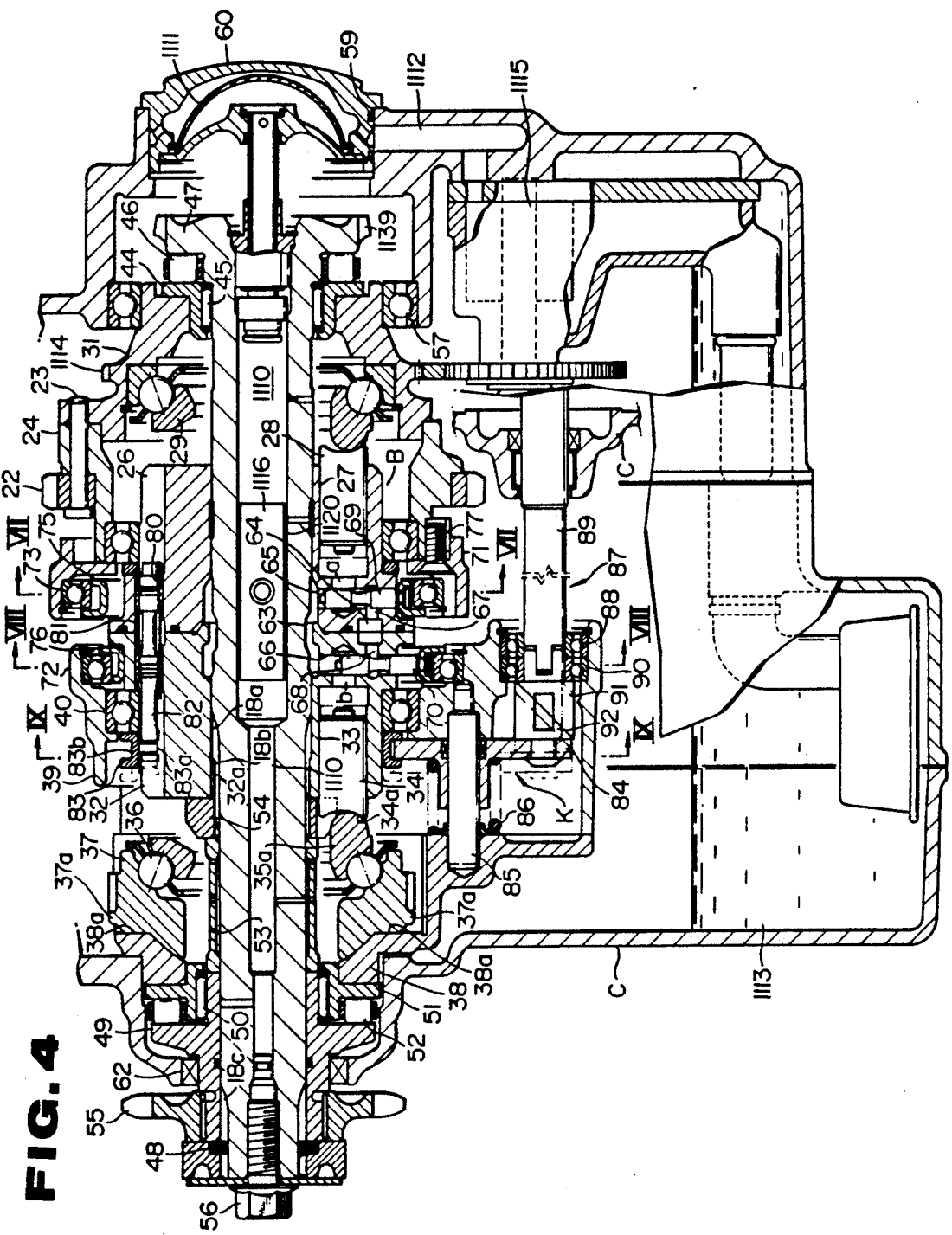

FIG. 4. A sectional side view of FIG. 3.

FIG. 5. A sectional side view of the transmission block.

Figure 6A:
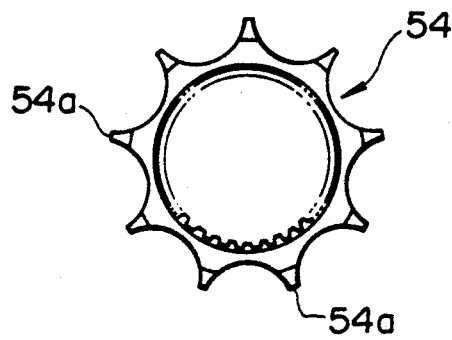

FIG. 6A. A front view of a stop ring.

Figure 6B:
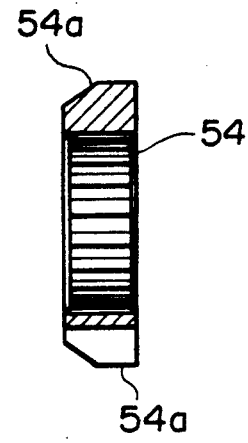

FIG. 6B. A sectional view of a holding ring.

Figure 7:
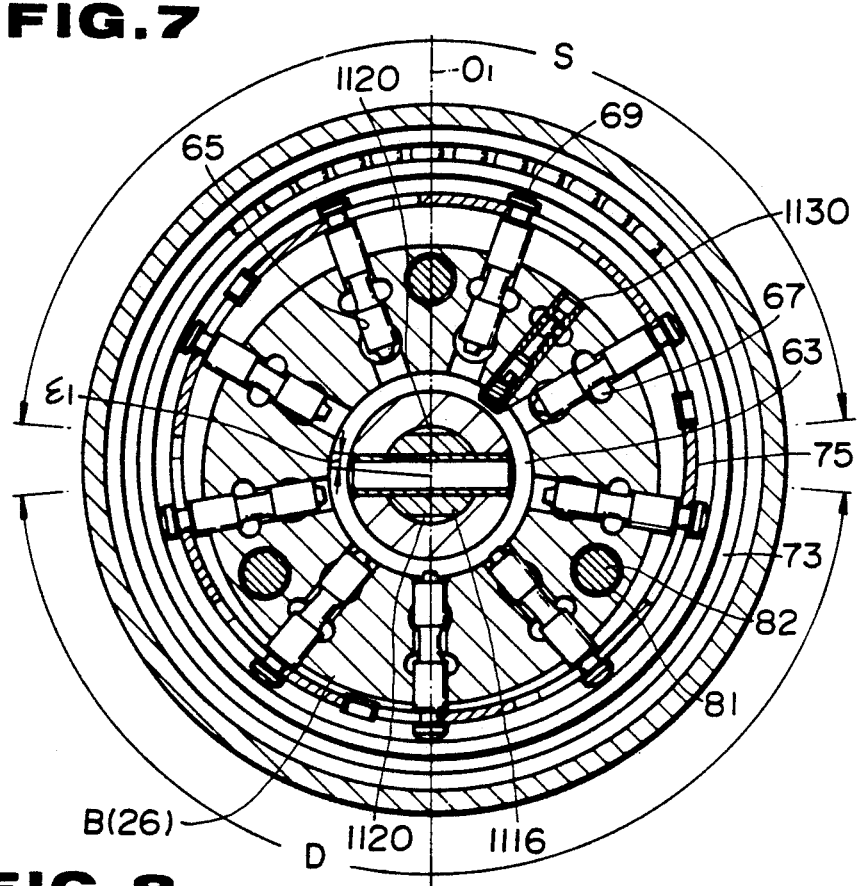

FIG. 7. A sectional view through line VII—VII in FIG. 4.

Figure 8:
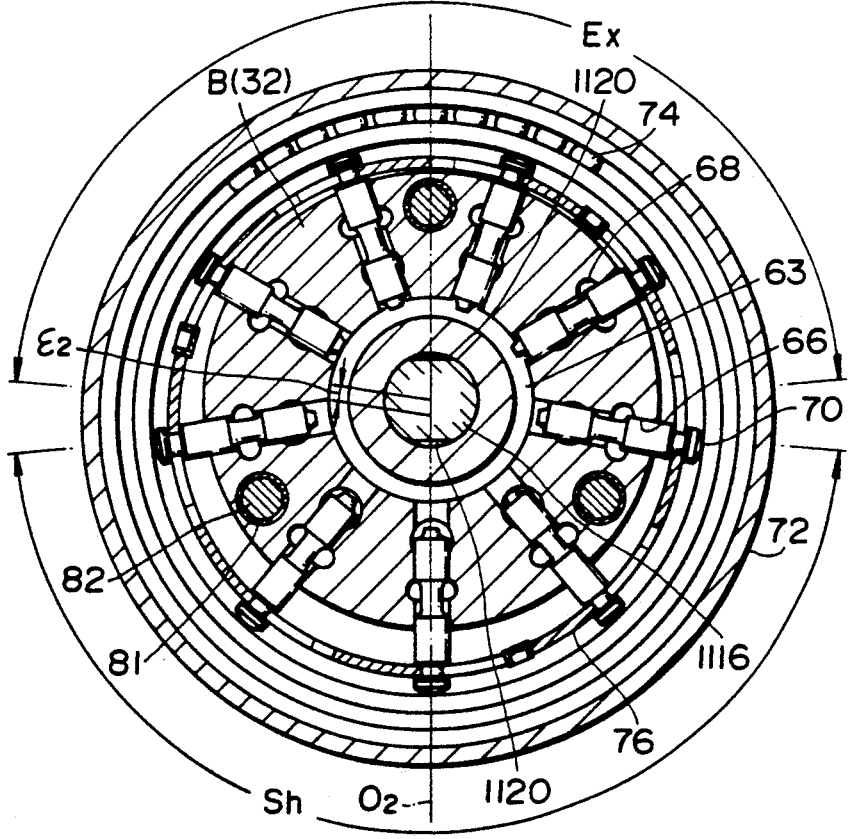

FIG. 8. A sectional view through line VIII—VIII in FIG. 4.

Figure 9:
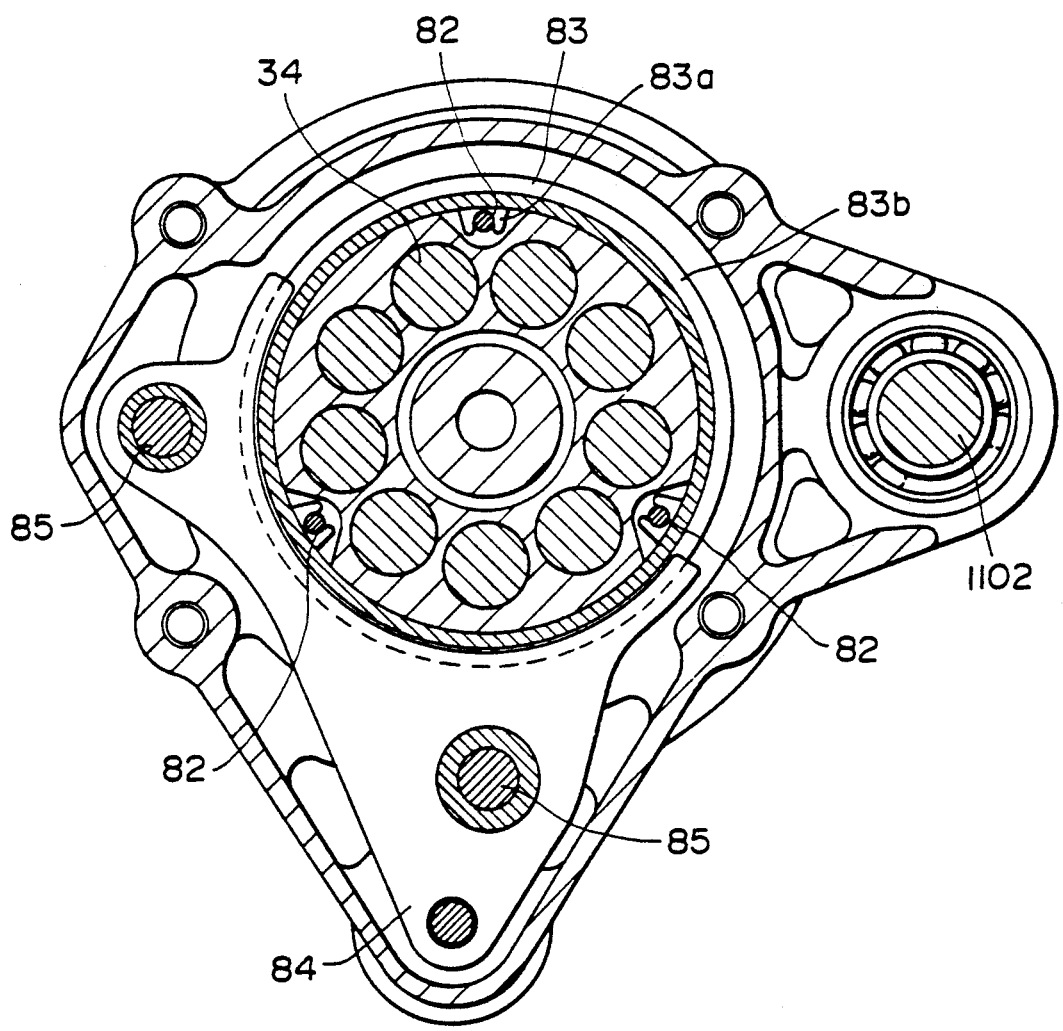

FIG. 9. A sectional view through line IX—IX in FIG. 4.

Figure 10:
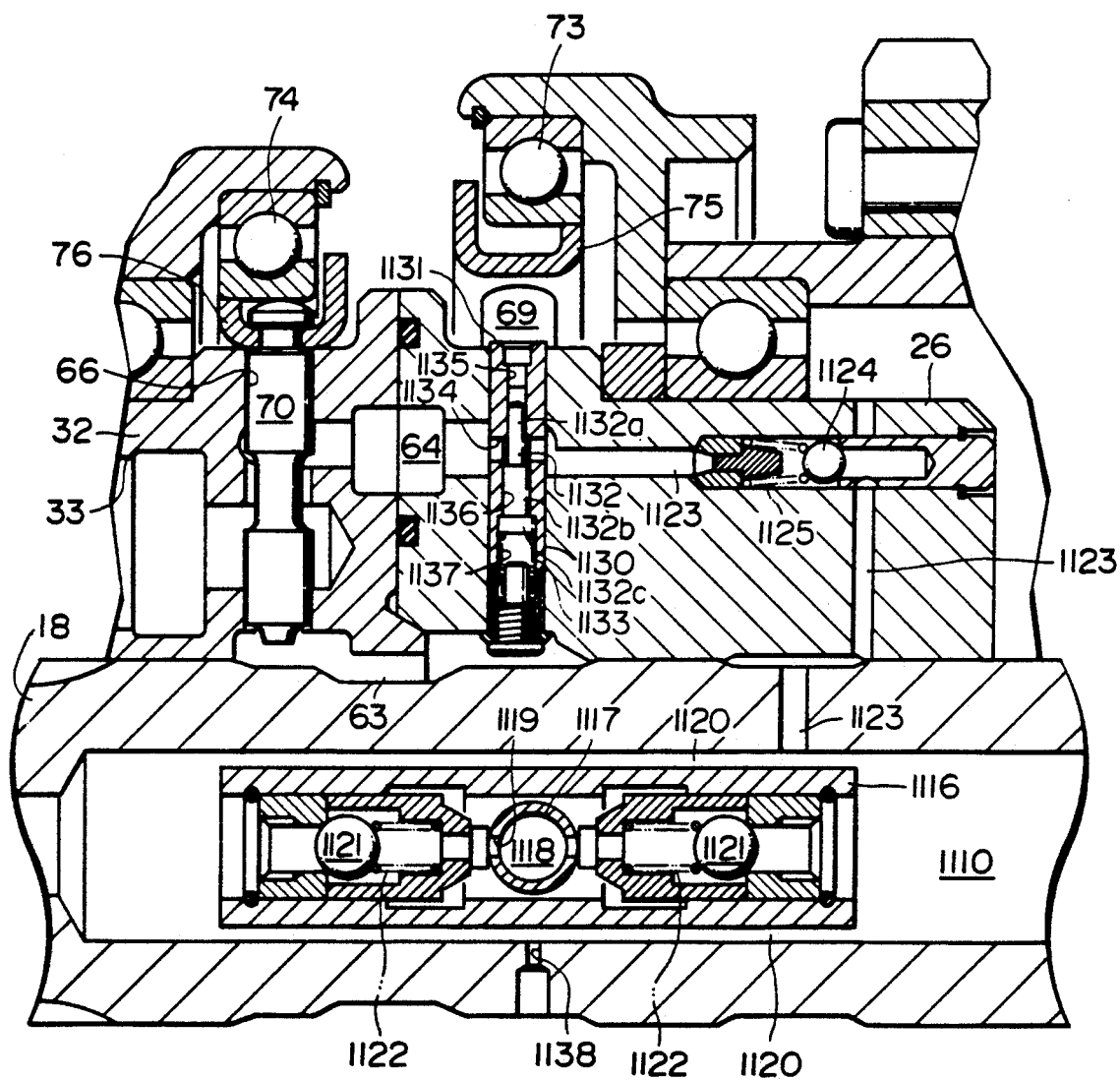

FIG. 10. An enlarged view showing the center of the transmission block.

Figure 11A:
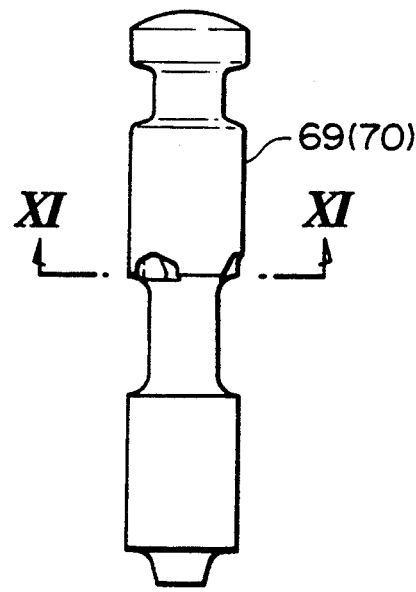

FIG. 11A. An enlarged side view of a distribution valve.

Figure 11B:
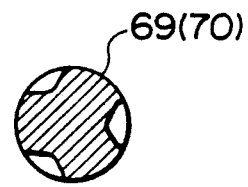

FIG. 11B. A sectional view through line XI—XI in FIG. 11A.

FIG. 12. A view showing the manner of connection of the pump cylinder and the motor cylinder as in FIG. 5.

FIG. 13. A view showing the manner of connection of the pump cylinder and the motor cylinder as in FIG. 5.

FIG. 14. A front view showing a variation in the outline shape of a pump cylinder and motor cylinder.

FIG. 15. A plan view showing the welded device for the pump cylinder and motor cylinder in FIG. 14.

Figure 16:
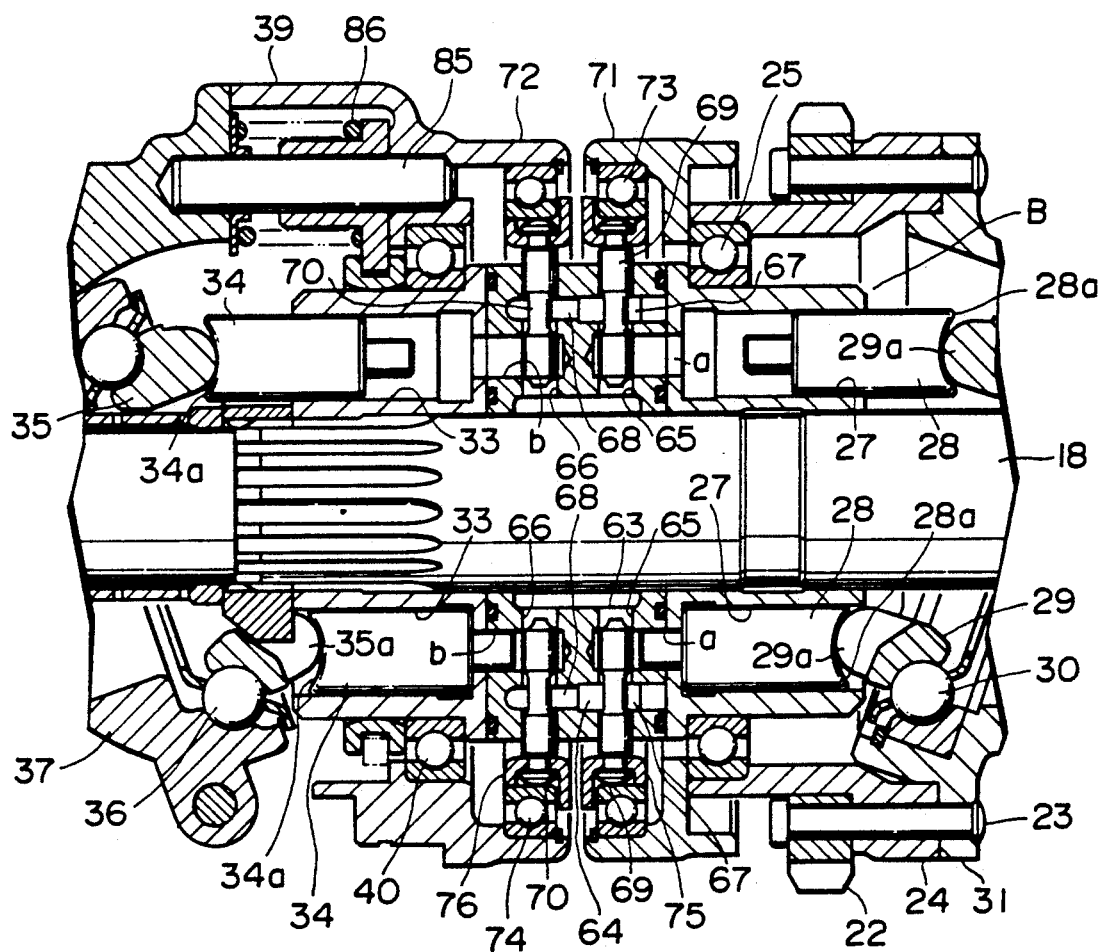

FIG. 16. A sectional view showing variations in the structure of the transmission block.

Figure 17:
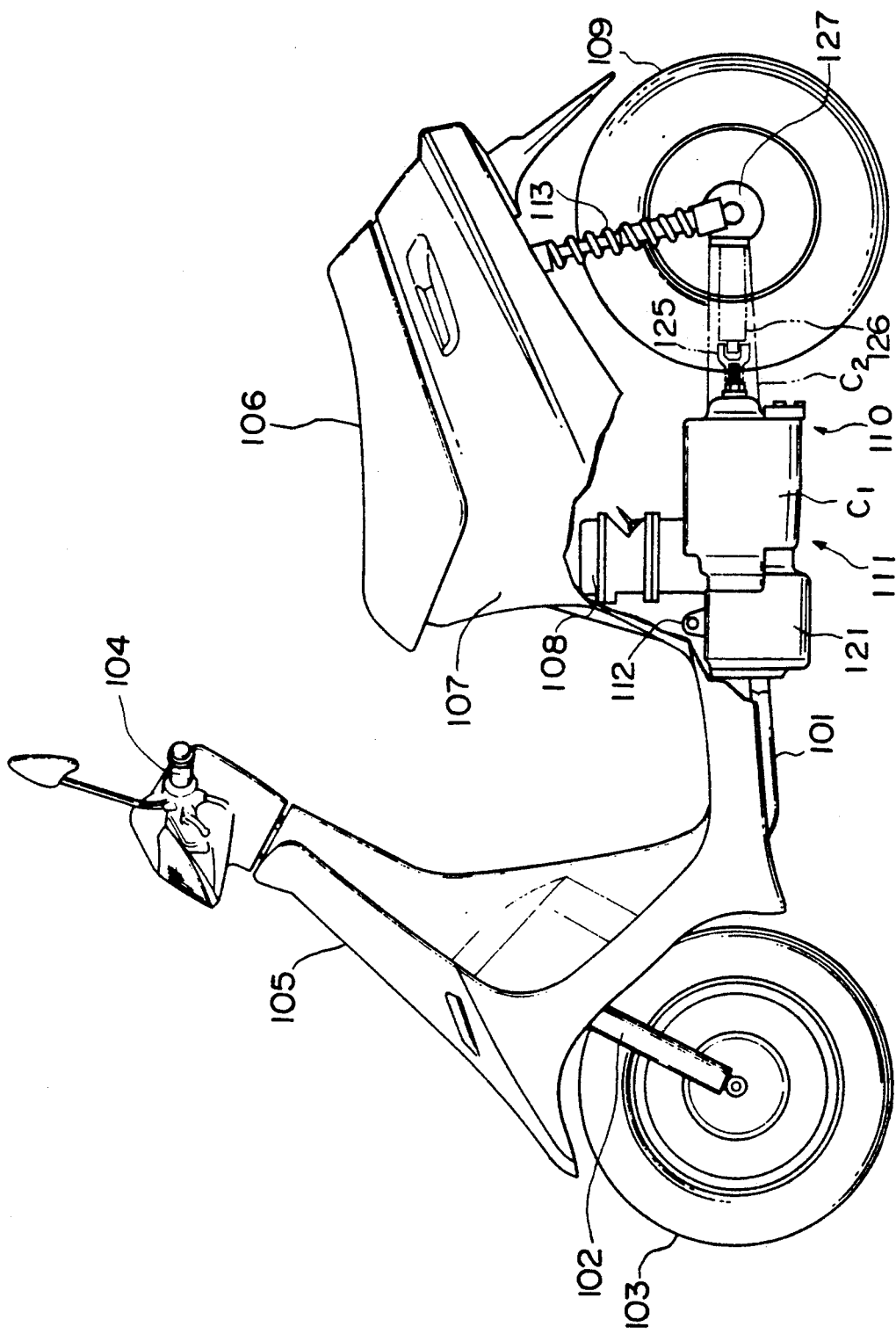

FIG. 17. A side view showing an embodiment.

Figure 18:
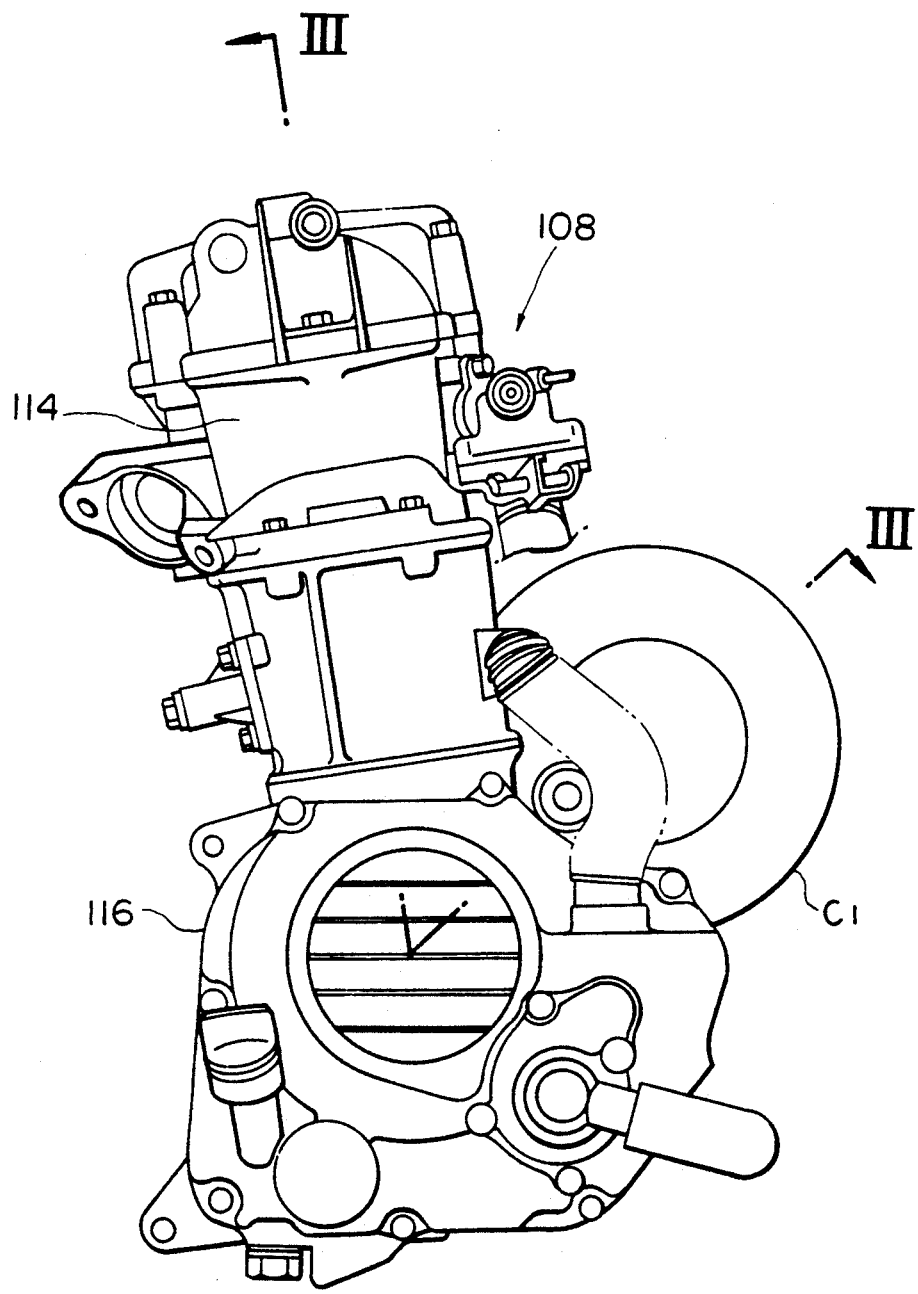

FIG. 18. A front view of a power unit of the present invention.

Figure 19:
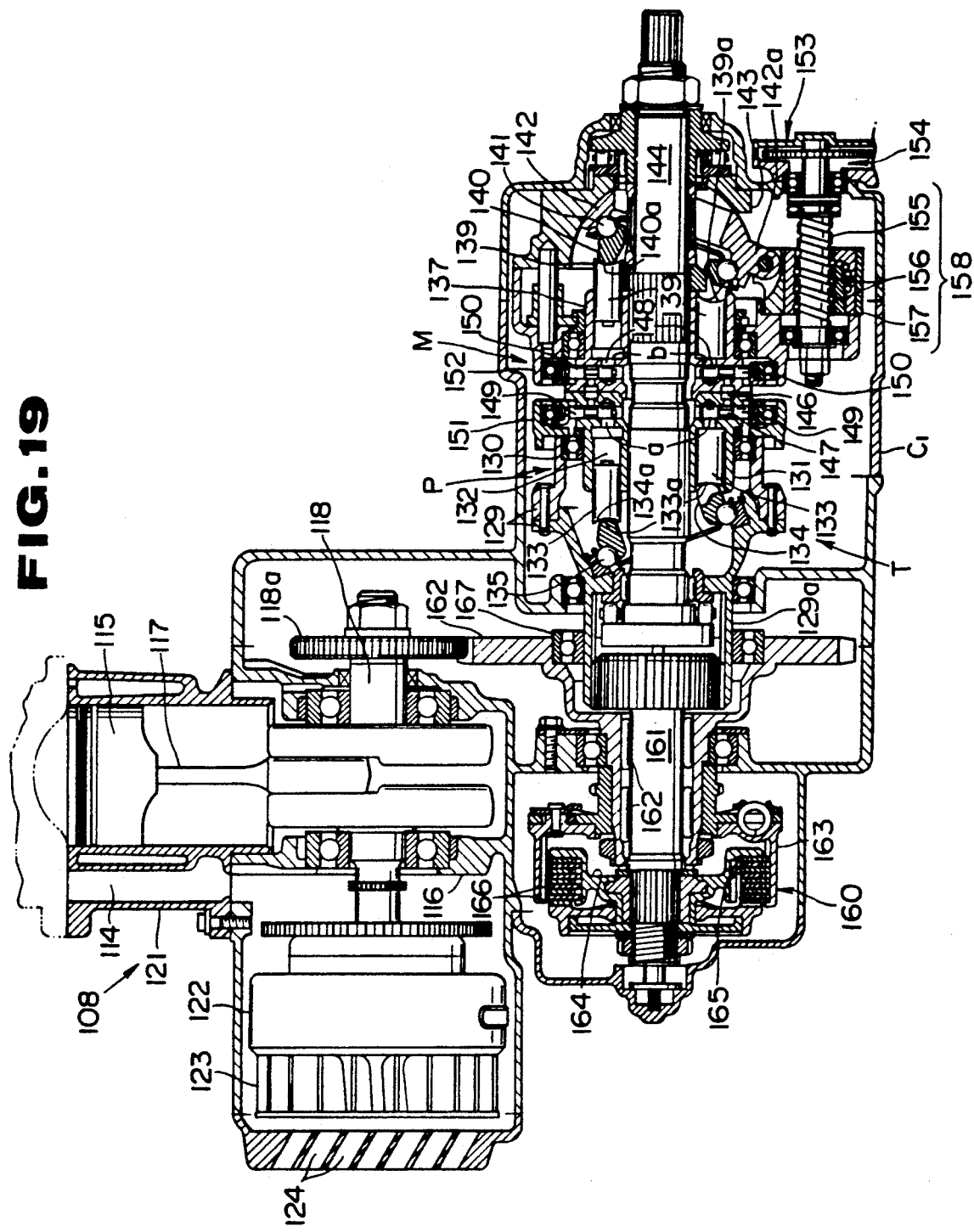

FIG. 19. A sectional view of an embodiment of the present invention showing the interior of the engine and the transmission system.

Figure 20:
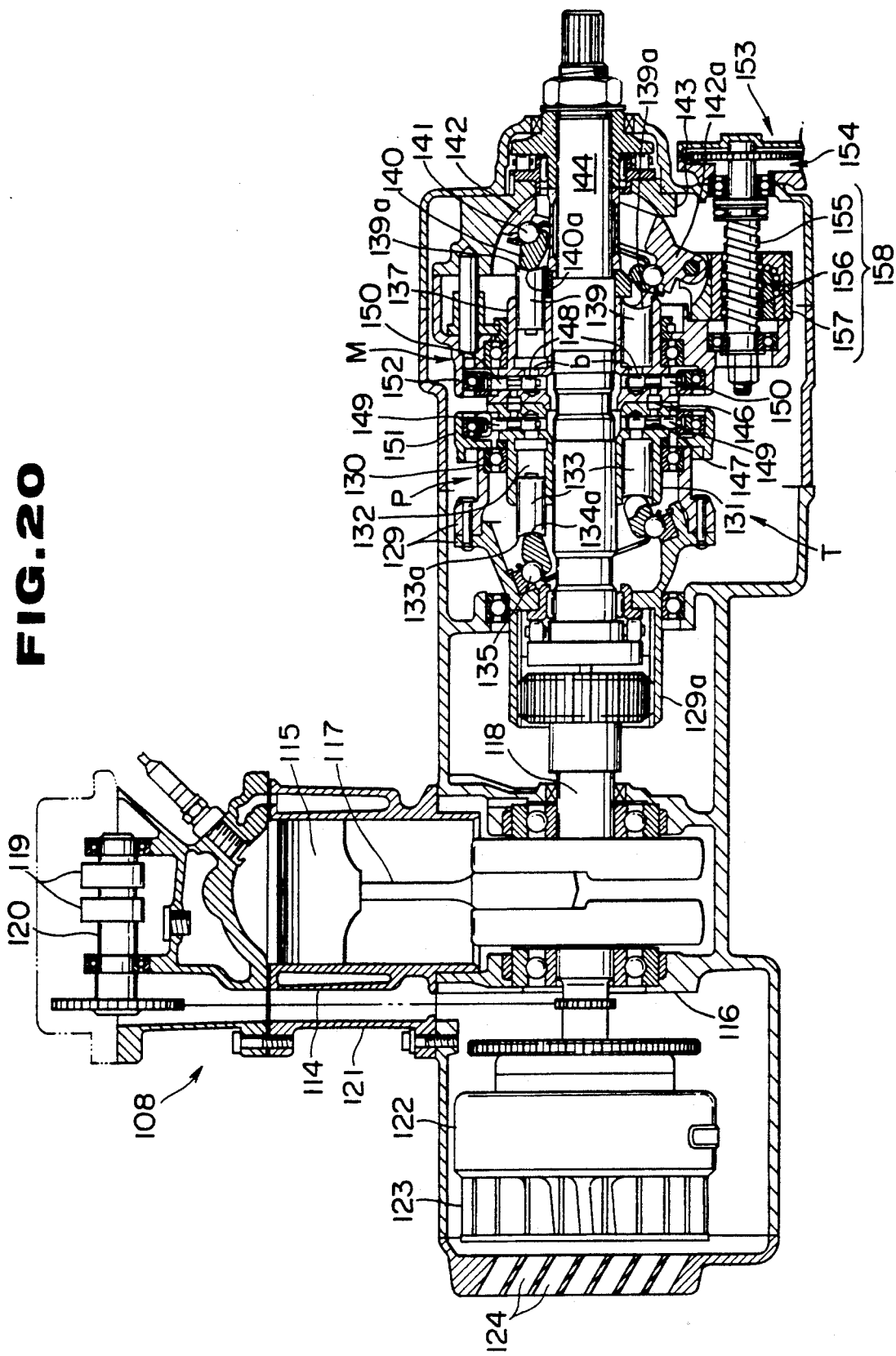

FIG. 20. A sectional view of an embodiment of the present invention showing the interior of the engine and the transmission system.

Figure 21:
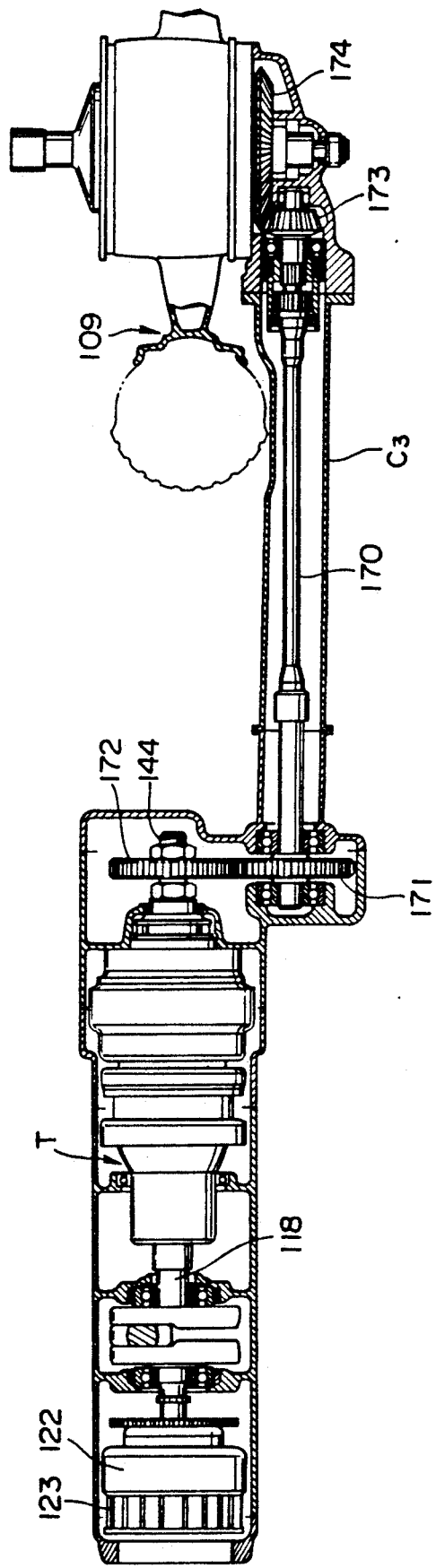

FIG. 21. A plane section of the engine and transmission system of the embodiment in FIG. 20.

Figure 22:
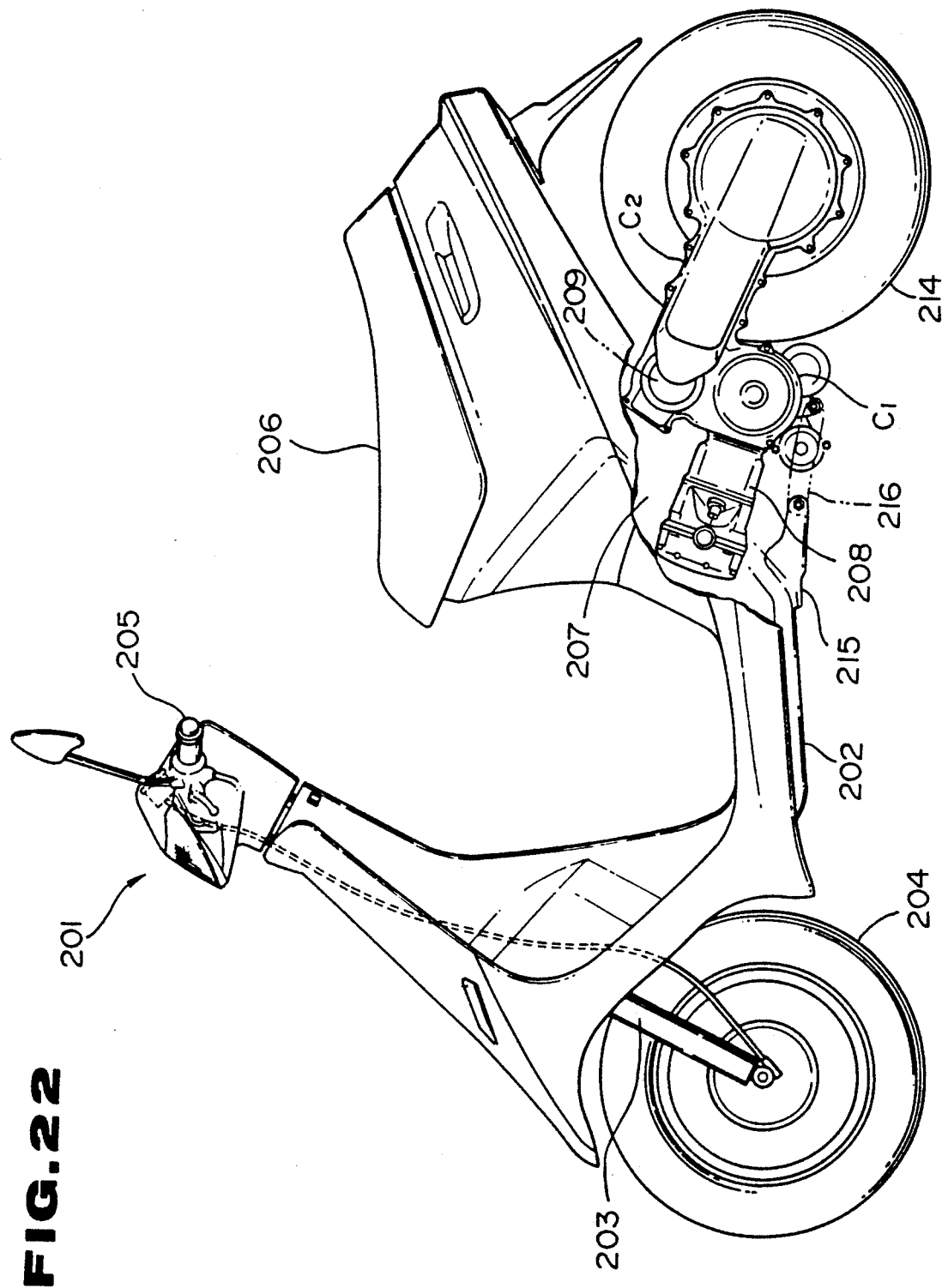

FIG. 22. A side view of an embodiment of the present invention.

Figure 23:
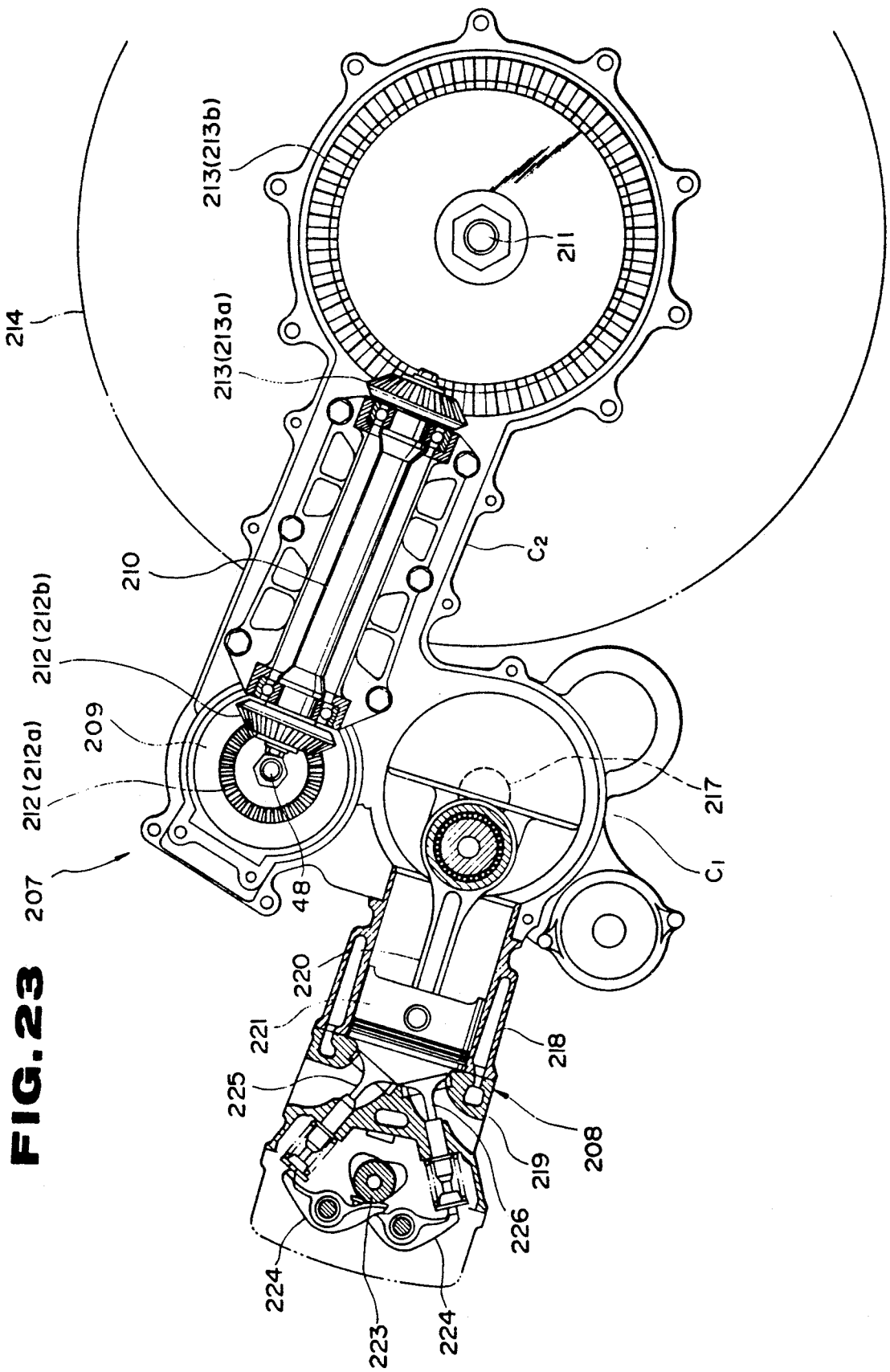

FIG. 23. A sectional side view of the major parts of the power train of the embodiment in FIG. 22.

Figure 24:
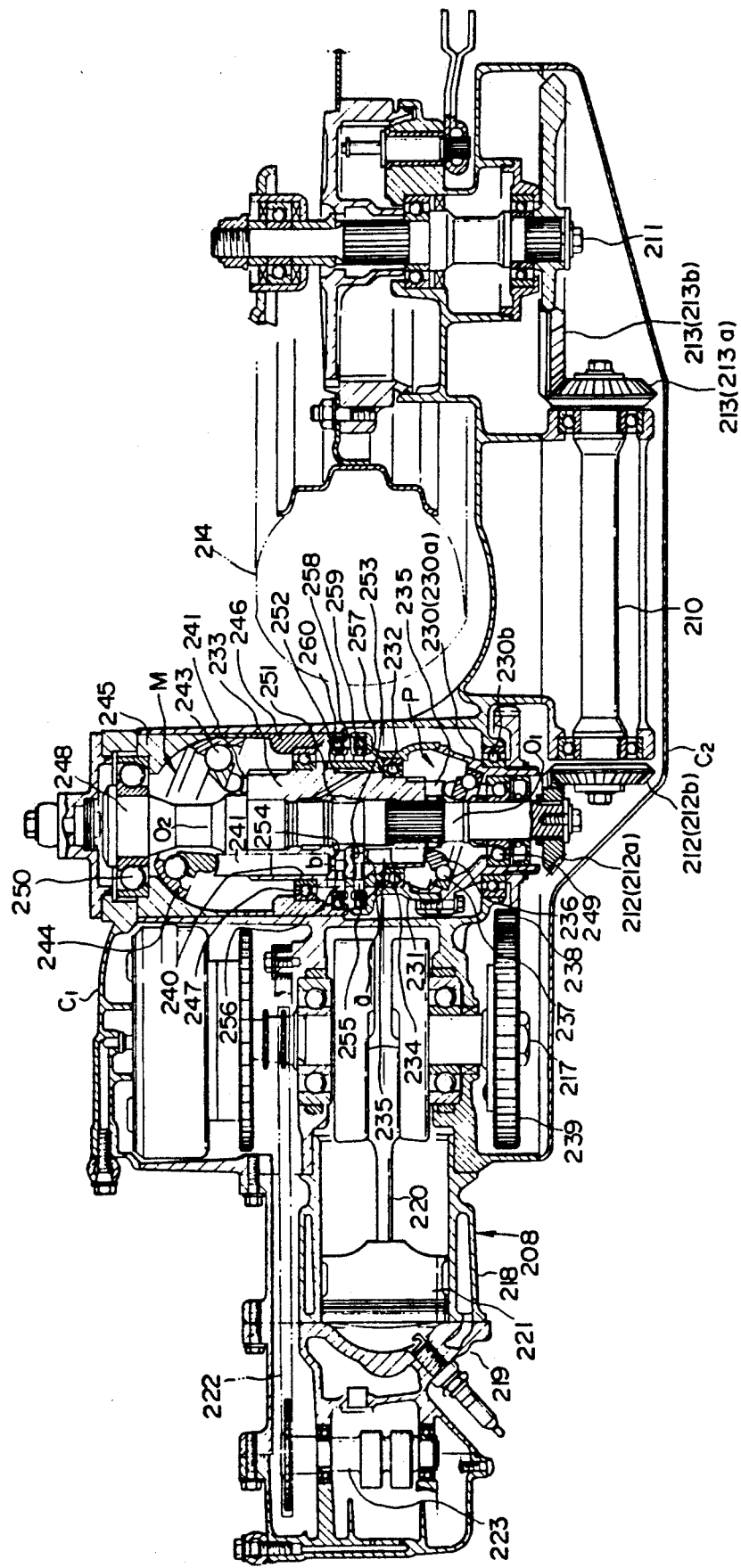

FIG. 24. A sectional side view of the interior of the engine and transmission of the embodiment in FIG. 22.

Figure 25:
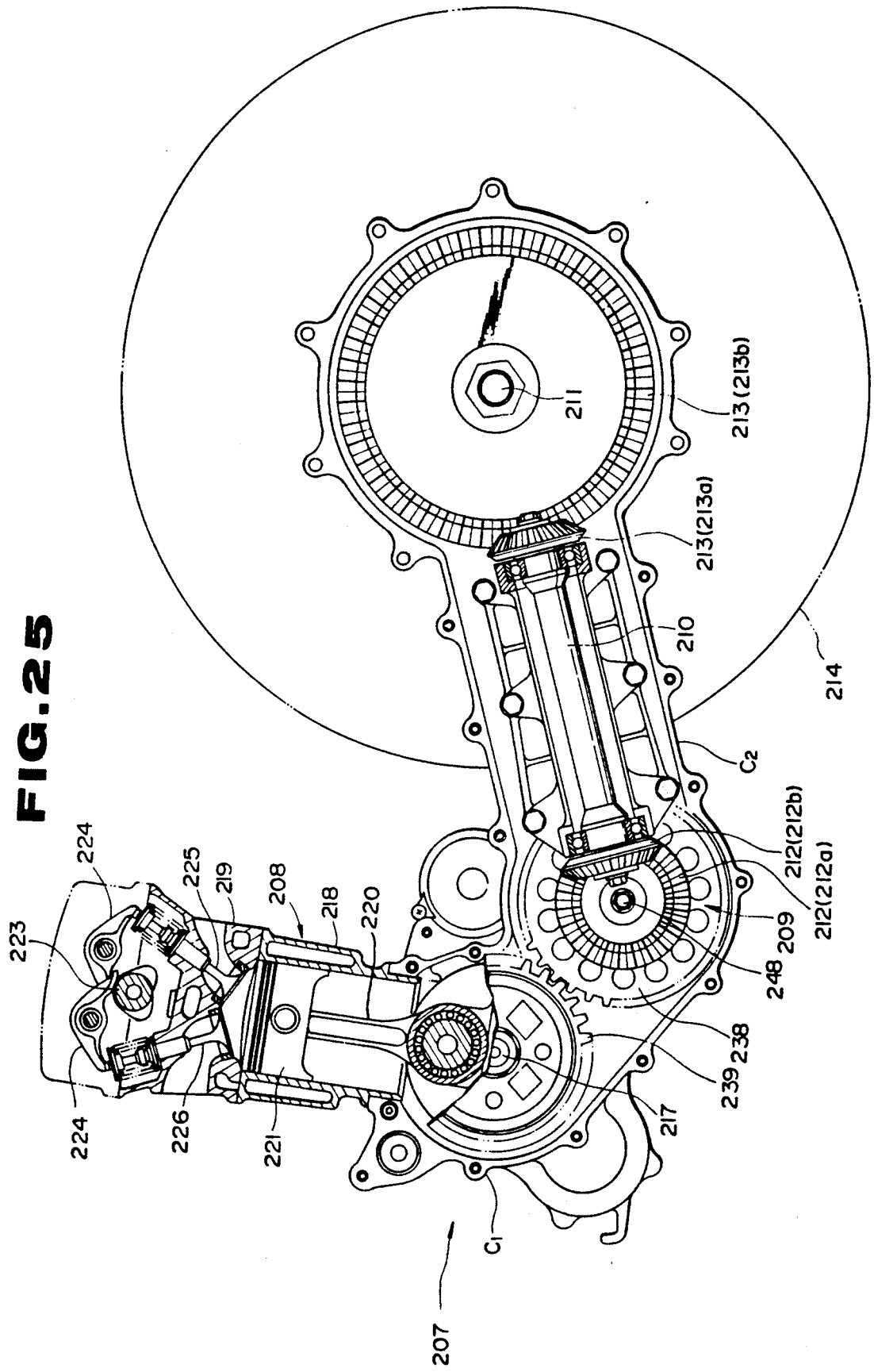

FIG. 25. A sectional side view of the major parts of the power train in a variation of the embodiment seen in FIG. 22.

Figure 26:
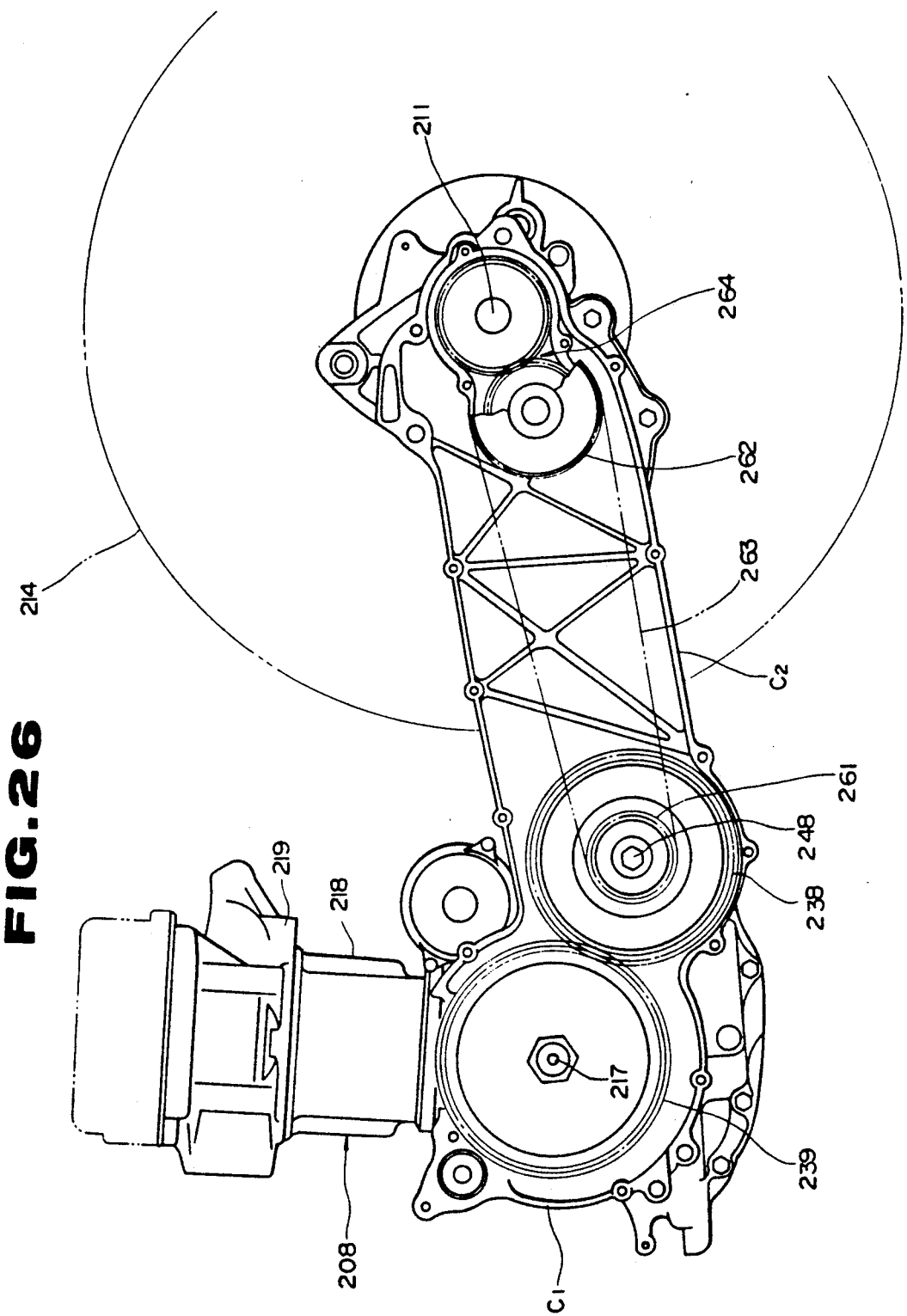

FIG. 26. A sectional view of another variation in the embodiment in FIG. 22.

Figure 27:
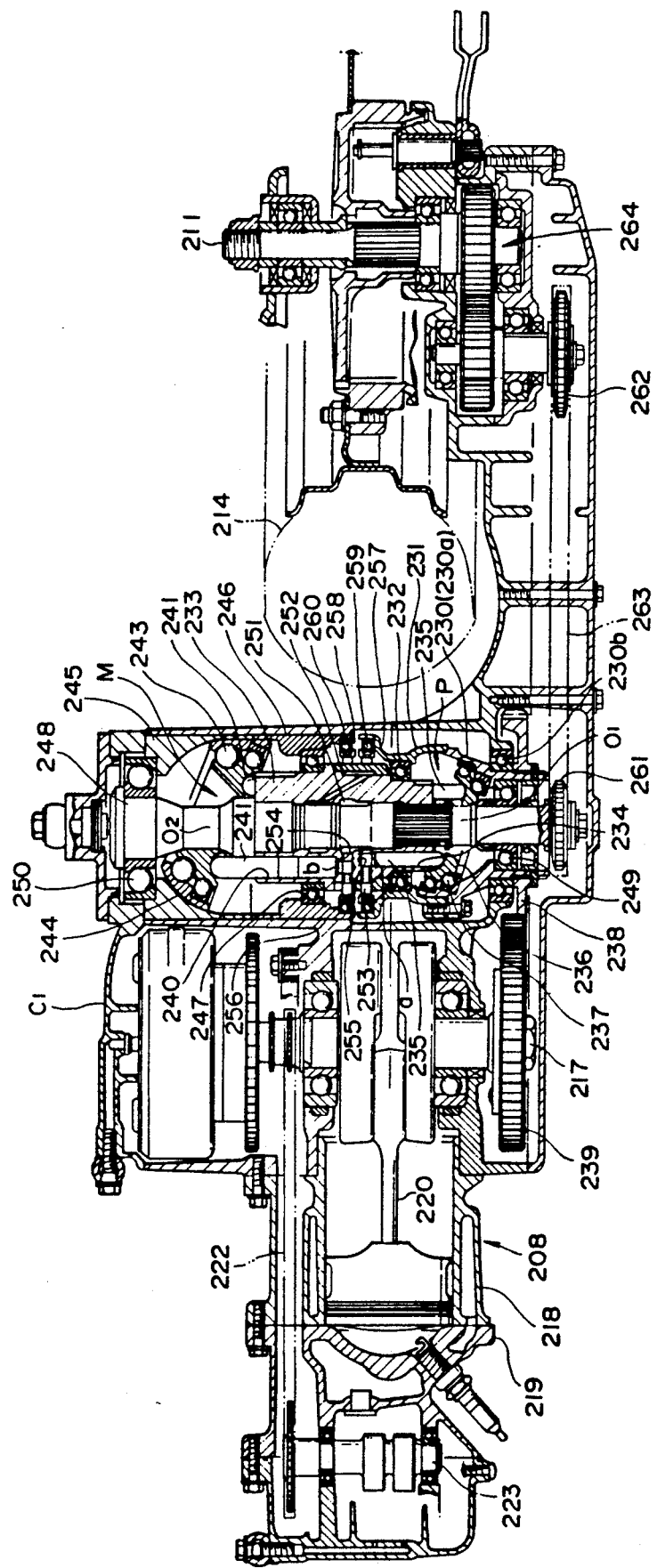

FIG. 27. A side view of a section through the engine and transmission of a variation in the embodiment of the invention in FIG. 22.

Figure 28:
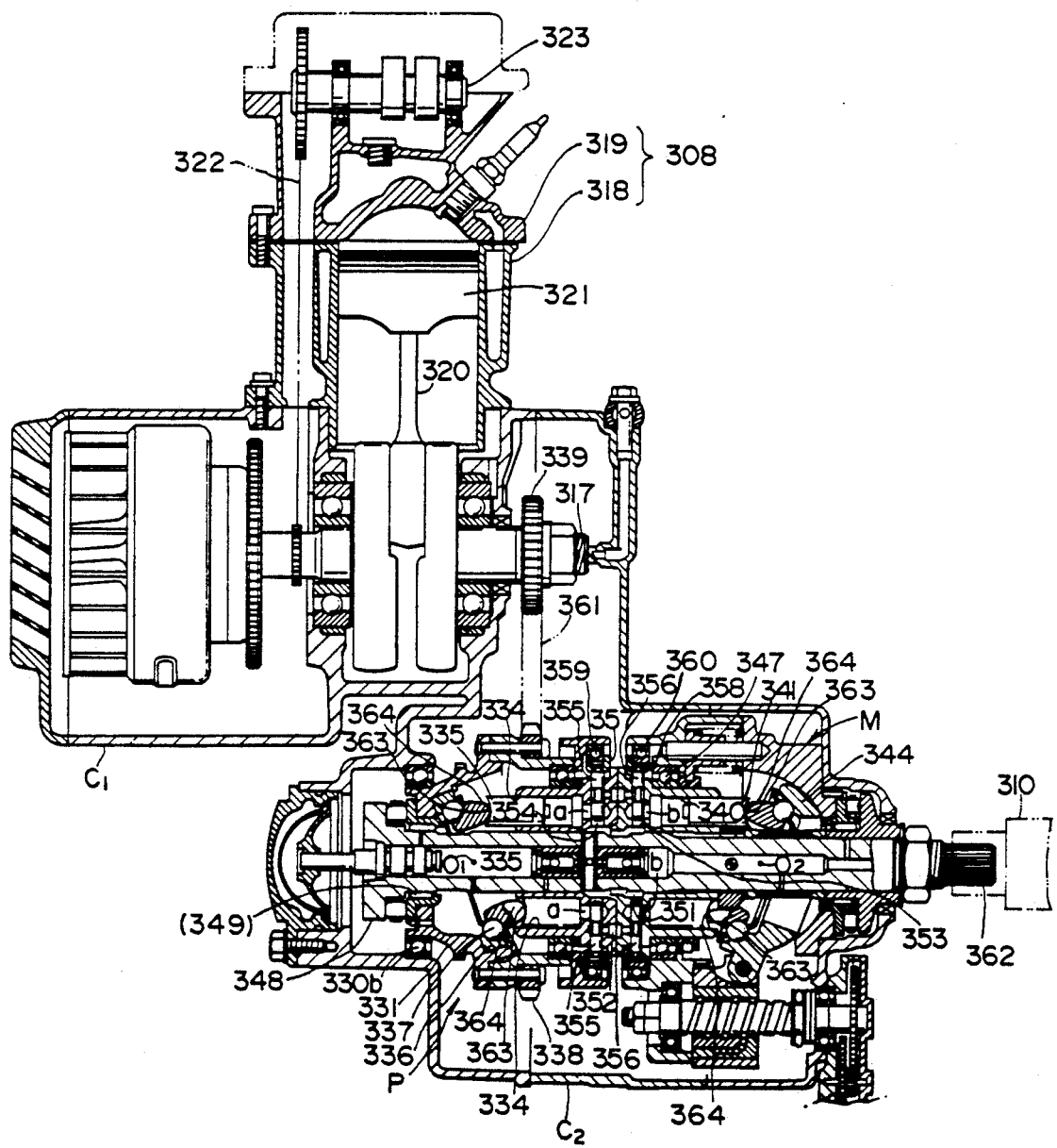

FIG. 28. A sectional view of the engine and transmission.

Figure 29:
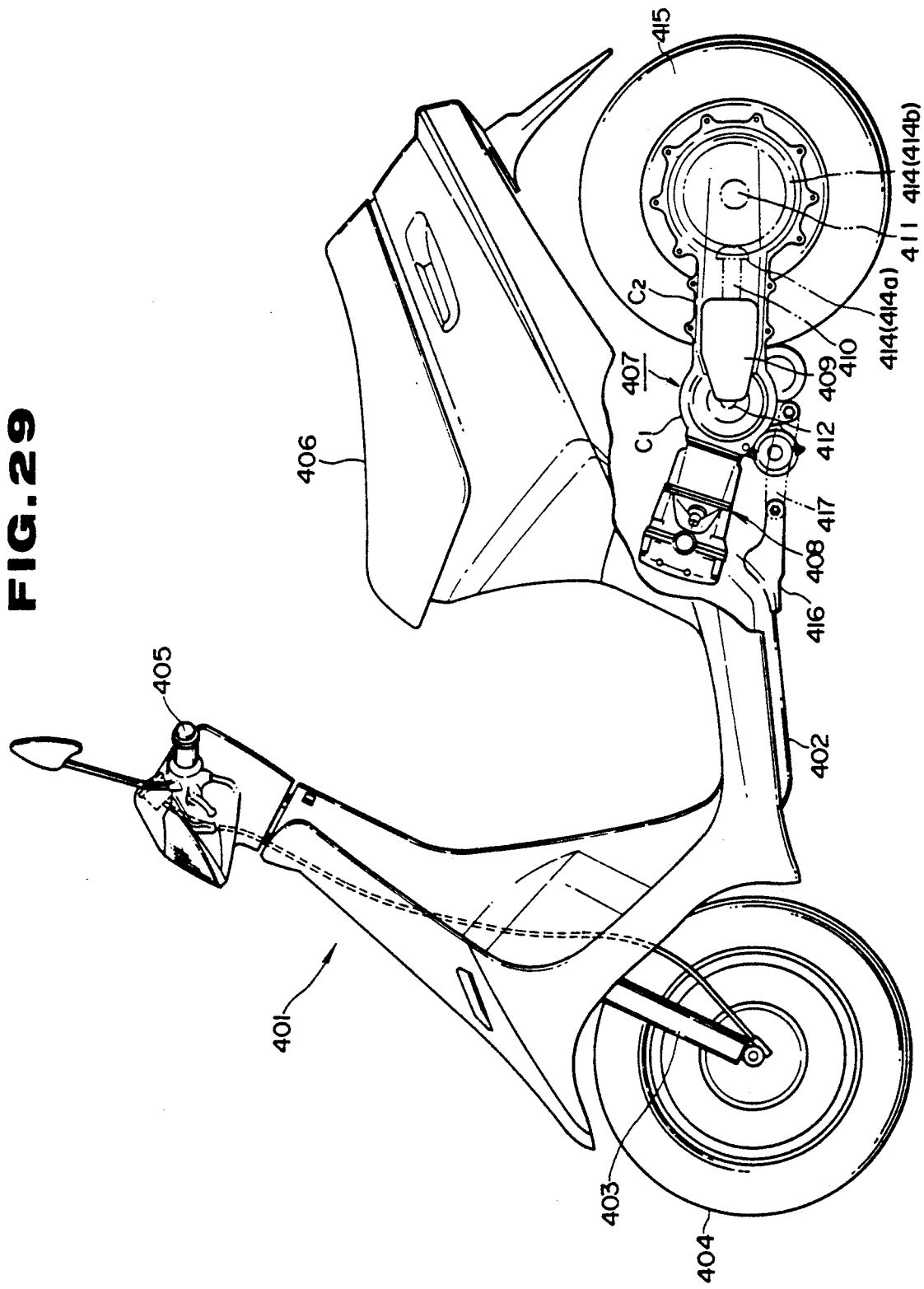

FIG. 29. A side view of an embodiment of the present invention.

Figure 30:
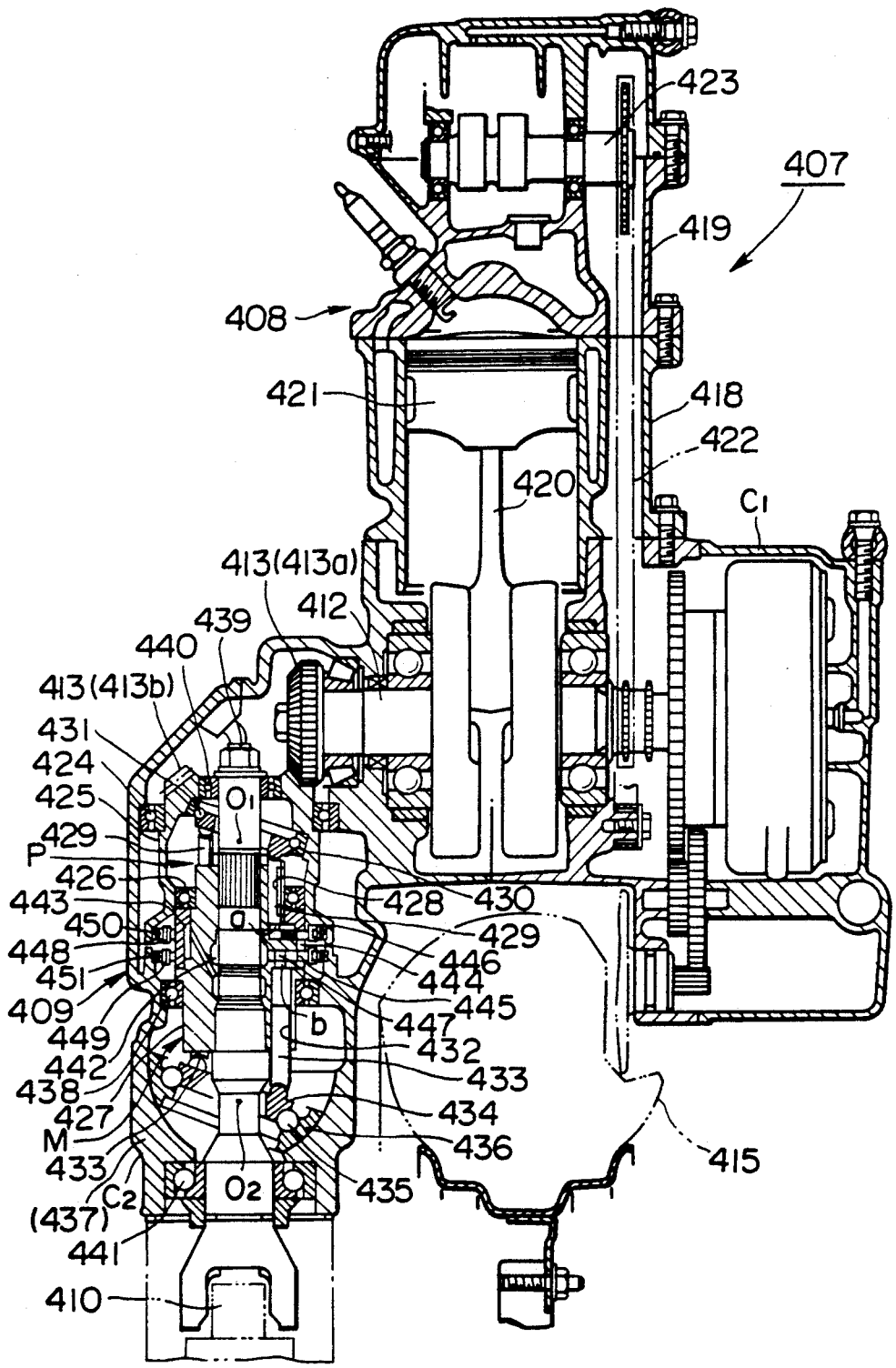

FIG. 30. A side view of a section showing the interior of the engine and the transmission of an embodiment of the present invention.

Figure 31:
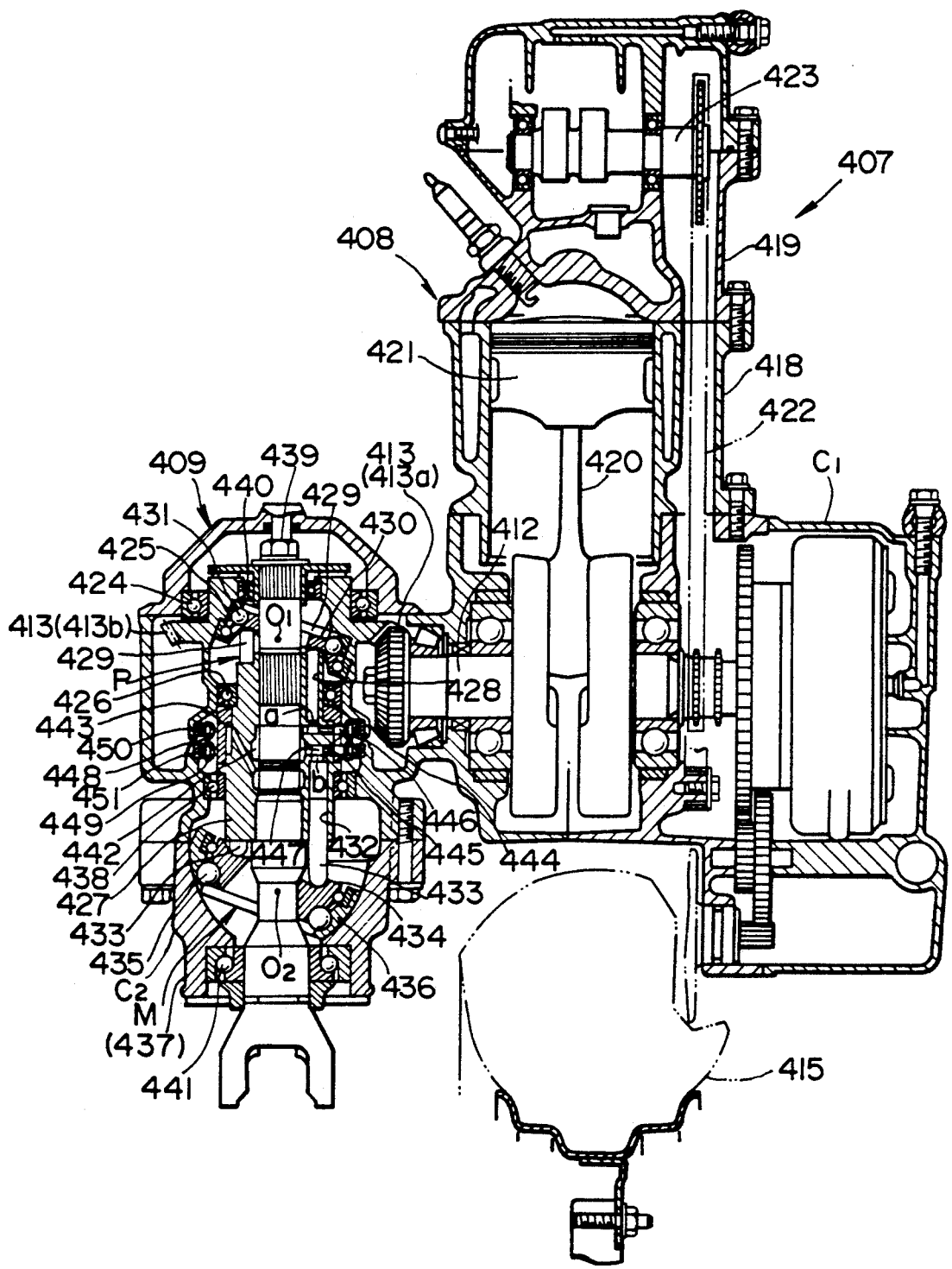

FIG. 31. A side view of a section showing the interior of the engine and the transmission of an embodiment of the present invention.

Figure 32:
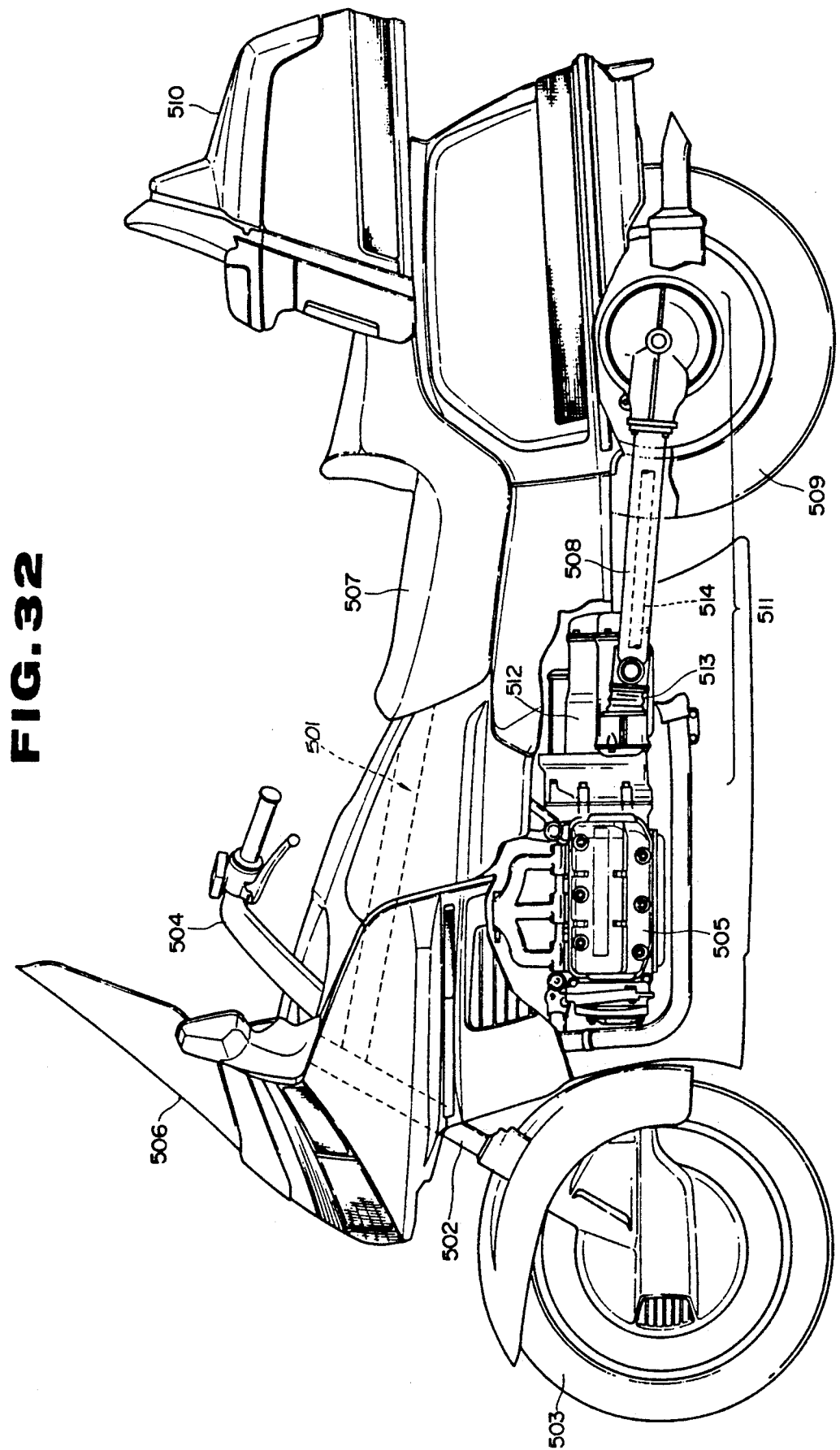

FIG. 32. A side view of an embodiment of the present invention.

Figure 33:
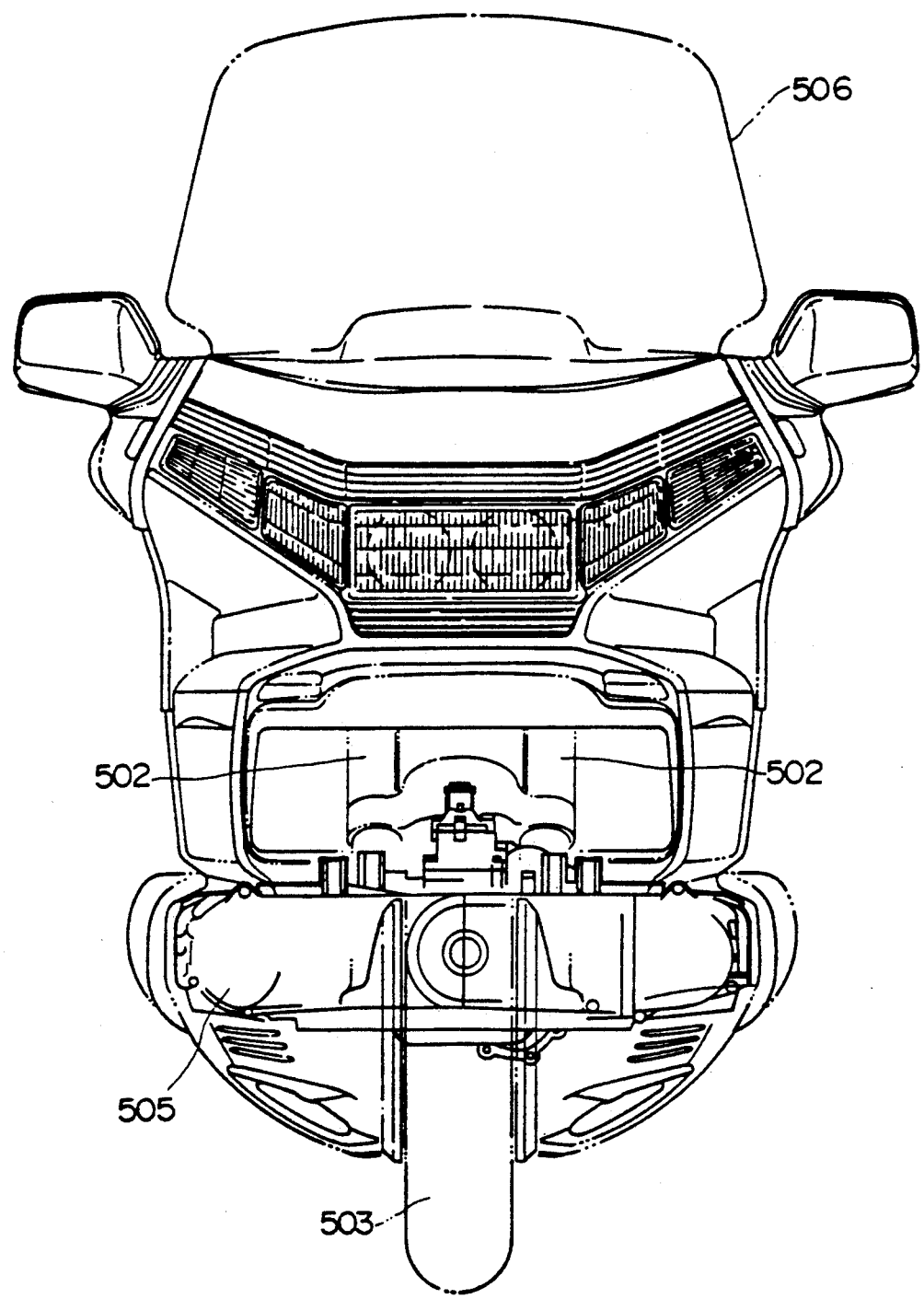

FIG. 33. A side view of an embodiment of the present invention.

Figure 34:
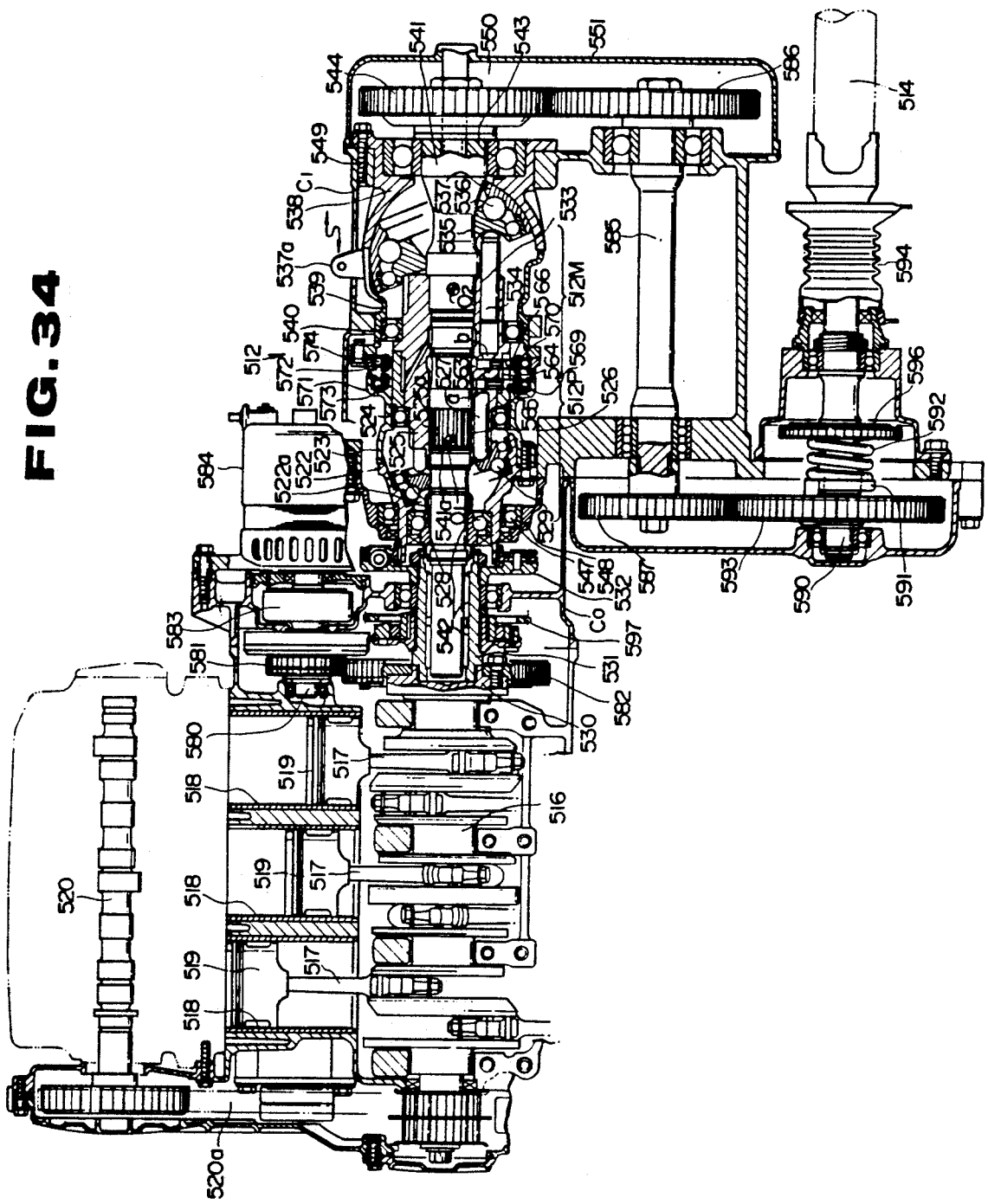

FIG. 34. A sectional view of an embodiment of the present invention showing the engine and transmission system.

Figure 35:
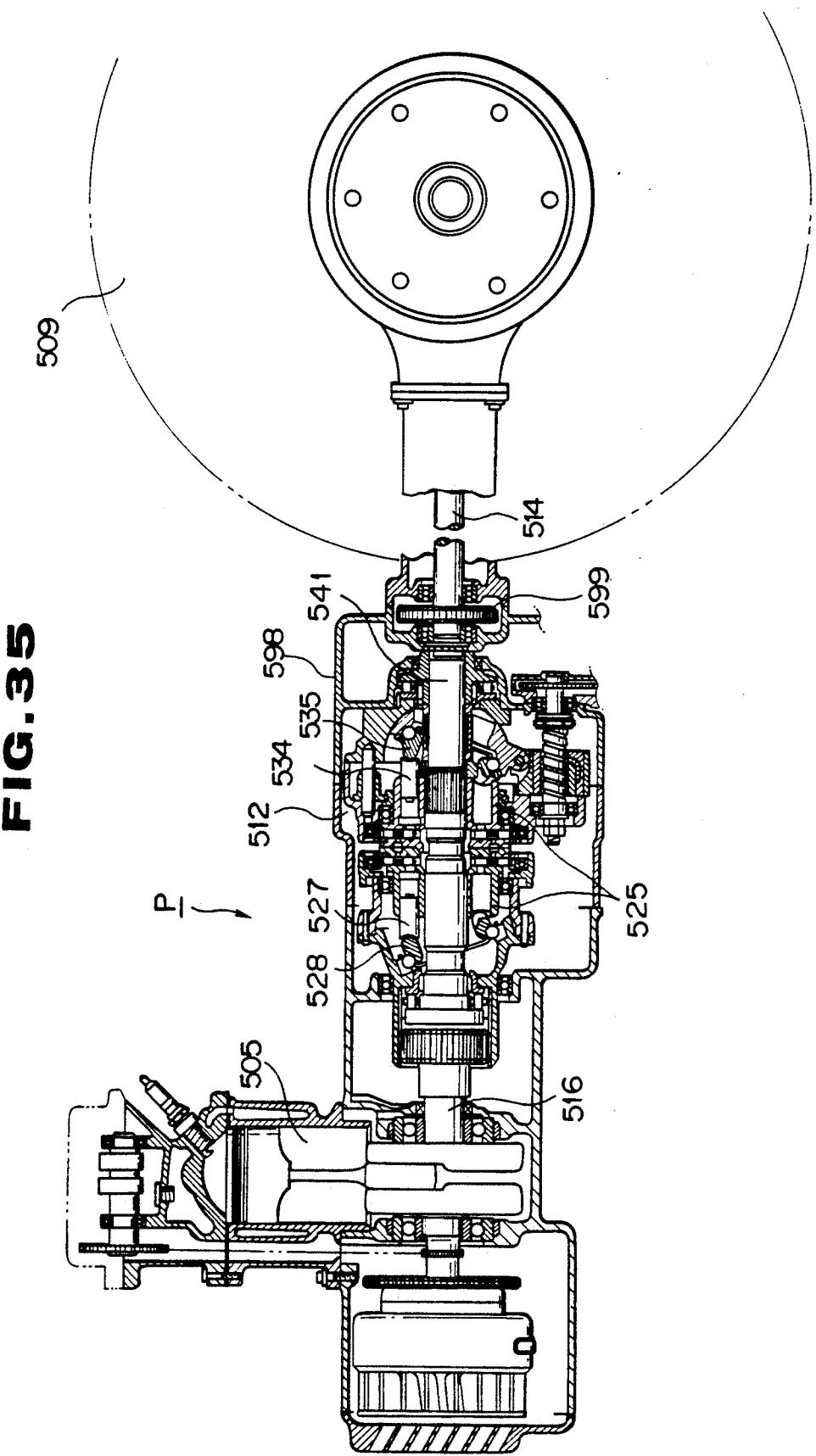

FIG. 35. A sectional side view of an embodiment of the present invention.

Figure 36:
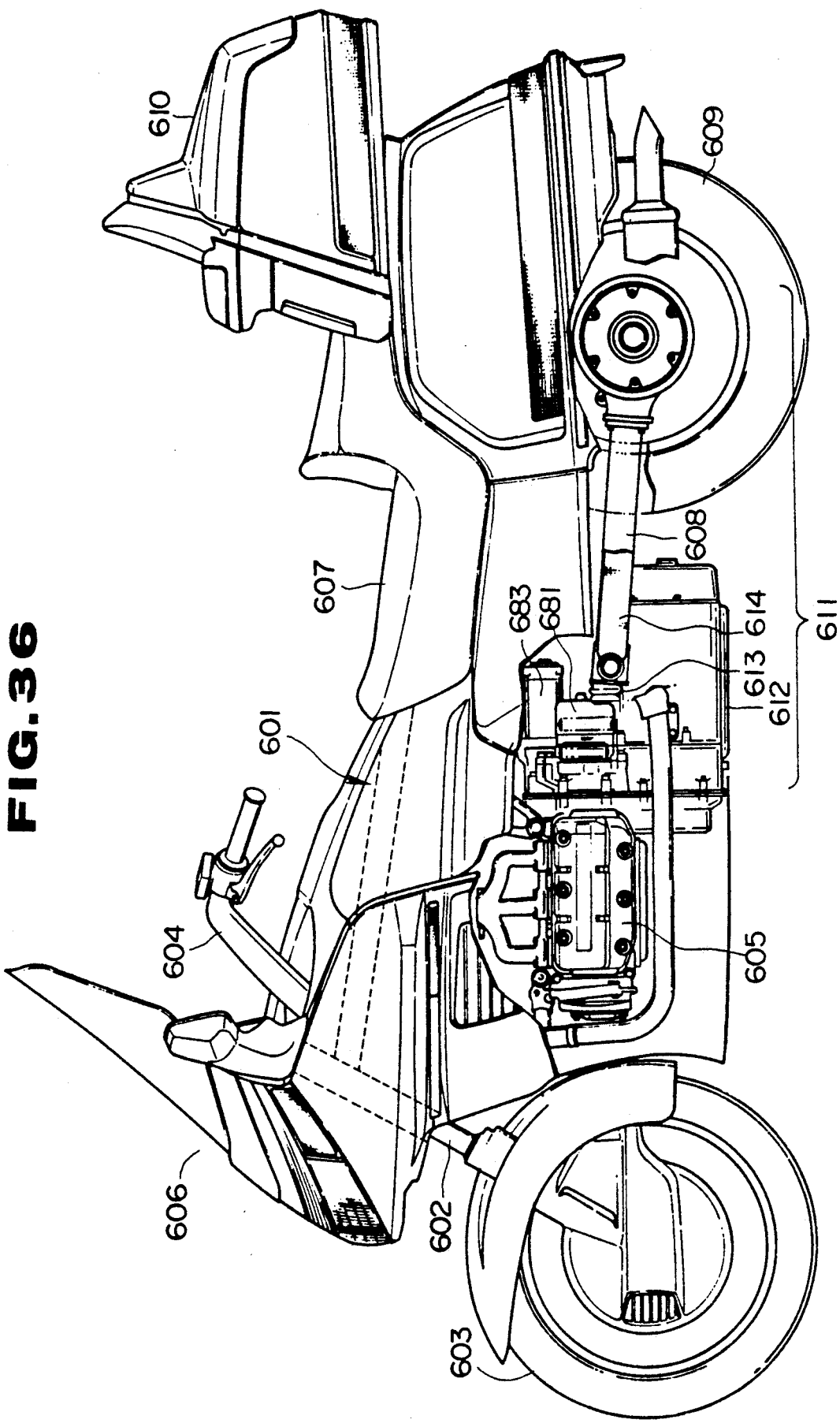

FIG. 36. A side view of an embodiment of the present invention.

Figure 37:
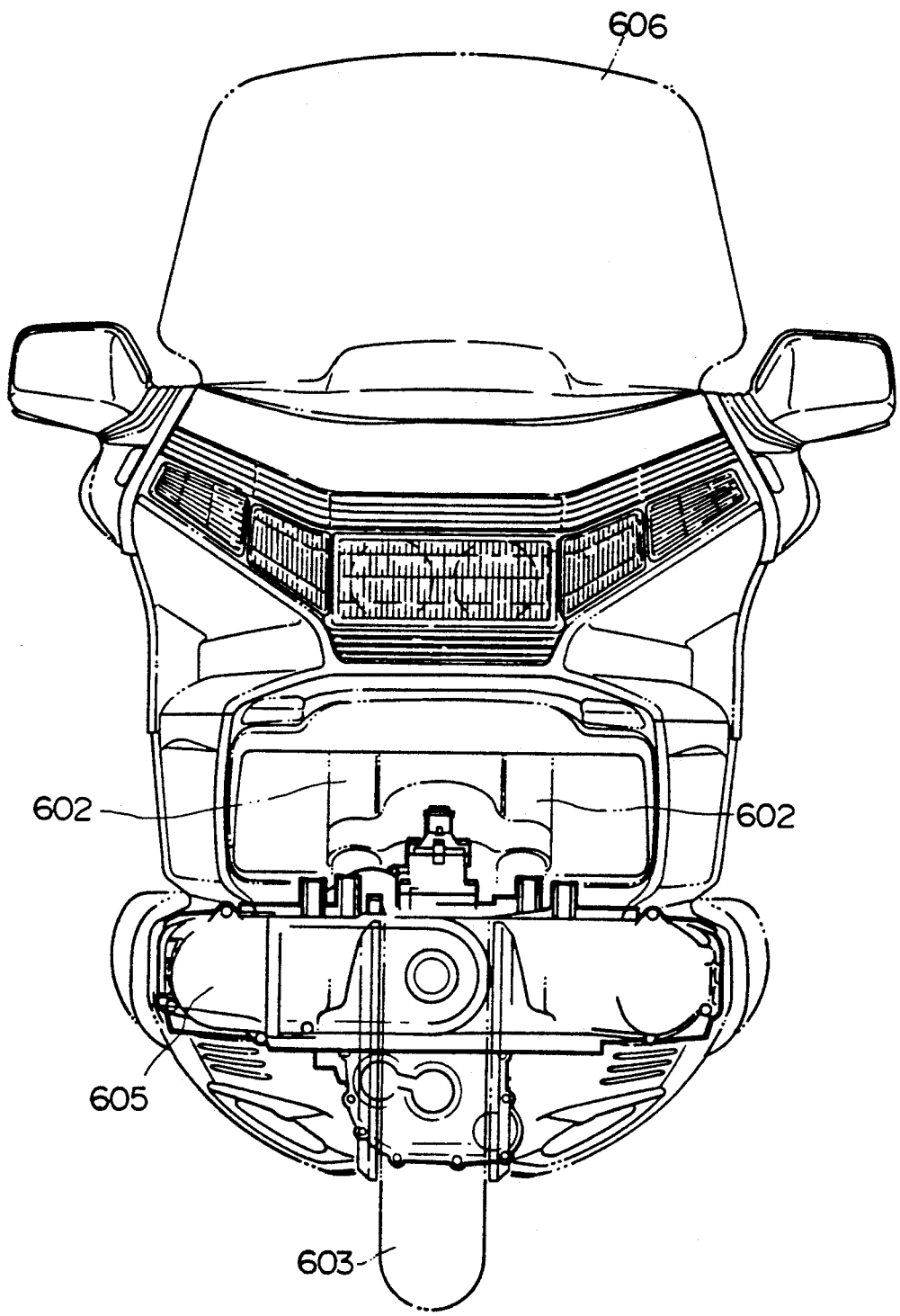

FIG. 37. A front view of an embodiment of the present invention.

Figure 38:
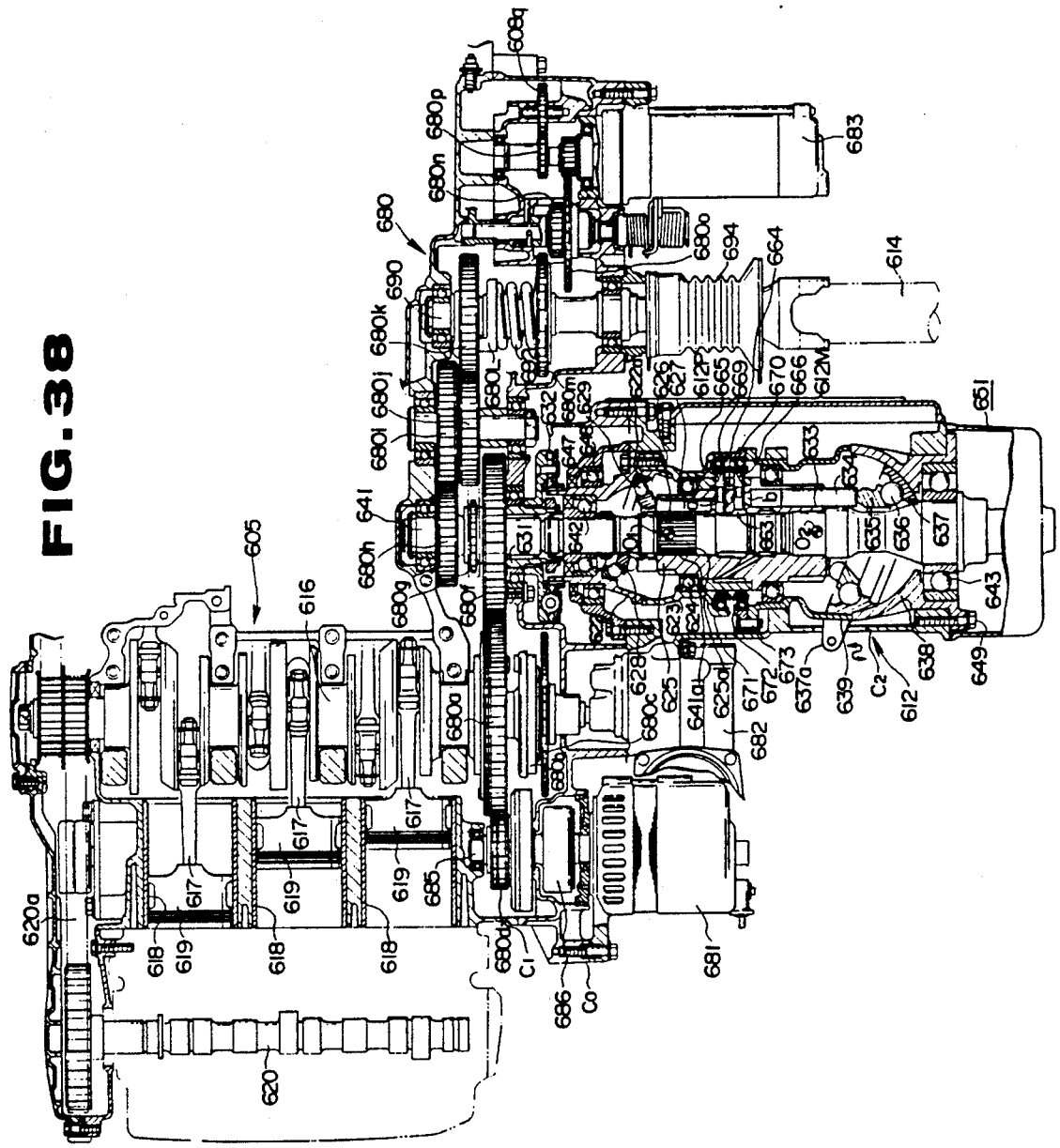

FIG. 38. A sectional view showing the power drive and the static hydraulic pressure type continuously variable transmission.

Figure 39:
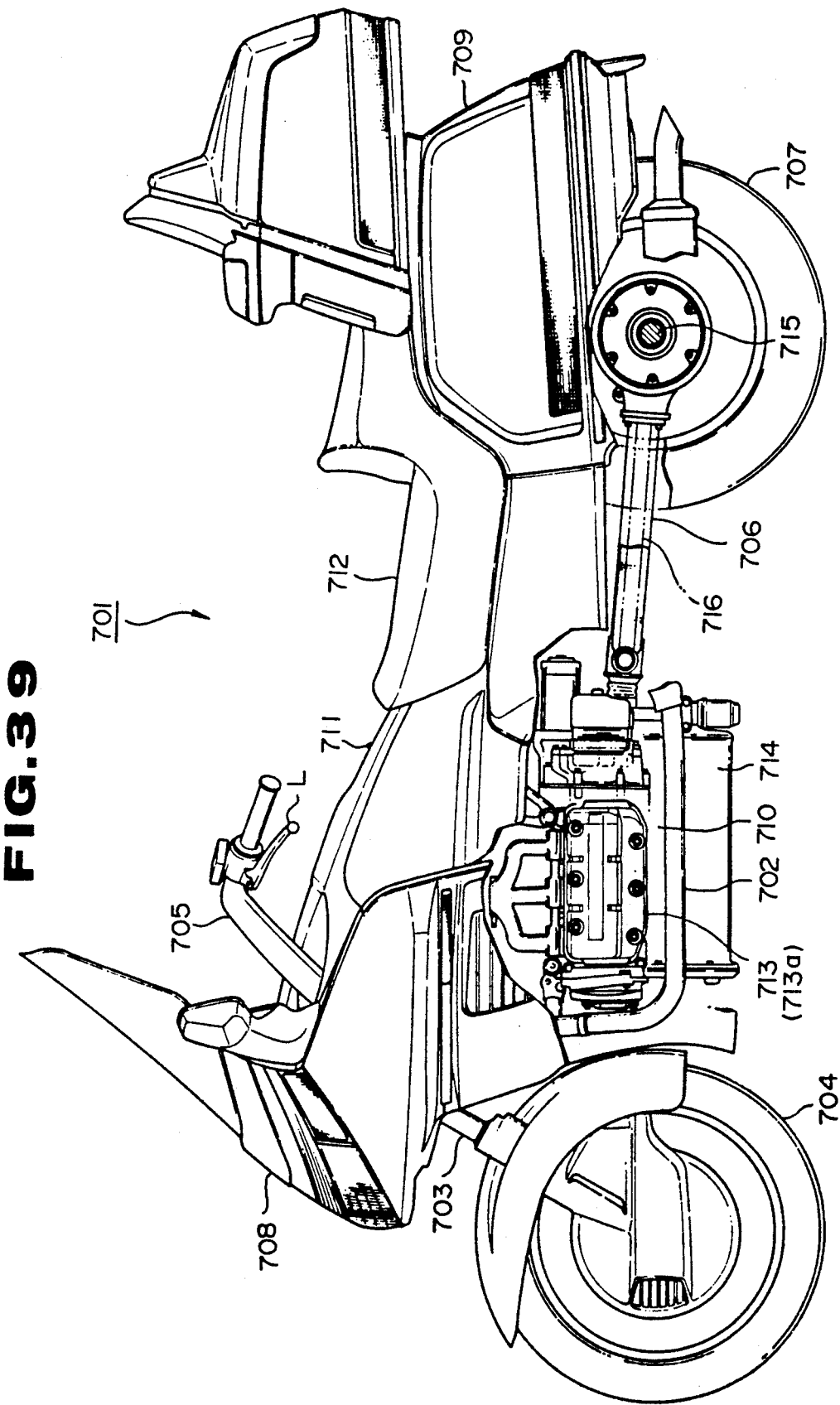

FIG. 39. A side view of an embodiment of the present invention.

Figure 40:
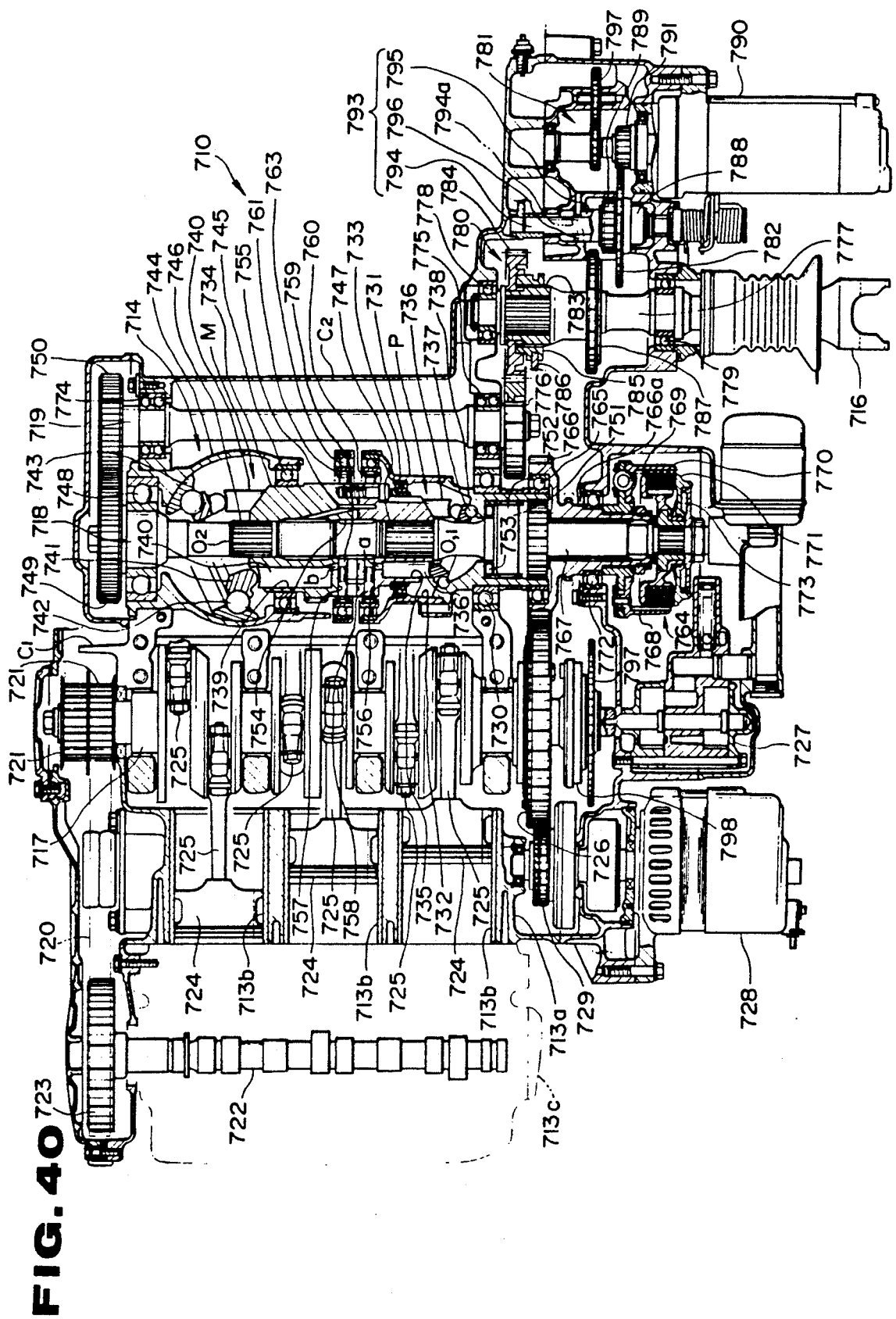

FIG. 40. A sectional view from the top of the engine and transmission of an embodiment of the present invention.

Figure 41:
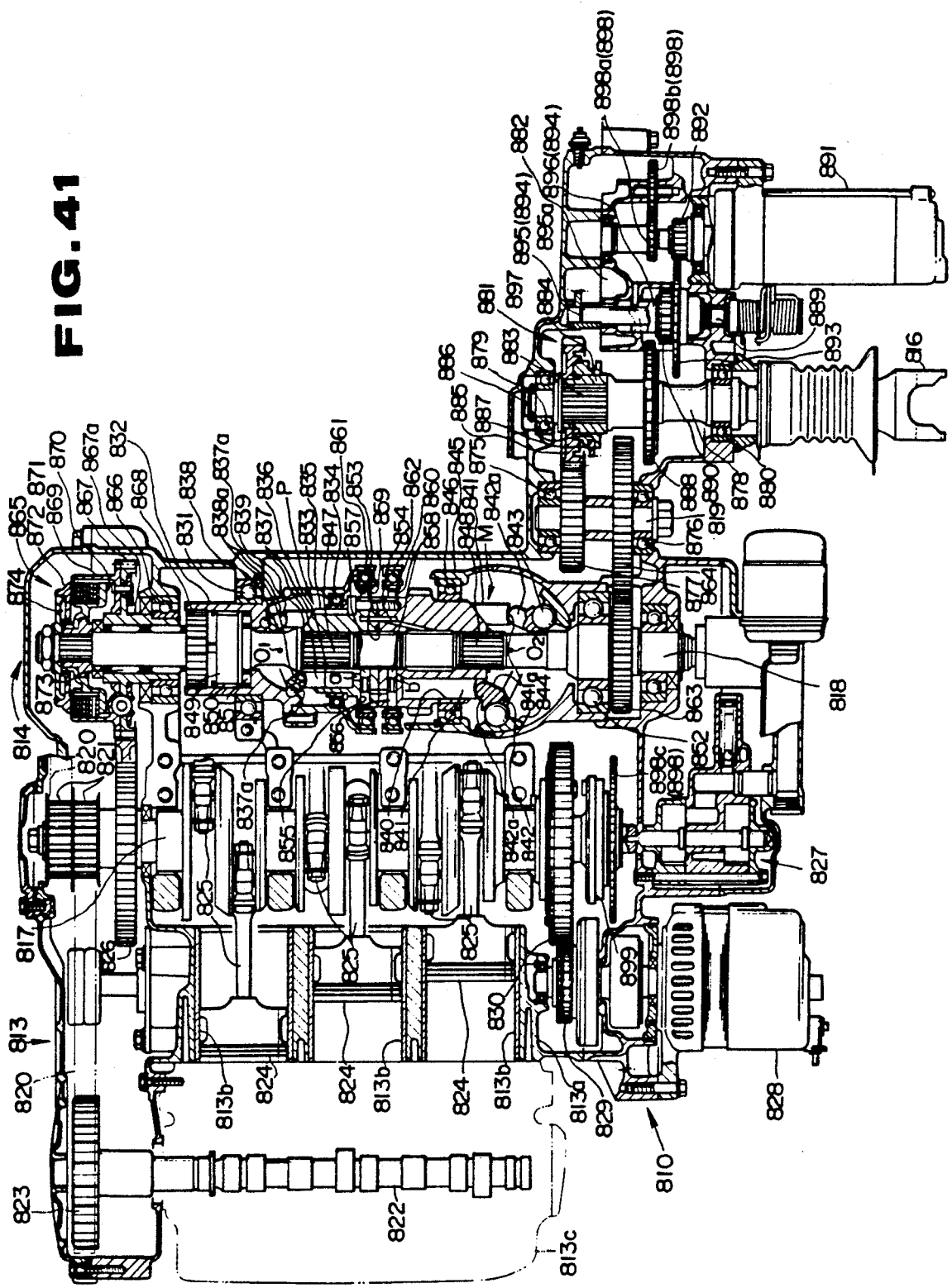

FIG. 41. A sectional view from the top of the engine and transmission of an embodiment of the present invention.

Figure 42:
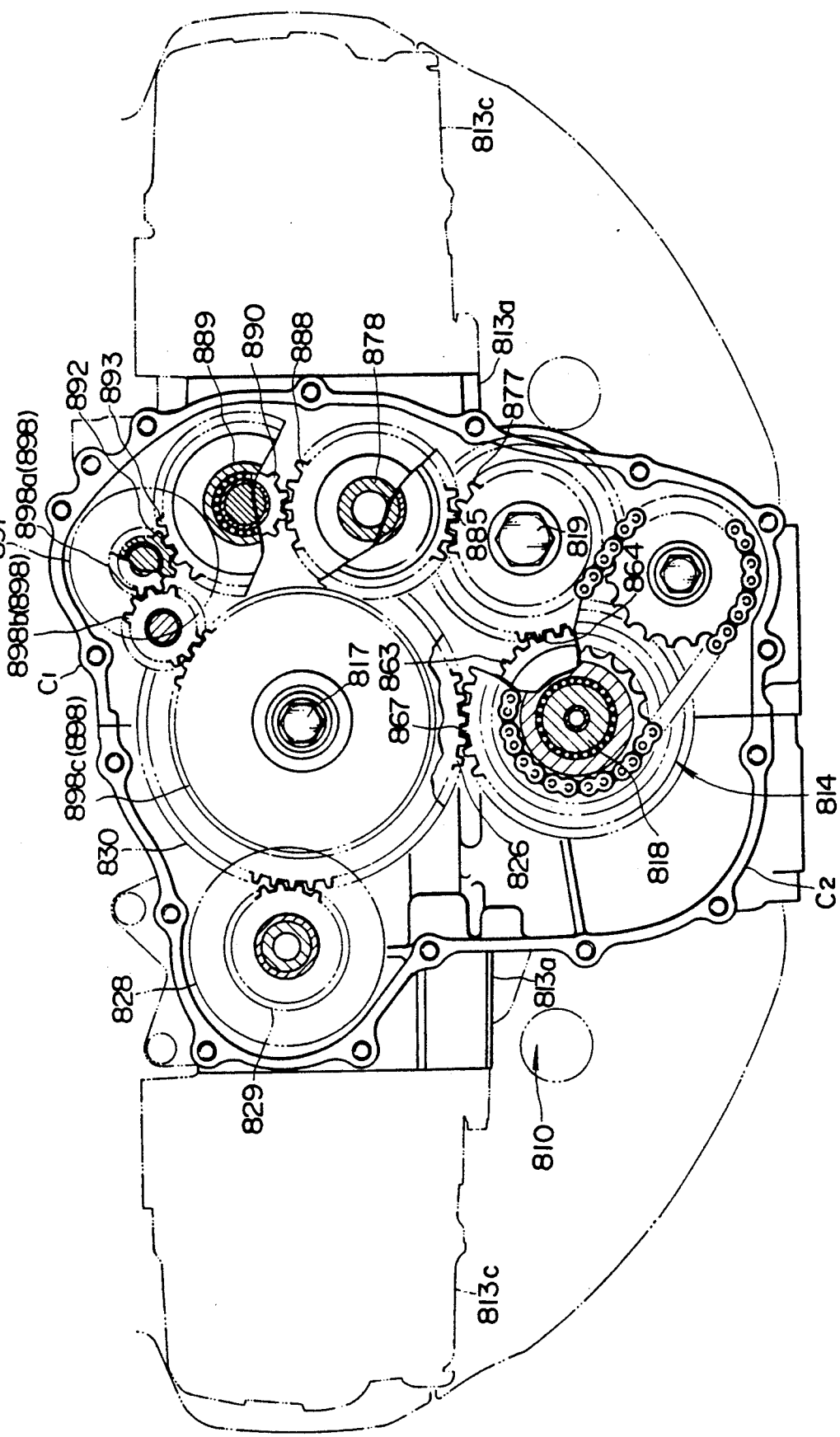

FIG. 42. A front view of the power train.

Figure 43:
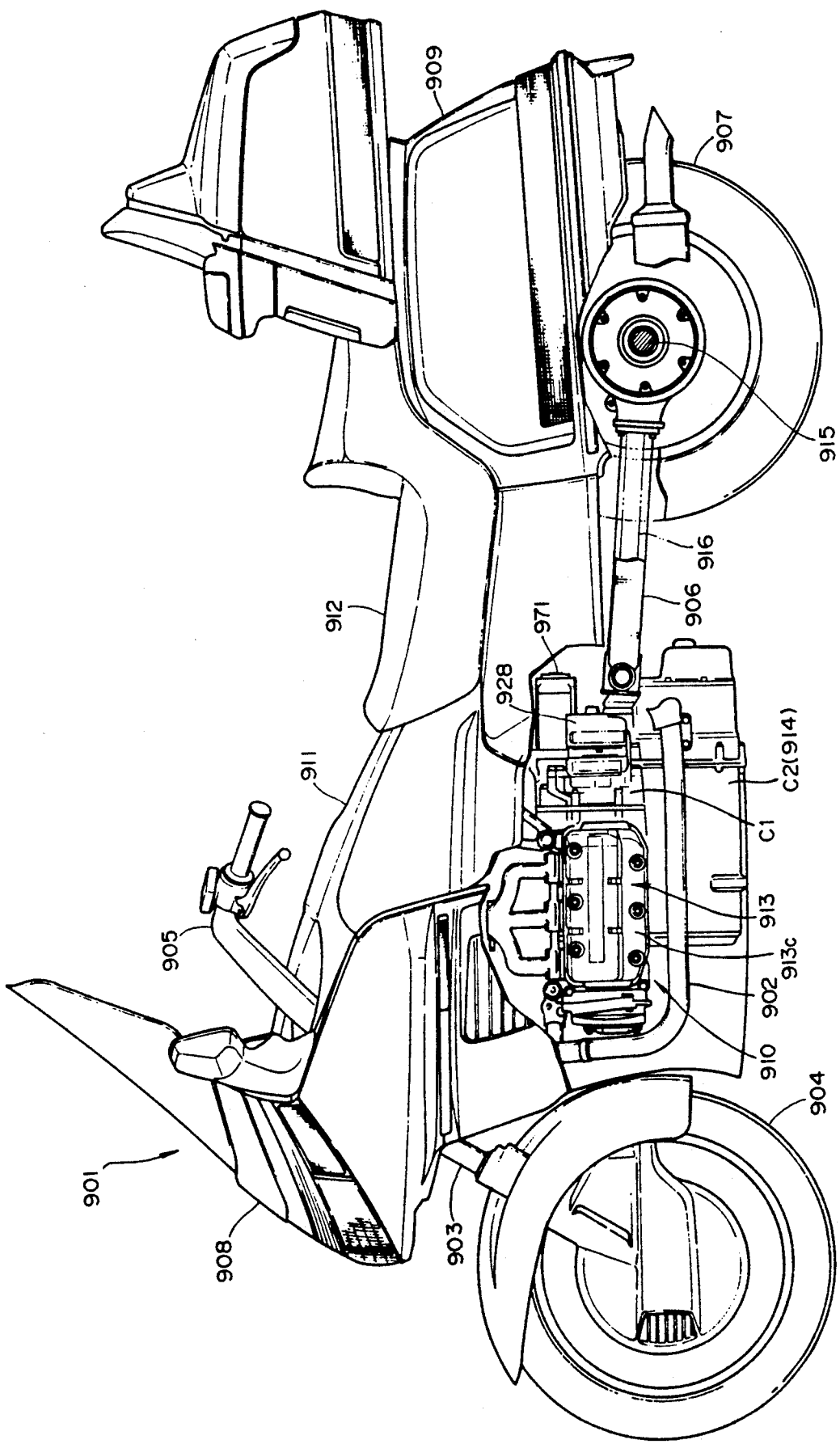

FIG. 43. A side view of an embodiment of the present invention.

Figure 44:
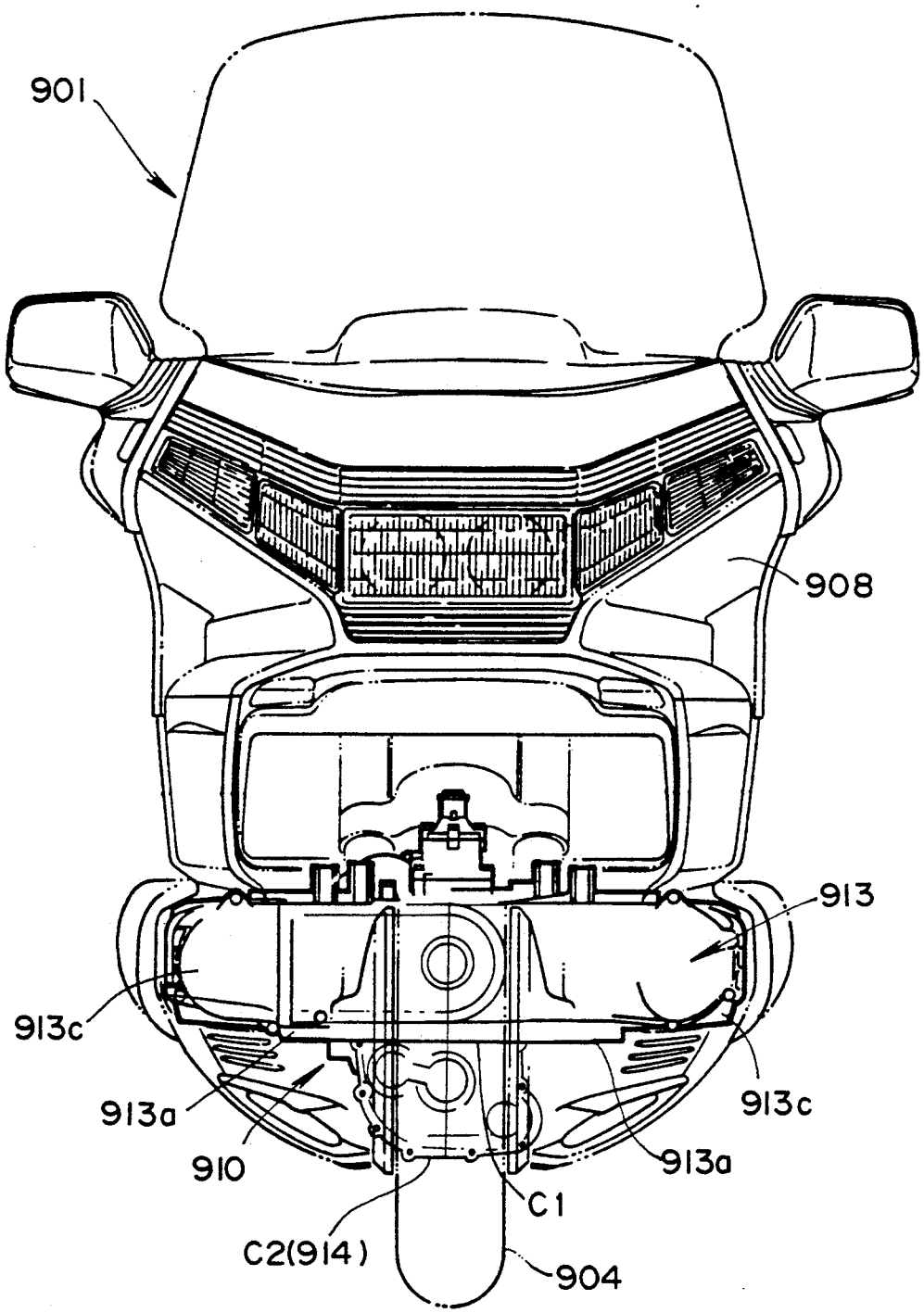

FIG. 44. A front view of an embodiment of the present invention.

Figure 45:
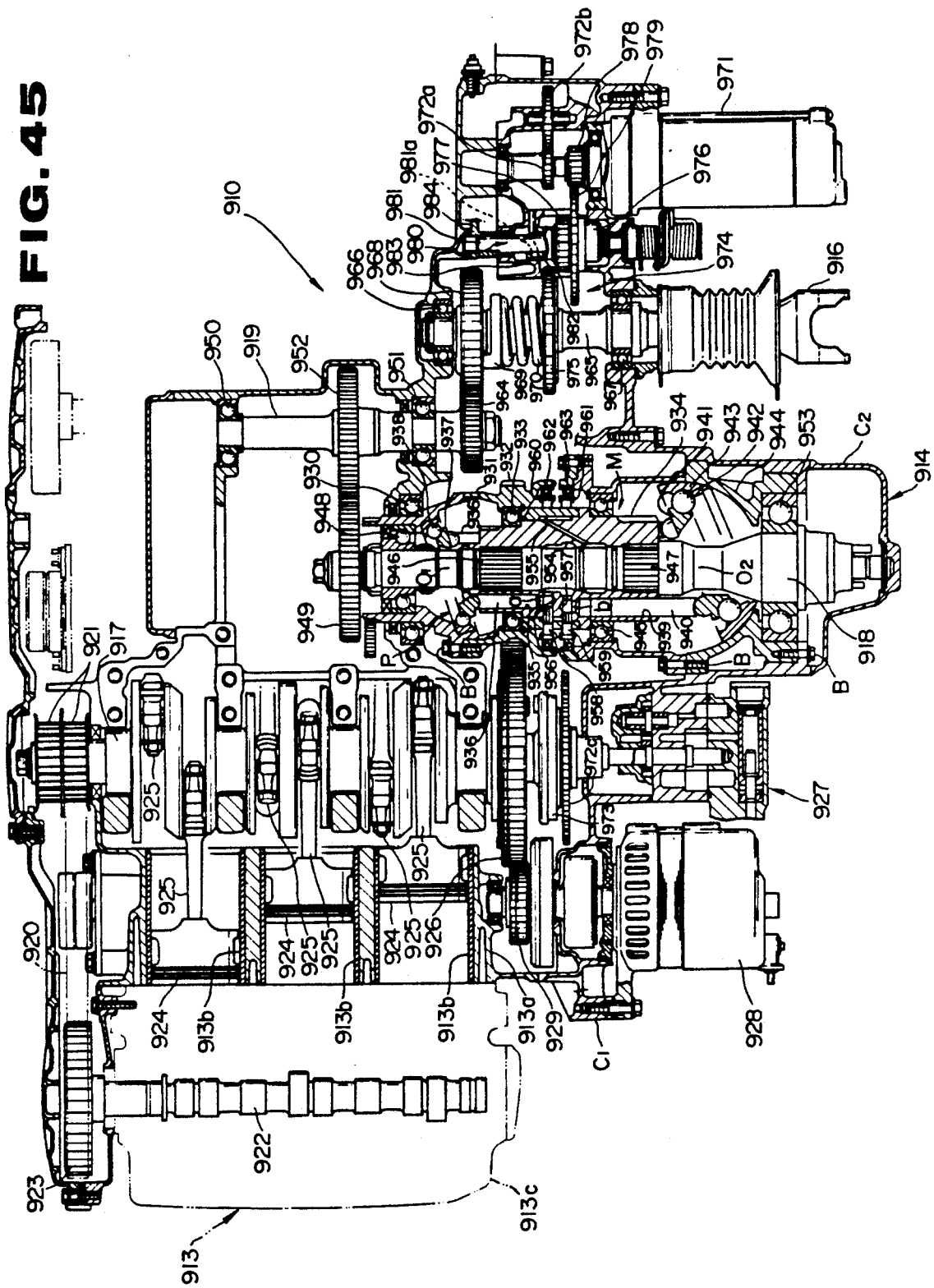

FIG. 45. A sectional view from the top of the engine and transmission.

Figure 46:
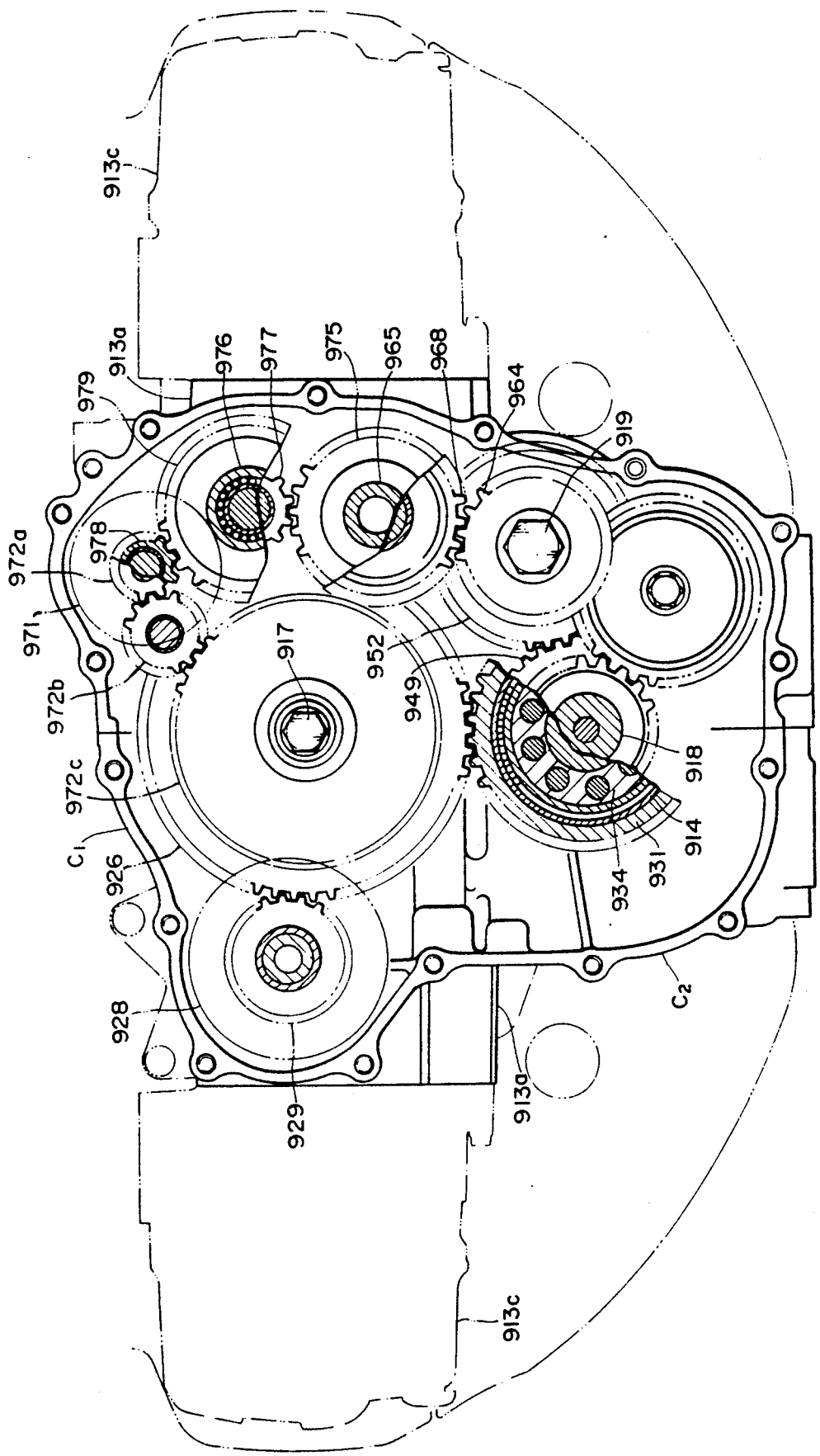

FIG. 46. A front view of the power train.

DESCRIPTIONS OF THE PREFERRED EMBODIMENTS

A first embodiment will now be described based on the drawings. This example is a system applied to a continuously variable hydraulic transmission which is the component of a power unit mounted on a motorcycle.

In FIG. 1 and FIG. 2, element 1 is a motorcycle, and it is equipped with the following: a body frame 2, a front fork 3 rotatably installed to the head pipe 2a set at the front of the body frame 2, a steering handle 4 installed at the upper end of the front fork 3, a front wheel 5 rotatably installed at the lower end of the front fork 3, a rear fork 6 installed to allow up-and-down movement at lower rear of the body frame 2, a rear wheel 7 rotatably installed at the movable end of the rear fork 6, a cushion unit 8 internally installed between the moving center of the rear wheel 6 and the body frame 2, a power unit U installed at the center of the body frame 2 and consisting of an engine E and a continuously variable hydraulic transmission T (hereinafter referred to as a continuously variable transmission), an air cleaner 9 connected to the engine E, a fuel tank 10 and a seat 11 arranged conventionally from front to rear on the body frame 2, steps 12, brake pedals 13 for the rear wheel 7 which are installed at both sides of the body frame 2, a clutch lever 14 installed at one end of the steering handle 4, and an acceleration grip 15 and a brake lever 16 for the front wheel which are both-installed at the end of the steering handle 4 opposite to the end of the steering handle 4 to which the clutch lever 14 is installed.

A crankshaft 17 of the engine E and a power shaft 18 of the continuously variable transmission T, both shafts being part of the power unit U, are arranged so as to be parallel to each other. The continuously variable transmission T is housed in the casing of a crankcase 19 in which the crankshaft 17 is housed. The crankshaft 17 transmits power to the continuously variable transmission T via a chain-type primary reducing apparatus 20, and the continuously variable transmission T can drive the rear wheel 7 by its power shaft 18 via a secondary reducing apparatus 21.

As shown in FIG. 3 and FIG. 4, the above-mentioned continuously variable transmission T is composed of the swashplate type hydraulic pump P with constant volume and the swashplate type hydraulic motor M with variable volume, and the hydraulic pump P and the hydraulic motor M are examples of the application of the hydraulic system H.

The hydraulic pump P is composed of the following: an input cylinder shaft 24 fastened with an output sprocket 22 of the primary reducing apparatus 20 by rivets 23, a pump cylinder 26 fitted to rotate freely in the inside wall of the input cylinder shaft 24 via a ball bearing 25, several pump plungers 28 fitted slidingly into an odd-number of cylinder holes 27 which are bored in the pump cylinder 26 distantly around its rotating axis and in parallel with its axis, a pump swashplate 29 the front of which contacts with outer ends of the pump plungers 28, and a pump swashplate holder 31 which retains the back of this pump swashplate 29 via an angular contact bearing 30 in order to hold this pump swashplate in a definitely tilted condition to the axis of the pump cylinder 26 around the trunnion axis $O_1$ which intersects at right angles with the axis of the pump cylinder 26. This pump swashplate holder 31 is also fixed to the input cylinder axis 24 by the rivets 23.

The angular contact bearing 30 should give a centering action to the pump swashplate 29 in cooperation with the pump swashplate holder 31.

On the other hand, on the above-mentioned pump swashplate 29 where it contacts the pump plungers 28, a convex part 29a, protruding toward the pump plunger 28, is shaped to correspond to each pump plunger 28. On the outer end of each pump plunger 28 (at a place which contacts with the pump swashplate 29) a concave part 28a is shaped so that the convex part 29a of the above pump swashplate may rotatably mate with the concave part 28a. By this device, the pump swashplate 29 can be made to rotate synchronously with the pump cylinder 26. Both the concave part 28a and the convex part 29a are made nearly spherical and the radius of curvature of the former should be a little larger than that of the latter.

The above-mentioned pump swashplate 29 can make the pump plunger 28 repeat suction and discharge strokes by giving reciprocating motion to the pump plunger 28 while the input cylinder axis 24 is rotating. In order to improve the follow-up of the pump plunger 28 after the pump swashplate 29, a coil spring may be placed in the cylinder hole 29 to push the pump plunger 28 toward the pump swashplate 29.

The hydraulic motor M is composed of: a motor cylinder 32 arranged on the left side on the axis of the pump cylinder 26, many motor plungers 34 fitted slidingly in an odd-number of cylinder holes 33 which are bored in the pump cylinder 32 distantly around its rotating axis and in parallel with its axis, a motor swashplate 35 contacting with the outer front of these motor plungers 34, a motor swashplate holder 37 holding the back of the motor swashplate 35 via an angular contact bearing 36, and a motor swashplate anchor 38 supporting the back of the motor swashplate holder 37.

On the other hand, a convex part 35a, protruding towards each motor plunger 34, is shaped on the above-mentioned motor swashplate 35 at points which contact with the motor plungers 34, and a concave part 34a is shaped on the outer end of each motor plunger 34 (at a place which contacts with the motor swashplate 35) so as to let the convex part 35a on the above-mentioned motor swashplate 35 be rotatably movable. By this device the motor swashplate 35 can be made to synchronously revolve with the motor cylinder 32. Both the concave parts 34a and the convex parts 35a are formed spherically, and the radius of curvature of the concave part 34a should be a little larger than that of the convex part 35a.

The surfaces of the motor swashplate holder 37 and the motor swashplate anchor 38 which face each other are spherically shaped with the center of the sphere intersecting the axis of the motor cylinder 32 at the trunnion axis $O_2$.

As just discussed, the radius of curvature of the concave part 34a should be larger than the radius of curvature of the convex part 35a. Such a structure is illustrated in FIG. 3. As seen in FIG. 3, the distance between the convex part 35a and the axis of the motor swashplate 35 (passing through the trunnion axis $O_2$) is greater than the distance between the axis of the associated concave part 34a and the axis of the motor cylinder 32. Thus, as seen from FIG. 4, the center points of engagement between the spherical concave portions of the motor plungers 34 (i.e., the concave parts 34a) and an associated spherical protruding portion of the motor swashplate 35 (i.e., a convex part 35a) are located radially outwardly of the axes of the motor plungers 34 when the convex parts 35a assume a position on a plane perpendicular to the axis of the motor cylinder 32.

For an individual motor plunger 34, this will occur, for example, when the associated convex part 35a passes through a plane containing the trunnion axis $O_2$ and parallel to the axis of the motor cylinder 32, as seen from FIG. 4. As shown in FIGS. 3 and 4, a center point of engagement between the spherical concave portion of the motor plunger 34 (i.e., the concave parts 34a) and an associated spherical protruding portion of the swashplate 35 (i.e., the convex parts 35a) is displaced in an inclined state of the swashplate, in response to sliding motion of the plunger in the cylinder hole 33, between a radially outward side position at which said center point of engagement is located radially outwardly of an axis of the motor plunger 34 with respect to the motor cylinder axis, as illustrated in FIG. 4, and a radially inward position at which the center point is located radially inwardly of the axis of the plunger 34 with respect to the motor cylinder axis, as illustrated in FIG. 3.

As a result, radial forces acting on the swashplate 35 at respective center points of engagement between the spherical concave portions 34a of the motor plungers 34 and the spherical convex portions 35a of the motor swashplate 35 are directed such that the radial forces appearing in the spherical convex portions 35a located on substantially the same diametrical line on the swashplate 35 work to offset each other regardless of the angle of inclination of the swashplate 35 so as to center the swashplate 35. As seen in FIG. 4, when the motor plunger 34 is at an intermediate point in its sliding stroke, the center point of engagement assumes a radially outer side position. As seen from FIGS. 3 and 4, these relationships also apply to the pump swashplate 29, the convex parts 29a, and the concave parts 28a, except that in this embodiment the pump swashplate 29 is set at a fixed angle with respect to the axis of the pump cylinder.

As shown in FIG. 4, the motor swashplate holder 37 is equipped solidly with a pair of semi-cylindrical trunnion elements 37a which are arranged on the trunnion axis $O_2$ intersecting at right angles with the revolution axis of the motor cylinder 32, and are connected rotatably with a pair of semi-cylindrical concave parts 38a that are shaped on both ends of the motor swashplate anchor 38.

If the trunnion element 37a and concave part 38a can prevent the rotation of the motor swashplate holder 37 around the axis other than trunnion axis $O_2$, for instance, then a semi-conical type cam will do instead of the semi-cylindrical type.

And, the above-mentioned angular contact bearing 36 should be constructed to give a centering action to the motor swashplate 35 in cooperation with the motor swashplate holder 37.

The above-mentioned motor swashplate anchor 38 is fixed on the left side wall of a casing 19(c) together with a tubular cylinder holder 39 positioned to the right of the anchor. This cylinder holder 39 holds freely rotatably the peripheral surface of the motor cylinder 32 via a ball bearing 40.

The above-mentioned motor swashplate 35 is movable because of the rotation of the motor swashplate holder 37 between a position perpendicular to the axis of the motor cylinder 32 and its maximum tilting angle. Under the tilting condition, expansion and compression strokes can be repeated by giving reciprocating motion to the motor plungers 34 with the rotation of the motor cylinder 32.

In order to improve the follow-up of each motor plunger 34 to the motor swashplate 35, a coil spring may be placed in the cylinder hole 33 to press the motor plunger 34 toward the motor swashplate 35.

Both the above-mentioned pump cylinder 26 and the motor cylinder 32 are butted in an axial direction where they are solidly beam-welded to assemble a cylinder block B.

Here, the connecting method between above-mentioned pump cylinder 26 and motor cylinder 32 shall be explained as follows with reference to FIG. 5.

In order to make this connection, a nearly conical-shaped contacting surface 26a should be formed inside of the above-mentioned pump cylinder 26. On the inner surface of the motor cylinder 32, a convex part 41 is formed which has an outer surface to be entirely contacted with the contacting surface 26a of the above-mentioned pump cylinder 26. Furthermore, at the outer surfaces of both the cylinders 26, 32, outer flanges 42, 43 are furnished to make contact with each other.

After being thus prepared both cylinders 26, 32 under specified pressure are butted together, the outer surface of the convex part 41 and contacting surface 26a, and both flanges 42, 43 are closely contacted. An electron beam is then radiated, as shown by arrow mark (a) nd (b) in FIG. 5, to the butted part of both flanges 42, 43 and the butted place of the convex part 41 and contacting surface 26a to weld all of the circumference, followed by solidifying firmly both cylinder 26, 32.

Because the welded part protrudes inside or outside from the base of both cylinders 26, 32, the effect of welding the base will be controlled and the space between both cylinders 26, 32 will be kept hermetic due to close welding at the outside and inside circumferences of the butt welded base. As stated before, because the welded plane is located outside of the base, the distance of two valve holes 65, 66 furnished at its base can be possibly shortened.

Other than the above-mentioned welding method, the method shown in FIG. 12 and FIG. 13 can be adopted for the welding of the cylinders 26, 32. The method shown in FIG. 12 eliminates the welding done inside of both cylinders 26, 32, and is accomplished as follows: After both the outer surface of the convex part 41 shaped on the motor cylinder 32 and the contact surface 26a of the pump cylinder 26 are made parallel to the rotating axis of each cylinder 26, 32, the above-mentioned convex part 41 is compressibly fitted to the inner surface of the pump cylinder 26 by which the positioning of both cylinders 26, 32 will be completed. A suitable insertion length L can be sufficient to endure the outer forces, such as bending or twisting, acting on the cylinder block B.

By the above-mentioned procedures, welding distortion is lessened. This may be accomplished by eliminating welding in the vicinity of the spot where dimensional precision is of utmost importance (for instance between two holes given by $L_1$ in FIG. 12) in its own or between two parts such as valve holes 65, 66.

The welding method shown in FIG. 13 is a method to make the pressurized insertion part between the convex part 41 and the contact surface 26a in FIG. 12 be parallel to the rotational axis o the cylinder block B and be near this rotation axis. By this procedure, both the elimination of any gap between butted surfaces and the correct relative positioning of the two cylinders 26, 32, both of which are required for beam welding, can be simultaneously satisfied.

The center of the cylinder block B constructed as above is pierced through by the above-mentioned output shaft 18. Further, as shown in FIG. 3 and FIG. 4, because of the fitting between individually shaped splines 18a, 32a, the cylinder block B is controlled from relative rotation around the output shaft 18. Because of the contact between the boss 18b furnished in the midst of the spline 18a of the output shaft 18 and the inner end of spline 32a in the cylinder block B, a position is established longitudinally along the output shaft 18.

The right end of the output shaft 18 (right side of FIG. 3 and FIG. 4), piercing the pump swashplate 29 and pump swashplate holder 31, supports the back of the pump swashplate holder 31 and is fitted into the holding cylinder 44. The holding cylinder 44 pierces the center of the pump swashplate holder 31 via a needle bearing 45 and is fixed solidly to the large rigid flange 47 keeping the back of the holding cylinder 44 via a thrust roller bearing 46.

On the other hand, the left end of the output shaft (left side of FIG. 3 and FIG. 4) extends to pass through the motor swashplate anchor 38. The circumference of this left end is attached by holding cylinder 49 fixed with a halved cotter 48 via a spline 18c the outer end of this holding cylinder 49 near the motor swashplate anchor 38 is fitted with a retainer 51 via a needle bearing 50. This retainer contacts with the back of above-mentioned motor swashplate anchor 38 and simultaneously is supported towards the output shaft 18. The retainer 51 is free to rotate while supporting the motor swashplate anchor 38.

Between the holding cylinder 49 and the cylinder block B, a spacer 53 and holding ring 54 are fastened, fixed on the output shaft 18 via the spline 18a. Because this spacer 53 and the holding ring 54 are pressed by the holding cylinder 49, the cylinder block B is connected to the boss 18b furnished on the output shaft 18.

Because the halved cotter 48 is inserted into the holding plate 55a via spline 18c to the end of the output shaft 18 to hold the input sprocket 55 comprising the above-mentioned secondary reducing apparatus 21, the halved cotter 48 is prevented from coming off. The input sprocket 55 is prevented from coming off due to the bolt 56 screwed in the end of the output shaft 18.

As stated above, all composing parts of the transmission T, from the output sprocket 22 to the halved cotter 48, are assembled as one block on the output shaft. Therefore, the transmission T can be easily assembled or disassembled.

When assembling the transmission T in the casing C, the pump swashplate holder 31 is supported to the right wall of the casing C via a ball bearing 57, and the motor swashplate anchor 38 is fixed on the left wall of the casing C by a bolt 58. On the right wall of the casing C, a cap 60 for shutting the service opening 59 is fixed with a bolt 61; and on the left wall of casing C, an oil seal 62 contacting closely to the outer surface of the holding cylinder 49 is inserted.

Furthermore, the hydraulic motor M is equipped with the holding ring 54 between the motor swashplate 35 and the motor cylinder 32 in order to secure mutual torque transmission between a motor plunger 34 and the motor swashplate 35.

As shown in FIG. 6A and FIG. 6B in detail, the outer surface of the holding ring 54 is furnished with the protrusions 54a, which can extend between convex parts 35a of the motor swashplate 35. These protrusions 54a prevent positional shift between the motor plunger 34 and the motor swashplate 35 around the output shaft 18 to insure torque transmission.

This type of construction is also applicable to the side of the hydraulic pump P.

As shown in FIG. 3 and FIG. 4, between the group of cylinder holes 27 of a pump cylinder 26 and the group of cylinder holes 33 of a motor cylinder 32, the cylinder block B is equipped with the following: a ringed inside oil path 63 and an outside oil path 64 arranged concentrically around the center of the output shaft 18, the above-mentioned cylinder holes 27, 33 penetrating radially through both the ringed wall between the oil paths 63, 64 and the outer wall of the outside oil path 64, the primary valve holes 65 and the secondary valve holes 66 equal in number to the cylinder holes, connecting oil paths 67, 68 which couple the valve holes 65, 66 to the outside oil path 64, a pump port "a" which connects a mutually neighboring cylinder hole 27 and the primary valve hole 65, and several motor ports "b" connecting a mutually neighboring cylinder hole 33 and the secondary valve hole 66.

The inside path oil path 63, forming a ringed channel inside of the cylinder block B, is covered by the outer surface of the output shaft 18. And the outside oil path 64 forms a ringed channel on the contacting surfaces of the pump cylinder 26 and the motor cylinder 32, and is completely inside of the cylinder block B due to the unification of both cylinders 26, 32.

The above-mentioned connecting oil path 67, 68, the pump port "a" and the motor port "b" are arranged over the primary and the secondary valve holes. This purpose is to provide for uniform operating oil pressure on the outer surface of distributing valves 69, 70 that are described later and to facilitate the action of each distributing valve 69, 70.

The outside oil path 64, both valve holes 65, 66, and the connecting oil paths 67, 68 are shaped by later working on the pump cylinder 26 and the motor cylinder 32, and are completed by unification after washing both cylinders 26, 32. Therefore, there should be no chip left when cutting them, and the smooth sliding motion of the primary and secondary distribution valves 69, 70 may be kept for long duration.

As shown in FIG. 11A and FIG. 11B, the primary valve hole 65 is fitted slidingly with the spool-type primary distribution valve 69, and the secondary valve hole 66 with the spool-type secondary distribution valve 70. The outermost end of the primary distribution valve 69 is connected with the primary eccentric ring 69 and the outermost end of the secondary distribution valve 70 with the secondary eccentric ring 72 via, respectively, two ball bearings 73, 74. In order to make this connection sure, the outermost end of the primary distribution valve 69 is connected with the primary compulsory ring 75 holding concentricity with the primary eccentric ring 71. The outermost of the secondary distribution valve 70 is connected with the secondary compulsory ring 76 holding concentricity with the secondary eccentric ring 72.

The primary eccentric ring 71 is fixed on the outer surface of the input cylinder axle 24 via a bolt 77 and, as shown in FIG. 7, is held at the position specified distance $e_1$ apart from the center of the output shaft 18 along the supposed trunnion axle line $O_1$.

Thanks to this construction, when relative rotation takes place between the input cylinder axle 24 and the pump cylinder 26, each of the primary distribution valves 69 reciprocates in the primary valve hole 65 due to the primary eccentric ring 71, with twice the eccentricity $e_1$ as one stroke, between inner and outer directions toward the radius of the pump cylinder 26. And, as shown in FIG. 7, in discharge area D of the oil hydraulic pump P, the primary distribution valve 69 is transferred to the above-mentioned inner position and connects the corresponding pump port "a" to the outside oil path 64 and simultaneously disconnects the inside oil path 63, followed by the pressurized sending of operating oil to the outside oil path 64 from the cylinder hole 27 due to the plunger pump 28 under discharge stroke. In the suction area S, the primary distribution valve 69 is transferred to the above-mentioned outside position and connects the corresponding pump port "a" to the inside oil path 63 and simultaneously disconnects from the outside oil path 64, followed by the suction of operating oil into the cylinder hole 27 from the inside oil path 63 due to the plunger pump 28 under a suction stroke.

On the other hand, if the motor cylinder 32 rotates, each secondary distribution valve 70 makes reciprocating motion, as shown in FIG. 8, at the secondary valve hole 66, due to the secondary eccentric ring 72, with twice the eccentricity $e_2$ as one stroke between inner and outer direction towards the radius of the pump cylinder 32. And, in expansion area $E_x$ of the hydraulic motor M, the secondary distribution valve 70 is transferred to the above-mentioned inner position and connects the corresponding pump port "b" to the outside oil path 64 and simultaneously disconnect the inner oil path 63, which is followed by the supply of high pressurized operating oil to the cylinder hole 33 of the motor plunger 34 under an expansion stroke from the outside oil path 64. In compression area $S_h$, the secondary distribution valve 70 is transferred to the above-mentioned outer position and connects the corresponding motor port "b" to the inside oil path 63 and simultaneously disconnects the outside oil path 64 which is followed by the discharge of operating oil from the cylinder hole 33 of the motor plunger 34 under a compression stroke to the inside oil path 63.

The pump plunger 28, in discharge area D, sends pressurized operating oil to the outside oil path from the cylinder hole 27, and, in suction area S, sucks the operating oil from the inside oil path into the cylinder hole 27. The pressurized operating oil sent to the outside oil path 64 is supplied to the cylinder hole 33 of the motor plunger 34 which remains in the expansion area $E_x$ of the hydraulic motor M, and on the other hand, operating oil is discharged from its cylinder hole 33 to the inside oil path 63 due to the motor plunger which remains in the compression area $S_h$.

During these operations, due to the reaction torque given to the pump cylinder 26 from the pump swashplate 29 via the pump plunger under a discharge stroke plus the reaction torque given to the motor cylinder 32 from the motor swashplate 36 via the motor plunger 34 under an expansion stroke, the cylinder block B rotates and its rotating torque is transferred from the output shaft 18 to the secondary reducing apparatus 21.

In this case, the speed change ratio of the output shaft 18 to the input cylinder axle 24 is given as follows:

$$\text{Speed change ratio} = \frac{\text{volume of hydraulic motor } M}{\text{volume of hydraulic pump } P} + 1$$

Therefore, if the volume of the hydraulic motor M is varied from zero to some definite value, the speed change ratio can be changed from one to a certain value. Additionally, the volume of the hydraulic motor M is determined by the stroke of the motor plunger 34, and if the motor swashplate 35 is tilted from upright position to a certain tilted position, the speed change ratio can be changed continuously from one to a certain value.

While the transmission T is operating, the pump swashplate 29 receives a thrust load from the pump plunger group 28 and the motor swashplate 35 receives a counteracting thrust load from the motor plunger group 34. The thrust load acting on the pump swashplate 29 is transferred to the output shaft 18 via an angular contact bearing 30, the pump swashplate holder 31, the thrust roller bearing 46, and the flange 47. The thrust load acting on the motor swashplate 35 is transferred to the output shaft 18 via the angular contact bearing 36, the motor swashplate holder 37, the motor swashplate anchor 38, the trust roller bearing 52, the holding cylinder 49 and the cotter 48. Therefore, the above-mentioned thrust load gives a torsional load only to the output shaft 18 and not to the casing C holding the shaft 18.

In this case, because the front surface of the motor swashplate holder 37 is supporting the motor swashplate via the angular contact bearing 36 and its back surface is simultaneously supporting the motor swashplate anchor 38, no strain is generated even if it receives a thrust load from the motor plunger group 34 via the motor swashplate 35. Additionally the motor swashplate holder 37 and the motor swashplate anchor 38 are spherically formed with the sphere center at the intersecting point between the axis line of the cylinder 32 and the trunnion axis line $O_2$. Therefore, the motor swashplate holder 37 can exert a centering function by means of mutual action between the spherical surfaces. As a result, the motor swashplate holder 37 can smoothly rotate around the trunnion axis line $O_2$, and the slanting angle of the motor swashplate 35 can be easily controlled. In this case, the connection of the trunnion shaft 37a of the motor swashplate holder 37 and the concave part 38a of the motor swashplate anchor 38 prevents the rotation of the motor swashplate holder 37 around the axis line other than around the trunnion axis line $O_2$. Because the thickness of the motor swashplate anchor 38 increases from the center to the periphery because of its spherical surface, its high rigidity can satisfactorily endure the large load applied from the motor swashplate holder 37 and thrust roller bearing 52.

Furthermore, due to the action of the stopping ring 54, the relative rotation between the motor plunger 34 and the motor swashplate 35 is eliminated even when under high load; and the motor swashplate 35 is surely rotated and driven.

And, in the hydraulic pump P and hydraulic motor M each of the swashplates 29, 35 receives the front and back centering action resulting from the combining between the concave parts 28a, 34a of corresponding plungers 28, 34 and the convex parts 28a, 34a of corresponding plungers 28, 34 and the convex parts 29a, 35a of each swashplate, and due to the angular contact bearings 30, 36. Therefore, they can precisely rotate synchronously with the cylinder block B by maintaining a mating position under any tilting condition.

As shown in FIG. 3, FIG. 4, and FIG. 9, the cylinder block B is equipped with a clutch mechanism K. This clutch mechanism K is composed as follows: a clutch hole 80 furnished in the cylinder B which penetrates the outside oil path 64 along the rotating axle line of the cylinder block B, a tubular both-ends-opened valve sheet 81 which is fixed in this clutch hole 80 and connected to the outside oil path 64 at the middle of the clutch hole 80, a clutch valve 82 which is slidingly fitted in this valve sheet 81 and opens or closes both ends of this valve sheet 81, a working ring 83 having a connected piece 83a connected longitudinally with one end of the clutch valve 82 and inserted slidingly along the outer circumference of the cylinder block B, an operating panel 84 which is connected to nearly half of the circumference of a ringed groove 83b formed about the circumference of this working ring 83, a pair of guide pins 85 slidingly retaining this operating panel 84 at the point parting angularly 90 degrees from the cylinder block B due to holding the panel by the motor swashplate anchor 38 and cylinder holder 39 and by penetrating the operating panel along revolving axis line of the cylinder block B, a return spring 86 which is positioned between the operating panel 84 and the motor swashplate anchor 38 and accelerates the panel 84 to the clutch-on position, broken-line in FIG. 3 and FIG. 4, and the press mechanism 87 which can move the operating panel 84 to the clutch-off position, broken-line in FIG. 4.

In this example, the clutch hole 80, the valve sheet 81, and the clutch valve 82 are set equidistantly at three points along the circumference of the cylinder block B as shown in FIG. 9.

Additionally, the above-mentioned press mechanism 87 is composed as follows: an operating rod 89 which is kept by a cylinder holder 39 via the ball bearing 88 and is protruded outside with penetration through the casing C, a driven cam 91 which is kept by the cylinder holder 39 via the ball bearing 90 and is solidly rotatably attached to the operating rod 89, and a follower cam 92 which is slidingly contacted to this driven cam 91 from the longitudinal direction of the operating rod 89 and is fixed solidly to the operating panel 84.

The projected end of the above-mentioned operating rod 89 is connected to the clutch lever 14 with such as wire, and, with revolutionary operation by the clutch lever 14, the driven cam 91 is to rotate and the follower cam 92 is to shift together with the operating panel 84 in the direction for parting from the operating rod 89. Thereafter, the working ring 83 and each clutch valve 82 can be shifted to the clutch-off position.

When the clutch valve is shifted to the clutch-off position, the valve sheet 81 is released at both sides and simultaneously the outside oil path 64 is connected to the outside of the cylinder block B, which is followed by discharge of operating oil in the outside oil path 64.

Accordingly, with no supply of high-pressurized operating oil in the hydraulic motor M, the power transmission between the hydraulic pump P and hydraulic motor M is cut off and a clutch-off condition results.

In FIG. 3, the above-mentioned trunnion axis is connected with the transmission control device V in order to control the angle of the motor swashplate.

This transmission control device V is equipped with an electric motor such as a pulse motor or a d.c. motor, which is reversible, a reducing gear train 100 connected to this motor, and a bolt and nut mechanism 101 connected to the reducing gear train 100. The bolt and nut mechanism 101 is composed of a screw shaft 102 and a nut 104 which mates with the screw shaft 102 via a circulating ball 103; and the screw shaft 102, connected to output gears of the reducing gear train 100, is sustained freely rotate by the casing C via ball bearings 105, 106 at both ends. One end of the nut 104 has a connecting arm 107. The nut 104 and the motor swashplate holder 37 are connected because of the relation between the connecting arm 107 and connecting pin 108 which is fixed parallel with the trunnion axis line $O_2$ at one side of the motor swashplate holder 37. Because of this connection, the rotation of the nut 104 around the screw shaft 102 is prevented.

Thus, if the screw shaft 102 is rightly rotated by the right running of a motor, the nut 104 moves to the left side in FIG. 3 and the motor swashplate holder 37 rotates around the trunnion axis line $O_2$ via the connecting arm 107 and the connecting pin 108, which causes the motor swashplate 35 to stand up. On the contrary, if the motor rotates counterwise, the nut 104 moves to the right side and the motor swashplate 35 is allowed to tilt.

As shown in FIG. 3 and FIG. 4 the center of the output shaft 18 is pierced with the center oil path 110, one end of which is closed by the bolt 56 and the other end of which is open as an inlet, and the oil filter 111, facing to the open end, is fastened to the above-mentioned cap 60.

The inlet to the center oil path 110 is connected to the oil sump 113 set at the bottom of the casing C via the oil path 112 provided in the casing C. Midway on the above-mentioned oil path 112, the oil pump 115 is set which is driven by the gear 114 fixed on the pump swashplate holder 31. Therefore, while the engine E is running, the oil in the oil sump 113 is continuously supplied to the center oil path 110 by means of the oil pump 115.

As shown in FIG. 10, the valve cylinder 116, both ends of which are opened, is fitted by the center of this center oil path 110, and this valve cylinder 116 is pierced by the fixing pin 117 which is inserted with pressure in the output shaft 18 at its diameter and by which the valve cylinder 116 is fixed on the output shaft 18. The fixing pin 117 has a hollow space 118, both ends of which are opened to the inside oil path 63, and has several connecting holes 119 connecting this hollow space 118 to the valve cylinder 116.

Therefore, both the center oil path 110 and the inside oil path 63 are connected through the valve cylinder 116 and the fixing pin 117.

The outside surface of the valve cylinder 116 has a chamfered place 120 which connects up stream and down stream of the center oil path 110.

Inside of the valve cylinder 116, a pair of the primary check valves 121 are symmetrically set to put centrally the fixing pin 117 with the purpose to check the counterflow of oil from the inside oil path 63 to the center oil path 110. Each check valve 121 can always accelerate the flow towards closing valve direction due to the valve spring 122.

Additionally, the output shaft 18 and the cylinder block B are furnished with a set of oil supply paths 123 connecting the center oil path 110 through the chamfered part 120 in the valve cylinder 116 and the outside oil path 64, and in the midst of the oil supply paths 123 the secondary check valve 124 is installed, which prevents oil counterflow from the outside oil path 64 to the center oil path 110. The check valve 124 can always accelerate the flow towards closing valve direction due to the valve spring 125.

On a suitable place on the output shaft 18, an orifice 126 is bored in the radial direction in order to supply lubricant to required parts of the transmission T from the center oil path 110.

If, however, the pressure in the inside oil path 63 of the low pressure side lowers below that in the center oil path 110 by oil-leaking at the closed circuit for oil pressure between the hydraulic pump P and hydraulic motor M during an ordinary loading run to drive them using oil pressure, the operation oil is supplied from the central oil path 110 to the inside oil path 63 due to opening of the primary check valve 121. On the other hand, oil flowing out from the outside oil path 64 of the high pressure side to the center oil path 110 is prevented by the secondary check valve 124.

While running under counter load, that is, under engine brake, the hydraulic motor M functions as a pump and the hydraulic pump P as a motor. If the pressure of the outside oil path 64 lowers below that of the center oil path 110 due to oil-leaking because the inside oil path 64 changes to lower pressure and the inside oil path 63 gets higher pressure, the operating oil is supplied to the outside oil path 64 from the center oil path 110 by the opening of the secondary check valve 124. Therefore, the flow of oil from the inside oil path 63 to the center oil path 110 is checked by the above-mentioned primary check valves 121.

The quantity of oil in the center oil path 110 provided to every part of the transmission T from the orifice 126 is limited. Therefore, the oil pressure at the center oil path 110 does not get lower excessively because the above-mentioned supply; and there will be no hindrance of operating oil supply to the inside oil path 64 from the center oil path 110.

As shown in FIG. 7 and FIG. 10, the cylinder block B is equipped with a pressure-control valve 130 to prevent excessive increase of oil pressure in the outside oil path 64. This pressure-control valve 130 is composed of a valve cylinder 131, valve body 132, and valve spring 133.

The valve cylinder 131 is inserted with pressure into the partition between the inside and outside oil paths 63, 64 and the wall of the outside oil path 64 piercing it in the radial direction. This valve cylinder 131 is composed of the following: a side hole 134 opening at the outside oil path 64, a longitudinal valve hole 135 connecting the side hole 134 and the outside oil path 64, a guide hole 136 of a little larger diameter than the valve hole 135 and extending from the side hole 134 in the opposite direction from the valve hole 135, and a spring chamber 137 of large diameter and connected to the guide hole 136.

The above-mentioned valve body 132 is composed of such as, a valve proper 132a which is set inside the side hole 134 and fits with the valve hole 135, a valve rod 132b fitting with the guide hole 136, and a flange-type stopper part 132c contacting with the boss between the guidance hole 136 and the spring chamber 137. The stopper part 132c is usually kept at a position rear to the above-mentioned boss by means of the valve spring 133 contained in the spring chamber 137. The spring chamber 137 connects to the inside oil path 63 lest it should prevent the operation of the valve body 132.

The stepped surface between the valve proper 132a and the valve rod 132b is pressurized with oil from the outside oil path 64, which gives valve-opening power to the valve body 132. However, under ordinary running where the oil pressure at the outside oil path 64 is less than a specified value, the valve body 132 is kept in the open state, that is the condition with the valve hole 135 closed, because the power of the valve spring 133 tending to open the valve body 132 is stronger than the valve-opening power. When the oil pressure of the outside oil path 64 gets stronger than a specified value, because the valve-opening force becomes stronger than the power of the valve spring 133, the valve body 132 makes the valve spring 133 open slidingly with pressure, that is, the valve hole 135 is opened. Therefore, excessive oil pressure in the outside oil path 64 is discharged out of the cylinder block B through the valve hole 135. When oil-pressure in the outside oil path 64 recovers to a specified value, the valve body 132 is closed by the power of the valve spring 133. Accordingly, even when sudden starting or sudden acceleration of a motorcycle, the excessive increase of oil pressure in the outside oil path 64 is controlled.

In order to check the excessive increase of oil pressure in the inside oil path 63, additionally, the cylinder block B is equipped with a throttle hole 138 connecting the inside oil path 63 and the center oil path 110. Therefore, even with emergency engine braking, the excessive increase of oil pressure in the inside oil path is checked.

As shown in FIG. 3, the flange 47, fixed solidly with the output shaft 18, has a lot of teeth 139 at its circumference and is attached with a motor for combined use. The pickup coil 140, which is facing to its circumference, is screwed in the casing C. The pickup coil 140 generates a pulse corresponding to the revolutions of the output shaft 18, which is converted to an electric current or voltage. This can be displayed as speed on a speed meter, which is not shown, or as a speed signal on the control signal for speed change.

Here the above-mentioned exemplified and constructed swashplate type hydraulic system H has the convex parts 29a and 35a, which are facing to the pump plunger 28 and motor plunger 34, on the pump swashplate and motor swashplate. It has concave parts 28a, 38a, which are to mate with the convex parts 29a, 35a, on the end of each of the plungers 28, 34. Therefore, the swashplates 29, 35 are thickened where load is concentrated and there is contact with the plungers 28, 34.

Because the strength of the swashplates 29, 35 is improved, larger freedom in design about these swashplates 29, 35 and neighboring parts is realized. Accordingly, the possibility of selecting advantageous construction around each swashplate 29, 35 is enhanced. For instance, the dimensional design of the angular contact bearing 30, 36 backing each swashplate 29, 35 may be remarkably enlarged.

The contact position between each swashplate 29, 35 and the plungers 28, 34 is transferred to the cylinder block B, which results in lessening the protrusion of each cylinder 28, 34 from the cylinder block B. Therefore, even when the side pressure of each swashplate 29, 35 acts on the plungers 28, 34, the moment caused by this side pressure is kept small and the sliding resistance on each plunger 28, 34 will be lightened.

Furthermore, because of improved strength at the contact location between each swashplate 29, 35 and the plungers 28, 34, on the whole, the strength of the swashplate 29, 35 and other parts can be reduced. In this exemplified case, avoiding interference with the output shaft 18, the tilting range of these swashplate 29, 35 can be enlarged due to the enlargement of inner diameter of the swashplate 29, 35. Therefore, the modification of characteristics in the hydraulic system H becomes practicable due to the large stroke of each plunger 28, 34, and especially the speed change ratio can be improved.

In the case of a constant tilting angle of each swashplate 29, 35, the output shaft diameter can be enlarged due to the large distance between these swashplates 29, 35 and the output shaft 18 at the maximum tilting position of these swashplates 29, 35. In the case of the above-mentioned continuously variable transmission T, the improvement of transfer torque may be anticipated.

Furthermore, the foregoing is only one example, and various modifications are possible in order to accommodate variations in design and utility requirements. For instance, in the above-mentioned example, when the pump cylinder 26 and motor cylinder 32 are welded at their outer circumference, the method of shaping each circular flange 42, 43 and then welding circular flanges 42, 43 all around the circumference is suggested. But instead as shown in FIG. 14, the following method is adaptable: the circumference of the pump cylinder 26 and motor cylinder 32 is wavily shaped, that is, providing dented places to avoid the connecting oil path 67(68) or the clutch hole 80, which are welded to follow their outer shape.

The welding of this type may result in light-weighting of each cylinder 26, 32 by partly notching and in the improvement of welding strength due to the elongation of the welding line. When the wavy circumference is beam-welded, it is important to make the radiating energy to the welded part constant by keeping the distance between the welded part and welder constant.

As shown in FIG. 15 the supporting construction 200 is orderly equipped with the following: an attaching axle 20 which is rotatably supported, a cam plate 202 which is solidly attached to the attaching axle 201 and has the same outer shape as the outer circumference of each above-mentioned cylinder 26, 32, a driving gear 203 attached at one end of the attaching axle 201, a supporting apparatus 207 consisting of a pressing part 204 screwed to one end of the attaching axle 201 and a fixing nut 205 and a centering spindle 206 fitted at the other end of the attaching axle, a cam follower 208 contacting slidingly with the outer circumference of the cam plate 202, and a copying apparatus 210 equipped with springs 209 pressing this cam follower 208 to the cam plate 202. The cylinder block B is held between the cam plate 202 and the pressing part 204 when positioned with the cam plate 202, and welder 211 is attached to the above-mentioned copying apparatus 210.

When the attaching axle 201 is driven to rotate and an electron beam is radiated from the welder 211 to the cylinder block B, uniform welding is possible because the distance the welder 211 is kept constant by the copying apparatus 210.

In the above-mentioned example, the cylinder block B is halved on the centerline normal to the axis. Instead the cylinder block B can be cut into three parts. In this case, the inside oil path 63, the outside oil path 64, each valve hole 66, 65, the pump port "a", the motor port "b", and the connecting oil paths 67, 68 are finished with end surface working. Because of welding of the three parts immediately after a washing operation, the cylinder block B is free from chips or the like.

As mentioned above, the swashplate hydraulic system relating to this invention shall be the system that: is equipped, with the cylinder, with plural plungers which are distantly arranged around a center line of the cylinder and which are fitted to the cylinder to slide along the axis parallel to its center line, and with the swashplate which contacts the outer end of these plungers and which is swayably arranged about a center that intersects with the center line of the cylinder. It is capable of discharging and sucking operating oil by the reciprocating motion of above-mentioned plungers due to the sway of the swashplate. It has the features that the swashplate has convex parts, protruding to the plunger side, on the contacting surface with these plungers, and that these plungers have concave parts at their outer ends which can mate with the convex parts of the swashplate. Such a design possesses superior advantages such as enhanced strength of the swashplate even when constant thickness is required and a reduction of sliding resistance to the plungers due to the reduction of loading in the direction at right angles to the cylinder centerline due to the reduction in the protrusion of the plungers from the cylinder.

A second embodiment of the present invention is described by referring to FIG. 17 and FIG. 19 as follows:

FIG. 17 is a side view of the entire body of the embodiment, wherein element 101 is a body frame extending from the front to the rear of the body (from the left to the right in the figure), 102 is a front fork attached to the front end of the body frame 101, 103 is the front wheel which is supported at the top end of the front fork 102 so that it can rotate freely, 104 is a handle for steering the front wheel 103, 105 is a front cover for covering the front fork 102, 106 is a seat for the driver, 107 is a body cover which is provided for covering the body under the seat 106.

Under this seat 106, there is a power unit 111 of the swing unit type in which an engine 108, which is covered by the body cover 107, and a transmission mechanism 110 for transmitting the power of this engine 108 to a rear driving wheel 109, are built in. This power unit 111 and the rear wheel 109, which is linked to the former, are linked by a link mechanism 112 so that they can swing freely in the vertical directions (up and down) against said body frame, and are supported by the body frame 101 via a cushion unit 113.

The engine 108, as shown in FIG. 19 (in the figure the left side is the front of the body), comprises a cylinder 114, a piston 115 which is inserted in this cylinder 114, a crankshaft 118 which is rotated via a connecting rod 117 by the reciprocal movement of the piston 115, and a camshaft 120 which is interlocked with this crankshaft 118 and has a cam 119 which operates a valve (not shown in the figure).

The engine 108 is housed in an engine case 121 so that the axis line of the crankshaft extends in the front-rear direction of the body (the left-right direction in the figure) by nearly coinciding with the center line of the body.

Incidentally, elements 122 and 123 in FIG. 19 are an AC generator 122 which is fixed to the front end of the crankshaft 118 and a cooling fan 123, respectively, and there is formed a vent hole 124 in a face of the engine case 121 opposite to the cooling fan.

The transmission 110 is the shaft drive type and comprises a continuously variable hydraulic transmission (hereinafter called simply as the continuously variable transmission) T, a joint 125, a drive shaft 126, and a pair of bevel gears (not shown in the figure) housed in a gear case 127, arranged in this order from the engine 108.

The continuously variable transmission T, when explained based on FIG. 19, comprises a swashplate type hydraulic pump (hereinafter called simply as the hydraulic pump) P of the fixed capacity type, and a swashplate type hydraulic motor (hereinafter called simply as the hydraulic motor) M of the variable capacity type, and is housed in a casing C.

Said hydraulic pump P comprises an input cylinder 129 which has an output sprocket wheel 128 around its periphery, a pump cylinder 131 which is fitted via a ball bearing 130 to the inner wall of this input cylinder 129 so that it can rotate freely, an odd number of cylinder holes 132 which are formed and arranged in a ring on the pump cylinder 131 so that they surround the rotation center, pump plungers 133 each of which is slidably fitted in these cylinder holes 132, and a pump swashplate 134 which is in contact with the face of the outer edges 133a of these pump plungers.

The pump swashplate 134 is held so that it can move within a prescribed angle around a trunnion axis line $O_1$ which crosses the axis line of the pump cylinder 131, and in the rear face, it is connected via an angular contact bearing 135 to the inner end wall of said input cylinder 129 so that it can rotate freely.

The input cylinder 129 rotates with the crankshaft 118 via chains 136 applied around the output sprocket 28 and the drive gear 118a of the crankshaft 118, and thereby it makes the pump plungers 133 which are in contact with this pump swashplate 134 move in reciprocal motion to repeat suction and discharge in cylinder holes 108.

The hydraulic motor M comprises a motor cylinder 137 which is arranged coaxially with the pump cylinder 131, an odd number of cylinder holes 138 which are formed on this motor cylinder 137 and arranged in a ring to surround the rotation center, motor plungers 139 each of which is fitted to a cylinder hole 138 so that it can slide freely, a motor swashplate 140 which is in contact with the outer ends of these motor plungers 139, a swashplate holder 142 which holds the rear face of the motor swashplate 140 via an angular contact bearing 141, and a swashplate anchor 143 which holds the swashplate holder.

The motor swashplate 140 is designed so that it can move between the perpendicular position which is normal to the axis line of the motor cylinder 137 and the maximum inclined position at which the motor swashplate 140 is inclined with a certain angle. In the inclined state, the motor swashplate 140 gives reciprocal movement to motor plungers 139 according to rotation of the motor cylinder 137, and thereby repeats an expansion and contraction process.

The pump cylinder 131 and motor cylinder 137 are connected at their opposing ends and form the cylinder bock B. An output shaft 144 is inserted along the axis line of this cylinder block B. The front end of this output axis 144 is over-lapped with the crankshaft 118 of the engine 108, and it is arranged in parallel with this crankshaft 118 and spline-connected with the cylinder.

The hydraulic motor M comprises a motor cylinder 137 which is arranged coaxially with the pump bock B.

The rear end of the output shaft 144 passes through the motor swashplate 140, the swashplate holder 142, the center part of the swashplate anchor 143 and the casing $C_1$. And a joint 125 of the transmission 110 is linked to the projected end.

It is added that outer end faces 133a and 139a of pump plungers 133 and the motor plungers 139 are formed in a concave shape, and contact with convex faces 134a and 140a of said outer end faces of the pump swashplate 134 and the motor swashplate 140.

By this, it is possible to reduce the amount of projection of pump plungers 133 and motor plungers 139 from the cylinder bock B, and the thickness of swashplates 134 and 140 can be determined at the same time. Therefore, it is possible to reduce these swashplates 134 and 140 in size for the same strength. Moreover, from these facts, it is possible to make the continuously variable transmission T compact by reducing the dimension in the axial direction by bringing swashplates 134 and 140 closer to the cylinder bock B.

Between said hydraulic pump P and hydraulic motor M, there is formed a hydraulic circuit as follows. For the cylinder block B, between cylinder holes 132 of the pump cylinder 131 and cylinder holes 138 of the cylinder 137, there is provided a ring-formed inner oil path 145 and an outer oil path 146 which are arranged concentrically around the output axis 144, first valve holes 132 and second valve holes 148, the numbers being the same as those of said cylinder holes 132 and 138, which pierce radially the ring-formed bulkhead between both oil paths 145 and 146 and the outer peripheral wall of the outer oil path 146. Several pump ports "a" which pass through adjacent cylinder holes 132 and first valve holes 147, and several motor ports "b" which pass through adjacent cylinder holes 138 and second valve holes 148.

To the first valve holes 147, there are fitted spool type first distribution valves 149, and to the second valve holes 148, there are fitted spool type second distribution valves 150, respectively, so that they can perform sliding movement. And, to the first distribution valves 149 at their outer ends, there is connected the first eccentric wheel 151 which surrounds these, and to the outer ends of the second distribution valves 150, there is connected a second eccentric wheel 152 which surrounds these.

Also, said motor swashplate 140 is controlled by a speed change control mechanism 153 for the inclination angle. This speed change control mechanism 153 comprises an electric motor, not shown in the figure, reduction gears 154, and a ball nut mechanism 158 which is formed with a nut 157 which is screwed via a circulation ball 156 into a thread axis 155 which is connected to the reduction gears 154. The nut 157 is connected to a tongue 142a which projects from the swashplate holder 142. And, when the thread axis 155 is turned forward by turning the electric motor forward, the nut 157 moves rearward along the thread axis 155 to turn the swashplate holder 142 around a trunnion axis line $O_2$ via the tongue 142a and moves the motor swashplate 140 to the perpendicular position. When the electric motor is turned reversely, the nut 157 moves forward along the thread axis 155, and thereby the motor swashplate 140 can be made inclined.

By the continuously variable transmission with the abovementioned composition, when relative rotation is caused between the input cylinder 129 and the cylinder block B, each of the first distribution valves 149 moves to the inner position and outer position in the radial direction of the cylinder block B, with a stroke corresponding to a distance which is twice the amount of eccentricity, in the first valve holes 147 by the first eccentric wheel 151. Thereby the corresponding pump ports are connected through with the outer oil path 146 by the pump plunger which is in the discharge process. While in the suction zone, the first distribution valves 149 move to said outer position and make the corresponding pump ports "a" connected with the inner oil path 145 and disconnected with the outer oil path 146. Thereby operation oil is absorbed from the inner oil path 145 into the cylinder holes 132 by the pump plunger in the suction process.

When the cylinder block B rotates, the second distribution valves 150 perform reciprocal movement between the inner position and the outer position in the radial direction of the cylinder block B, with a stroke corresponding to twice the amount of eccentricity in the second valve holes 148 by the second eccentric wheel 152. And, in the expansion zone of the hydraulic motor M, the second distribution valves 150 move to the inner position and make corresponding motor ports "b" connected through with the outer oil path 146 and disconnected with the inner oil path 145, thereby operation oil at high pressure is supplied from the outer oil path 146 to cylinder holes 138 of the motor plungers 139. While, in the contraction zone, the second distribution valves 150 move to the outer position and make the corresponding motor ports "b" connected through with the inner oil path 145 disconnected with the outer oil path 146, and thereby operation oil is discharged from the cylinder holes 138 of motor plunges 139 in the contraction process.

The pump plungers 133 pressure feed operation oil from the cylinder holes 138 to the outer oil path 146 while passing through the discharge zone, and draw operation oil from the inner oil path 145 into the cylinder holes 138 while passing through the suction zone. Operation oil at high pressure which is supplied to the outer oil path is supplied to the cylinder holes 138 of the motor plunges 139 which exist in the expansion zone of the hydraulic motor M, and operation oil is discharged from the cylinder holes 138 to the inner oil path 145 by motor plungers existing in the contraction zone.

The cylinder block B is rotated by the sum of reaction torques which the cylinder block B receives from the pump swashplate 134 via the pump plungers 133 in the discharge process, and the rotation torque is transmitted from the output axis 144 to the joint 125.

In this case, the rate of speed change of the output axis 144 to the input cylinder 129 is given by the following formula:

Rate of speed change = 1 + capacity of hydraulic Motor M / capacity of hydraulic pump P Therefore, by changing the capacity of the hydraulic motor M from zero to a certain value, it is possible to change the rate of speed change from 1 to a certain value. And yet, as the capacity of the hydraulic motor M can be determined by the stroke of the motor plungers 139, it is possible to control the rate of speed change from 1 to a certain value without steps by inclining the motor swashplate 140 from the perpendicular position to a certain inclined position by operating the swashplate holder 142.

Incidentally, by this continuously variable hydraulic transmission T, the high-pressure outer oil path 146 is opened outside the cylinder block B by the second distribution valves 150 when the second eccentric wheel 152 is swung to the clutch-off position during transfer of operation oil between the hydraulic pump P and the hydraulic motor M. Therefore, highpressure operation oil is not supplied to the hydraulic motor M, and transmission of driving power from the hydraulic pump P to the hydraulic motor M is cut off. That is, a clutch mechanism is composed by the second distribution valves 150 and the second eccentric wheel 152.

The casing $C_1$ in which the above-stated continuously variable transmission T is housed forms the cylindrical form matching the continuously variable transmission T which forms the tubular form, and as shown in FIG. 18 (power unit 111 viewed from the front side), it is formed in one with the crankcase 116 in a space provided on the left side of the cylinder 114 and crankcase 116 of the engine 108.

To the rear end of the output shaft 144 of the continuously variable transmission, there is linked the joint 125, as mentioned already, and to this joint 125, there is linked the drive shaft 126, and this drive shaft 126 of its rear end is linked with gears in the gear case 127 which is provided in the rear wheel 109, and the power of the engine 108 is transmitted to the rear wheel 109 in this order.

Additionally, the joint 125 and the drive shaft 126, as shown in FIG. 17, are covered by the casing C₂ which is fitted to the casing C₁ and the gear case 127.

Consequently, in a scooter type motor bicycle, the power unit 111 which comprises the engine 108, non-stop speed change gear T and transmission mechanism 110 is covered and made in a unit by the integrated engine case 121, casings C₁ and C₂ and gear case 127, and these swing up and down together with the rear wheel when the rear wheel receives shock from the road surface.

Here, the output axis 144 of the continuously variable transmission T is placed in parallel with the crankshaft 118 of the engine 108 and on the left hand side of the cylinder 114 and crankshaft 116. This continuously variable transmission T is of tubular form and yet is smaller in diameter than the plural gears, chains or the transmission mechanism comprising V-belts an others. Therefore, the body can be made compact in the width direction. As the body width can be reduced, the bank angle that can be taken when turning is larger, and the body balance can be improved because the heavy components are kept close to the centerline of the body.

Also, the continuously variable transmission T is placed on the left hand side of the engine 108 in this embodiment. However, since this continuously variable transmission can be linked with the crankshaft 118 when it is placed anywhere at the periphery of this crankshaft 118, the freedom of layout is increased. Therefore, it will also contribute to making the body compact when the position of the continuously variable transmission is selected to suit the engine shape.

Also, the power unit 111 is placed on the left hand side of the engine 108. However, the maintenance of the power unit 111 can be made easier by making each of the crankcase 116, casings C₁ and C₂ and gear case 127 cover the power unit separately and opening to the left side. Also, easier maintenance and cost reduction can be expected at least by integrating a casing which opens up the left side.

FIG. 19 shows a modification of the second embodiment of the present invention. The point at which the first modification differs from the aforementioned second embodiment is that the clutch mechanism is provided outside the non-step speed change gear T.

Element 160 is a clutch mechanism, which provides a clutch shaft 161 which is placed coaxially with said output axis 144 and arranged so that it can rotate forward around the axis (to the left in FIG. 19), an output sprocket 162 which is mounted outside around the clutch shaft 161 via a needle bearing 162 so that it can rotate in relation to the clutch shaft 161 and is engaged with the drive gear 118a of the crankshaft 118 so that it can rotate with the crankshaft 118, a clutch outer 163 which is fixed to the front end of this output sprocket, a clutch center 164 which rotates with said clutch shaft 161, friction plates 165 and 166 on the clutch outer 163 side and on the clutch center 164 side, and an operation mechanism which presses together or separates each of these friction plates 165 and 166, not shown in the figure.

The rear end of the clutch shaft 161 is spline fitted to a cylinder portion 192a of an input cylinder 129 in the hydraulic pump P of the continuously variable transmission T. Therefore, the input cylinder 129 rotates together with the clutch shaft 151. And, the output sprocket 162 is capable of rotating in relation to said cylinder portion 129a via a ball bearing 157.

According to the above-stated clutch mechanism 160, supposing that the clutch is in the connected state by the operation mechanism, namely when each of the friction plates 165 and 166 are mutually pressed together, rotation of the crankshaft 118 is transmitted in order of the output sprocket 162, clutch outer 163, friction plates 165 and 166, clutch center 164 and clutch shaft 161, and thereby the input cylinder 129 is rotated by the clutch shaft 161.

Also, in the clutch-off state, namely when friction plates 165 and 166 are separated from each other, transmission of rotation from the clutch outer 163 to the clutch center 164 is cut off, so that rotation of the input cylinder 129 is stopped and operation of the continuously variable transmission T is stopped.

FIG. 20 and FIG. 21 show a second modification of the second embodiment. The point where this differs from the first modification is that the output shaft 144 of the continuously variable transmission T is placed in parallel and coaxially with the crankshaft 118 of the engine 108, and yet it is directly connected with the crankshaft 118.

Specifically, as shown in FIG. 20, the rear end of the crankshaft 118 is spline fitted to the tubular portion 129a projected in the input cylindrical axis 129, and thereby rotation of the crankshaft 118 is transmitted directly to the input shaft 129.

Also, as shown in FIG. 21, the drive shaft 170 is placed in parallel with the output shaft 144 of the continuously variable transmission T and offset to the left side of the output shaft 144. This drive shaft 170 is linked with the output shaft 144 via gears 171 and 172, the rear end being linked with the rear wheel 109 via bevel gears 173 and 174. The above-stated engine 108, continuously variable transmission T, drive shaft 170 and bevel gears 173 and 174 are covered by the casing C₃.

A third embodiment of this invention is described hereinafter on the basis of FIGS. 22 to 27 inclusive. FIG. 22 shows a scooter-type motor cycle according to this example to this embodiment. The motorcycle 201 has a body frame 202 extending from the front side to the rear side (from the left side to the right side in FIG. 22), a front fork 203 fixed rotatably at the front end of the body frame 202, a front wheel 204 supported to rotate freely at the lower end of the front fork 203, a handle 205 for steering the front wheel 204, a seat 206 provided at the upper portion at approximately the intermediate portion of the body frame 202, and a power system 207 provided at approximately the central lower portion of the body frame 202.

As shown in FIGS. 23 and 24, the power system 207 comprises an engine 208, a continuously variable hydraulic transmission 209 (hereinafter abbreviated as the continuously variable transmission) for changing the rotation outputted by the engine 208, a drive shaft 210 (this example adopts shaft drive) rotated and driven by the continuously variable transmission 209 so as to serve as a power transmission member, and an axle 211 rotated and driven by the drive shaft 210, with pairs of bevel gears 212 (212a, 212b) and 213 (213a, 213b) being provided respectively between the continuously variable transmission 209 and the drive shaft 21 and between the drive shaft 210 and the axle 211, and with a rear wheel 214 being provided integrally with the front wheel 211, so that the rotation of the engine 210 is transmitted to the rear wheel 214 through the continuously variable transmission 209 and drive shaft 210. The engine 208, the continuously variable transmission 209, and the axle 211 for the rear wheel 214 are provided along the width direction of the vehicle and in parallel with each other, contained, together with the bevel gear 212, drive shaft 210 and bevel gear 213, within a casing $C_2$ provided integrally at a crankcase $C_1$ to form an integral portion with the engine 208, and connected, to freely oscillate by way of a link 216, to a bracket 215 provided at approximately the central lower end of the body frame 202 at a portion of the crankcase $C_1$ as shown in FIG. 22. Thus, the power system 207 is provided to form what is called a power unit.

The terminal portion of the power system at which the pump P and motor M are provided on the same axis, is provided above the crankshaft 217 as seen from the side of the vehicle as shown in FIGS. 22 and 23. As shown in FIG. 24, the hydraulic pump P comprises an input tube shaft 230 provided, to free rotation, at a casing $C_2$ through a ball bearing 230b, cylinder block 233 supported, through a ball bearing 232 and to freely rotate, at a supporting tube 231 bolted at the input tube shaft 230, several pump plungers 235 inserted slidably into an odd number of cylinder holes 234 provided at intervals around, and in parallel with, the rotation axis of the cylinder block 233 at one terminal side (lower side in FIG. 24) of the cylinder block 233, and a pump swashplate 236 the front of which is in contact with the external end of the pump plungers 235.

The pump swashplate 236, the rear surface of which is supported through an angular contact bearing 237 by a holder portion 230a for the input tube shaft 230, is provided at a certain angle of inclination with the axis of the cylinder block 233 centered on an imaginary trunnion axis $O_1$ crossing the axis of the cylinder block 233. The angular contact bearing 237 is so provided as to cooperate with a swashplate holder portion 230a for the input tube shaft 230 to give a self alignment action to the pump swashplate 236. The input tube shaft 230, at one terminal of which is fixed a driven gear 238 engaged with a drive gear 239 fixed at one terminal of the crankshaft 217, is rotated and driven by the crankshaft 217. The pump swashplate 236 is rotated by the crankshaft 217 by the rotation of the input tube shaft 230, and gives a reciprocation action to the pump plungers 235 for the purpose of repeated execution of the suction and discharge processes.

The hydraulic motor M comprises a cylinder block 233 commonly used for the hydraulic pump P, several motor plungers 241 inserted slidably into an odd number of cylinder holes 240 provided at intervals around, and in parallel with, the rotation axis of the cylinder block 233 at another terminal of the cylinder block 233, motor swashplate 242 contacting the external terminal of the motor plungers 241, a motor swashplate holder 244 for supporting the rear of the motor swashplate 244 through an angular contact bearing 243, and a motor swashplate anchor 245 supporting the rear of the motor swashplate holder 244.

The opposed surfaces of the motor swashplate holder 244 and the motor swashplate anchor 245 in contact with each other form a spherical surface centered on an intersection of the axis of the cylinder block 233 and the trunnion axis $O_1$. At the hydraulic motor M, the angular contact bearing 243 is so provided as to cooperate with the motor swashplate holder 244 to give a self alignment action to the motor swashplate 242. The motor swashplate anchor 245 is fixed, together with a tubular-type cylinder holder 246 extending to the front end of the motor swashplate anchor 245, on a rear side wall of the casing $C_2$. The cylinder holder 246 supports through a ball bearing 247, the outside circumference of an approximately central portion of the cylinder block 233 so it is free to rotate. The motor swashplate 242 moves, by the rotation of the motor swashplate holder 246, between an upright position where the said swashplate 242 is approximately at a right angle with the axis of the cylinder block 233 and a maximum inclination position where the said swashplate 242 inclines at a certain angle, and at an inclination position, gives a reciprocation action to the motor plunger 241 according to the rotation of the cylinder block 233 for the purpose of repeated execution of the expansion and contraction processes. The inclination angle of the motor swashplate holder 244 is adjusted by an unillustrated inclination mechanism connected to the motor swashplate holder 244. Details of the inclination mechanism are omitted herein.

Further, according to this example, the contacting portion of the plungers 235, 241 and swashplates 236, 242 is of a construction whereby a concave portion is provided at a terminal at the projection side of the plungers 235, 241, and whereby a convex portion is provided at a portion, facing the plungers 235, 241, of the swashplates 236, 242, the convex portion being fitted into the concave portion. The purpose of adopting the said construction is to reduce the size of the projection from the cylinder block 233 for the plungers 235, 241, and to reduce the thickness of the swashplate 236, 242 while maintaining the required strength of the swashplates 236, 242, thereby reducing the distance between the swashplates 236, 242 and the cylinder block 233, and reducing the size of the continuously variable transmission 209 in the axial direction.

An output axis 248 penetrates, while being restricted in relative rotation, a central portion of the cylinder block 233, one terminal of which shaft 248 is supported to rotate freely in relation to the input tube shaft 230 by a ball bearing 249 provided at the inside of the input tube shaft 230. The bevel gear 212a is fixed at a portion outside the input tube shaft 230.

Another terminal of the output shaft 248 extends to penetrate the motor swashplate 242, the motor swashplate holder 244, and motor plate anchor 248, and a ball bearing 250 is provided between the said terminal and motor swashplate anchor 245.

The cylinder block 233 has an inside oil route 251 and an outside oil route 252 of an annular type provided concentrically centered on the output shaft 248 between the pump-side cylinder holes 234 and motor-side cylinder holes 240, respectively the same numbers of first valve holes 253 and second valve holes 254 as the cylinder holes, which first and second holes penetrate radially an annular partition wall provided between the oil routes 251, 252 and outside circumferential wall for the outside oil route 252, channel oil route connecting the valve holes 253, 254 and the outside oil route 252, pump pots "a" mutually connecting the adjacent cylinder holes 234 and first valve holes 253, and several motor ports "b" mutually connecting the adjacent cylinder holes 240 and the second valve holes 254. The inside oil route 251 forms an annular groove on the inside circumference, the opening of which route 251 is closed by the outside circumference of the output shaft 248.

The first distribution valve 255 and second distribution valve 256 each of a spool type are fitted respectively, to be slidable, into the first valve hole 253 and second valve hole 254. The first distribution valve 255 and second distribution valve 256 are provided respectively, around their external terminals, with a first eccentric 257 and a second eccentric 258 through respective ball bearings 259, 260. The second eccentric 257 is supported integrally by the supporting tube 231, and provided along the imaginary trunnion axis $O_1$ and at a predetermined distance of eccentricity from the center of the input tube shaft 230 (center of the output shaft 248).

The second eccentric 258 is held by the cylinder holder 246 at an eccentric location to the center of the output shaft 248. With the continuously variable hydraulic transmission 209 of the said construction, the relative rotation, if caused between the supporting shaft 231, rotating integrally with the input tube shaft 230, and cylinder block 233, causes a reciprocation operation, by the first eccentric 257, of each first distribution valve 255 within the first valve holes 253 at a stroke twice the eccentricity of the first eccentric 257 between the inside location and outside location of, and in the radius direction of, the cylinder block 233. Then, within the discharge range of the hydraulic pump P the first distribution valves 255 are moved at the inside location, resulting in the connection of the corresponding pump ports "a" to the outside oil route 252, stopping the passage through the inside oil route 251, and sending, by pressure produced by the pump plunger 235, in operation in the discharge process, hydraulic oil from the cylinder hole 234 to the outside oil route 252.

Within the suction range, the first distribution valve 255 is moved to the outside location, resulting in the connection of the corresponding pump ports "a" to the inside oil route 251, stopping of passage through the outside oil route 252, and suction of hydraulic oil by the pump plunger 235, in operation in the suction process, from the inside oil route 251 to the cylinder hole 234.

The rotation of the cylinder block 233, if made, causes a reciprocation operation, by the second eccentric 258, of each second distribution valve 256 within the second valve hole 254 at a stroke twice the eccentricity of the second eccentric 258 between the inside location and outside location of, and in the radial direction of, the cylinder block 233. Then, within the expansion range of the hydraulic motor M, the second distribution valves 256 are moved to the inside location, resulting in the connection of the corresponding motor ports "b" to the outside oil route 252, stopping of passage through the inside oil route 251, and supplying high-pressure hydraulic oil from the outside oil route 252 to the cylinder hole 240 from the motor plunger 241 in operation in the expansion process.

Within the contraction process, the second distribution valves 256 are moved to the outside location, resulting in the connection of the corresponding motor ports "b" to the inside oil route 251, stoppage of flow through the outside oil route 252, and discharge of hydraulic oil from the cylinder hole 240 for the motor plunger 241, in operation in the contraction process, to the inside oil route 251. The pump plunger 235 sends, by pressure, hydraulic oil from the cylinder hole 234 to the outside oil route 252 during operation within the discharge range, and draws hydraulic oil from the inside oil route 251 into the cylinder hole 234 during operation within the suction range. Then, high-pressure hydraulic oil sent to the outside oil route 252 is supplied to the cylinder hole 240 for the motor plunger 241 in operation within the expansion range of the hydraulic motor M, and is discharged by the motor plunger 241, in operation with the contraction range of the hydraulic motor M, from the cylinder hole 240 for the plunger 241 to the inside oil route 251.

The cylinder block 233 is operated by the reaction torque received by the cylinder block 233 from the pump swashplate 236 through the pump plunger 235 in operation in the discharge process plus the reaction torque thereby from the motor swashplate 242 through the motor plunger 241. The rotation torque thus obtained is transmitted from the output shaft 248 to the drive shaft 210 through the bevel gears 212a, 212b. In this connection, the speed change ratio of the output shaft 248 to the tube shaft 230 is calculated by the following formula:

$$\text{Speed change ration} = 1 + \frac{\text{Capacity of the hydraulic motor } M}{\text{Capacity of the hydraulic pump } P}$$

Therefore, by changing the capacity of the hydraulic motor M from zero to a certain value, it is possible to change the speed change ratio from 1 to the required value. Further, since the capacity of the hydraulic motor M is governed by the stroke of the motor plunger 241, it is possible to adjust continuously the speed change ratio from 201 to a certain value by operating the motor swashplate holder 244 to incline the motor swashplate 242 from the upright position to a certain inclination position.

With the power system 207 of this construction where the internally installed continuously variable hydraulic transmission 209 is a constituting item and the weight of said power system 207 is nearly uniformly distributed in the length direction, the output shaft 248 for the stepless speed change gear 209 is provided in parallel with the crankshaft 217 for the engine 208 and axle 211 for the rear wheel 214. These items are provided in the width direction of the vehicle making it possible to obtain a good weight balance and to readily execute balance adjustment.

With the continuously variable hydraulic transmission 209 of this construction, the speed change operation which is completed at the stage where the bevel gear 212a serves as an output terminal for the continuously variable hydraulic transmission 209, only the minimum-required members, i.e. the bevel gear 212, the drive shaft 210 and the bevel gear 213 for power transmission, are provided between the continuously variable hydraulic transmission 209 and the axle 211 for the rear wheel 214 as mentioned above, making it possible to eliminate the danger of undesirable weight balance of the vehicle power system 207 and vehicle itself in the width direction and to readily execute balance adjustment.

The weighty items for the system 207, i.e., the engine 208 and the continuously variable hydraulic transmission 209, are collectively arranged in the vicinity of the center of oscillation. This results in reducing the weight of the oscillation terminal side and the unsprung weight of the suspension system supporting the rear wheel 214. The output terminal for the crankshaft 217, the input and output terminal for the continuously variable hydraulic transmission 209, the input terminal for the axle 211 for the rear wheel 214 and all connection portions for the power transmission system, i.e. the drive shaft 210, are all arranged at one lateral side of the vehicle. This brings about excellent mounting capability and simplified maintenance and inspection.

With the continuously variable hydraulic transmission 209 of this construction, the swashplate 236, 242 are provided to serve as members moving in the axial direction during speed change operation. The displacement rate in the axial direction caused by the inclination of these members is very small; and the required space for this displacement is secured within the engine 208 in the width direction of the engine 208 due to the continuously variable hydraulic transmission 209 and the crankshaft 217 being provided one above another in parallel with each other nearly over their entire length. This results in a small projection from the side of the engine 208, and does not require an increase of the vehicle width with the adoption of the continuously variable hydraulic transmission 209. According to this example, the provision of the continuously variable hydraulic transmission 209 above the engine 208 makes it possible to attain the proper road clearance. The provision of weighty items one above another makes it possible to provide the center of gravity of the power system 207 in the vicinity of the center of oscillation as shown in FIG. 22.

The types, dimensions, and arrangements of the various members according to this disclosure form one example, and are capable of variation according to the types of vehicle, design requirements etc. For example, instead of providing the continuously variable hydraulic transmission 209 above the engine 208 according to this example, it is possible to provide the continuously variable hydraulic transmission 209 approximately below the engine 208 as shown in FIG. 25 or as an optional portion, excluding the cylinder block 2!8, around the crankshaft 217, making it possible to obtain an adequate layout for the type of vehicle in question.

Instead of providing the bevel gears 212, 213 and drive shaft 210 as power transmission members between the continuously variable hydraulic transmission 209 and the axle 211, it is possible to provide a pair of chain sprockets 261, 262 and a chain 263 to be wound around these sprockets 261, 262 as shown in FIGS. 26, 27. In this case, since the final rejection ratio is smaller than that obtained by the bevel gear 213 according to the example, reduction gears 264 are provided at the upstream side of the axle 211 for the purpose of obtaining a sufficient reduction ratio. Even by providing such gears, the superiority in performance of the example to the construction using V pulleys according to the prior art continues to be realized, since the power system based on the prior art also requires the same construction as the abovementioned one.

Further, while the example is based on such construction of the contact portion of the plungers 235, 241 and swashplates 236, 242 whereby the convex portion provided on the swashplates 236, 242 is fitted in the concave portion provided on the plungers 235, 241, it is possible to adopt such construction thereof whereby a convex portion provided on the said plungers 235, 241 is fitted in the concave portion provided on the said swashplates 236, 242 as shown in FIG. 27. Such construction is suitable where a space around the continuously variable hydraulic transmission 209 is sufficient, and where the continuously variable hydraulic transmission 209 can be designed to have large dimensions in the length direction.

A fourth embodiment is described with reference to FIG. 28. This power apparatus shown in this figure comprises: an engine 308, a continuously variable hydraulic transmission 309 (hereinafter referred to as a continuously variable transmission) for changing the speed of rotation outputted from the engine 308, and a drive shaft 310 (this embodiment employs so-called shaft drive) as a power transmission member rotated and driven by the continuously variable transmission 309 and delivering power to the rear wheel via a bevel gear. The engine 308 and the continuously variable transmission 309 are arranged mutually parallel to the rear wheel and accommodated in a casing $C_2$ integral with a crankcase $C_1$ of the engine 308.

As shown in FIG. 28, the engine 308 is placed horizontally so that a crankshaft 317 rotatably mounted in the crankcase $C_1$ is along the width direction of the vehicle and the continuously variable transmission 309 is also disposed along the width direction of the vehicle.

A cylinder block 318 and cylinder head 319 are connected sequentially to the crankcase $C_1$ so as to be orthogonal to the crankshaft 317. I the cylinder block 318, a piston 321 connected to the crankshaft 317 via a connecting rod 320 is slidably fitted. On the cylinder head 319, a camshaft 323 is rotated and driven by the crankshaft 317 via a cam chain 322. The camshaft 323, by its rotation, oscillates a rocker arm 314 mounted on the cylinder head and opens/closes a suction valve 325 and an exhaust valve 326 synchronously with the rotation of the crankshaft 317.

The continuously variable transmission 309 comprises a constant capacity type swashplate hydraulic pump P and a variable capacity type swashplate hydraulic motor M. The swashplate hydraulic pump P and the swashplate hydraulic motor M are disposed on the same axis. The continuously variable transmission 309 is located above the crankshaft 317 as viewed from the side of the vehicle.

The hydraulic pump P comprises: an input cylinder shaft 330 rotatably mounted to the casing $C_2$ via a ball bearing 330b, a cylinder block 333 rotatably supported to a support cylinder 331 bolted to the input cylinder shaft 330 via a ball bearing 332, many pump plungers 335 slidably fitting in each of an odd number of cylinder holes 334 formed so as to be in parallel with the rotation axis with a spacing provided around the rotation axis on one end side of the cylinder block 333 and a pump swashplate 336 with its front butted against the outer end of the pump plunger 335. The pump swashplate 336 is supported by a holder portion 330a of the input cylinder shaft 330 at its back via an angular contact bearing 337 and is held inclined at a predetermined angle with respect to the axis of the cylinder block 333 with a virtual trunnion axis $O_1$ orthogonal to the axis of the cylinder block being in the center. It is arranged so that the angular contact bearing 337 gives to the pump swashplate aligning action in cooperation with the swashplate holder portion 330a of the input cylinder shaft 330.

At one end of the input cylinder shaft 330, a driven sprocket 338 is fixed. It is connected by a chain 361 to a drive sprocket 339 fixed to one end of the crankshaft 317 and is rotated and driven by the crankshaft 317.

The pump swashplate 336 is rotated by the crankshaft 317 (by the rotation of the input cylinder shaft 330) and gives the pump plunger 335 reciprocating action. This causes repetition of the suction and discharge strokes.

The hydraulic motor M comprises the cylinder block 333 used in common with the hydraulic pump P, many motor plungers 341 slidably fitted respective to an odd number of cylinder holes 340 spaced around the rotation axis of the cylinder block 333 and formed so as to be in parallel with the rotation axis on the other end surface, a motor swashplate 342 butting the outer end surface of the motor plunger 341, a motor swashplate holder 344 supporting the back of the motor swashplate 342 via the angular contact bearing 343 and a motor swashplate anchor 345 supporting the back of the motor swashplate holder 344. Opposing surfaces of the mutually abutting motor swashplate holder 344 and motor swashplate anchor 345 are formed to a spherical surface the center of which is the intersection of the axis of the cylinder block 333 and the axis $O_2$ of the trunnion.

The angular contact bearing 343 is arranged so as to give the motor swashplate 342 aligning action in cooperation with the motor swashplate holder 344. The motor swashplate anchor 345 is secured to the rear side wall of the casing $C_2$ together with the cylindrical cylinder holders 346 lying at its front end. The cylinder holder 346 rotatably supports the outer circumference of approximately the central portion of the cylinder block 333 via a ball bearing 347.

The motor swashplate 342 moves between the erect position nearly orthogonal to the axis of the cylinder block and maximum inclination position inclined at a certain angle by the rotation of the motor swashplate holder 344. In the inclined condition, reciprocating action is given to the motor plunge 341 according to the rotation of the cylinder block 333 and expansion and contraction strokes are caused to be repeated. The inclination angle of the motor swashplate holder 344 is adjusted by an inclination mechanism (not shown) connected to the motor swashplate holder 344. Details of the inclination mechanism ar omitted here.

In the central portion of the cylinder block 333, the output shaft is penetrated with its relative rotation in constrained condition. One end portion of this output shaft 348 is supported by the ball bearing 349 provided inside of the input cylinder shaft 330 and is made relatively rotatable with respect t this input cylinder shaft 330. To the portion located outwardly of the input cylinder shaft 330, a bevel gear is fixed to drive the rear wheel.

The other end of the output shaft 348 extends so as to penetrate the motor swashplate 342, the motor swashplate holder 344 and the motor swashplate anchor 345. A ball bearing 350 intervenes between the motor swashplate anchor 345 and the output shaft 348.

Provided in the cylinder block 333 are ring-like inside oil paths 351 and outside oil paths 352 arranged concentrically around the output shaft 348 at the center between the pump side cylinder hole 334 groups and the motor side cylinder hole 340 groups, first valve holes and second valve holes of the same number a the cylinder holes 334 and 340 penetrating radially the ring-like wall of the wall paths 351 and 352 and the outer circumferential wall of the outside oil path 352, communication oil paths for communicating each valve hole 353 and 354 to the outside oil path 352, a pump port "a" for mutually communicating adjacent cylinder hole 334 and the first valve hole 353 and many motor ports "b" for mutually communication adjacent cylinder hole 340 and the second valve hole 354.

The inside oil path 351 is formed as a ring-like groove on the inner circumferential surface of the cylinder block 333 and its open surface is closed by the outer circumferential surface of the output shaft 348.

To the first valve hole 353, a spool type first distribution valve 355 is slidably fitted. To the outer end of the first distribution valve 355, a first eccentric wheel 357 is engaged and to the outer end of the second distribution valve 356 a second eccentric wheel 358 is engaged, via ball bearings 359 and 360, respectively.

The first eccentric wheel 357 is integrally supported by the support cylinder 331 and is located at a predetermined distance away from the center (the center of the output shaft) of the input cylinder shaft 330 along the virtual trunnion axis $O_1$. The second eccentric wheel 358 is held at a point deviated from the center of the output shaft 348 by the cylinder holder 346.

According to the continuously variable transmission 309 of such arrangement, when relative rotation occurs between the support cylinder 331 which integrally rotates with the input cylinder shaft 330 and the cylinder block 333, each first distribution valve 355 is caused to reciprocate between the radial inward and outward positions of the cylinder block 333 with the distance twice the amount of eccentricity taken as a stroke in the first valve hole 353 by the first eccentric wheel 357. In the discharge area of the hydraulic pump P, the first distribution valve 355 is shifted to the inward position, as a result corresponding pump port "a" is communicated with the outside oil path 352, communication with the inside oil path 351 is stopped, working fluid is delivered from the cylinder hole 334 to the outside oil path 352 by the pump plunger in the discharge stroke and in the suction area the first distribution valve 355 shifts to the outward position side, corresponding pump port "a" is communicated with the inside oil path 351, the outside oil path is made to not communicate and working fluid is sucked into the cylinder hole 334 from the inside oil path 351 by the pump plunger 335 in the suction stroke.

On the other hand, when the cylinder block 333 rotates, each second distribution valve 356 is made to reciprocate between the radial inward and outward positions of the cylinder block 333 with the stroke being twice the distance of the eccentricity in the second valve hole 354 by the second eccentric wheel 358. In the expansion area of the hydraulic motor M, the second distribution valve 356 shifts to the inward position, makes the corresponding motor ports "b" communicate with the outside oil path 352 and takes the inside oil path 351 from communication. High pressure working fluid is supplied from the outside oil path 351 to the cylinder hole 340 of the motor plunger 341 in the expansion stroke. In the contraction area, the second distribution valve 356 shifts to the outward position and makes corresponding motor port "b" communicate with the inside oil path. Working oil is discharged to the inside oil path 351 from the cylinder hole 340 of the motor plunger 341 in the contraction stroke.

When passing through the discharge area, the pump plunger 335 delivers working fluid from the cylinder hole 334 to the outside oil path 352. When passing through the suction area, working fluid is sucked from the inside oil path 351 to the cylinder hole 334. High pressure working fluid delivered to the outside oil path 352 is supplied to the cylinder hole 340 of the motor plunger 341 in the expansion area of the hydraulic motor M. At the same time the working fluid is discharged from the cylinder hole 340 to the inside oil path 351 by the motor plunger 341 in the contraction area.

During that time, the cylinder block 333 is rotated by the sum of reaction torque which the cylinder block 333 receives from the pump swashplate 336 via the pump plunger 335 in a discharge stroke and reaction torque which the cylinder block 333 receives from the motor swashplate 342 via the motor plunger 341 in an expansion stroke and the rotation torque is transmitted from the output shaft 348 to the drive shaft 310.

In this case, the transmission gear ratio of the output shaft 348 with respect to the input cylinder shaft 330 is given by the following formula.

$$\text{Gear ratio} = 1 + \frac{\text{capacity of hydraulic motor } M}{\text{capacity of hydraulic pump } P}$$

Accordingly, the gear ratio can be changed from 1 to a certain desired value by changing the capacity of hydraulic motor M from zero to a certain value. Since the capacity of the hydraulic motor M is determined by the stroke of the motor plunger 341, the gear ratio is adjusted steplessly from 1 to a certain value by inclining the motor swashplate from the erect to the inclined position.

According to the power apparatus of the above arrangement, since the continuously variable transmission 309 completes speed change operation, only a minimum number of members is required for the power transmission from the continuously variable transmission 309 to the rear wheel axle. Accordingly, it is not necessary to provide component members required for the speed change on the side of the driving wheel and the engine 308 and stepless transmission 309, so that the heavy items can be provided in substantially the central position of the vehicle.

As a result, the center of gravity of the power apparatus can be brought approximately to the central position in the longitudinal direction of the vehicle and the inertial mass on the side of the driving wheel is reduced, thereby reducing the unsprung load of the suspension system for supporting this driving wheel.

Since the stepless transmission 309 is provided above the crankcase $C_1$ of the engine 308, the center of gravity position of the power apparatus can be brought near the central portion even in the vertical direction. Because of the effect of this, the center of gravity of the vehicle comes close to the center of the vehicle, and the weight balance of the vehicle as a whole is improved and adjustment thereof becomes easy. In addition, since the continuously variable transmission is provided above the crankcase C1, minimum clearance is easily maintained, facilitating the installation of the oil pan, etc. which must be attached to the engine 308. Further, since the continuously variable transmission 309 of the already described arrangement has nearly uniform weight balance in the longitudinal direction, by disposing the continuously variable transmission 309 along the width direction of the vehicle and in parallel with the crankshaft 317 as shown in the embodiment, undesirable weight balance in the width direction of the vehicle is avoided and balance adjustment is further facilitated. In addition, since all the connecting parts of the power transmission system including the output end of the crankshaft 317, the input and output ends of the continuously variable transmission 309, and the input end of the rear wheel drive shaft 310 are disposed on the same side of the vehicle, installation, maintenance and inspection of these parts is facilitated.

A fifth embodiment of the present invention will be described with reference to FIGS. 29 to 31. In FIG. 29, element 401 is an autobicycle of the scooter type as a vehicle to which the embodiment is applied. This autobicycle 401 is comprised of a frame 402 extending from the front to the rear of the body (from left to right in the drawing), a front fork 403 rotatably provided at the front of the frame 402, a front wheel 404 rotatably held to the lower end of the front fork 403, a handle 405 fitted to the upper end of the front fork 403 for steering the front wheel 405, a seat 406 provided upwardly at about the middle part of the frame 402, and a power plant 407 of the present embodiment provided downwardly at about the middle part of the frame 402.

The power plant, or power unit, is comprised of an engine 408, a continuously variable hydraulic transmission 409 adapted to change the speed of the output revolution of the engine 408 (which will be referred to simply as a "continuously variable transmission" in the following), drive shaft 410 as a power transmitting member being driven by the continuously variable transmission 409 and an axle 411 driven by the drive shaft 410. Between the continuously variable transmission 409 and the crankshaft 412 of the engine 408 and between the drive shaft 410 and the axle 411, pairs of bevel gears 413 (413a, 413b) and 414 (414a, 414b) are provided, respectively. The axle 411 has a rear wheel 415 integrally fitted so that the revolution of the engine 408 is transmitted through the continuously variable transmission 409 and drive shaft 410 to the axle 411 and rear wheel 415.

The crankshaft 412 of the engine 408 and the axle 411 of the rear wheel 415 are arranged parallel to each other in the direction of the width of the vehicle with a spacing provided in the direction of the length of the vehicle. The continuously variable transmission 409 and the drive shaft 410 are arranged to be at right angles to the crankshaft 412 and axle 411. Further, the continuously variable transmission 409, the drive shaft 410, the bevel gears 413 and 414 and the axle 411 are contained in a casing $C_2$, which is integrally connected to a crankcase $C_1$ of the engine 408, and are thus integrated to said engine 408.

The crankcase $C_1$ and casing $C_2$ are movably connected at the crankcase $C_1$ across a link 417 to a bracket 416 projecting at about the lower central part of the frame 402, as shown in FIG. 29. Further, the casing $C_2$ has its end on the side of the axle 411 coupled by a cushion unit, not shown, to about the rear end of the frame 402. Thus the suspension of said rear wheel is formed by the power unit 407 and cushion unit.

The engine 408 has its crankshaft 412 disposed, along with the axle 411, laterally of the vehicle. Consequently, the continuously variable transmission 409 and drive shaft 410 are disposed along the direction of the length of the vehicle. The crankcase $C_1$ has a cylinder block 412 and a cylinder head 419 connected sequentially in such a way as to be rectangular to the crankshaft 412, as shown in FIG. 30. In the cylinder block 418, a piston 421 connected to said crankshaft 412 across a connecting rod 420 is slidably fitted. In the cylinder head 419, a camshaft 423 driven to rotate by said crankshaft 412 across a cam chain 422 is rotatably mounted. This camshaft 423 is adapted to open or close inlet and outlet valves (not shown) mounted on the cylinder head 419.

The continuously variable transmission is comprised of a fixed delivery swashplate type hydraulic pump P and a variable delivery swashplate type hydraulic motor M, as shown in FIG. 30, and the swash type hydraulic pump P and swashplate type hydraulic motor M are disposed on the same axis.

The hydraulic pump P is comprised of an input cylinder shaft 425 rotatably fitted across a ball bearing 424 to the casing $C_1$, a cylinder block 427 relatively rotatably fitted across a ball bearing 426 to the input cylinder shaft 425, a number of pump plungers 429 slidably fitted into an odd number of cylinder holes 428 formed in one side of the cylinder block 427 (upper side in FIG. 30) around its revolving axis, mutually spaced and in parallel to the revolving axis, and a pump swashplate 430 having its front surface in contact with the external ends of the pump plungers 429.

The pump swashplate 430 is supported on its back by the input cylinder shaft 425 across an angular contact bearing 431 and is held in a tilted position at a certain angle to the axis of the cylinder block 427 about an assumed trunnion axis $O_1$ crossing the axis of the cylinder block 427. The angular contact bearing 431 is so constructed as to give an aligning effect to the pump swashplate 430 in cooperation with the input cylinder shaft 425.

At one end of the input cylinder shaft 425, the bevel gear 413b is integrally formed for engagement with the bevel gear 413a fixed to one end of the crankshaft 412 to be driven to rotate by the crankshaft 412. The pump swashplate 430 is caused to revolve with revolution of the input cylinder shaft 425 through the crankshaft 412 to give a reciprocal movement to the pump plungers 425 and have them repeat the suction and exhaust steps.

The hydraulic motor M is comprised of the cylinder block 427 commonly used with the hydraulic pump P, a number of motor plungers 433 slidably fitted into an odd number of cylinder holes 432 formed on the other end face of the cylinder block, mutually spaced and arranged in parallel with the axis of the cylinder block 427, a motor swashplate 434 engaging the outside end surfaces of the motor plungers 433, a motor swashplate holder 436 supporting the back of the motor swashplate 434 across an angular contact bearing 435 and a motor swashplate anchor 437 supporting the back of the motor swashplate holder 436 (in this embodiment, this motor swashplate anchor 437 is integrally formed with the casing $C_2$). Further, the surface of engagement of the motor swashplate holder 436 and motor swashplate anchor 437 with each other is formed in a spherical surface about the point of crossing the axis of the cylinder block 427 and the axis $O_2$ of the trunnion. Also, in this hydraulic motor M, the angular contact bearing 435 is so constructed as to give an aligning effect to the motor swashplate 434 in cooperation with the motor swashplate holder 436.

The cylinder block 427 is rotatably supported, at about the middle point in the direction of its length, by the casing $C_2$ across a ball bearing 438. The motor swashplate 434 is adapted to tilt between an erect position nearly at right angles to the axis of the cylinder block 427 and a maximum position of tilting at a certain angle. Under the tilted condition, the swashplate gives a reciprocal movement to the motor plungers 433 with rotation of the cylinder block 427 to repeat the steps of expansion and contraction.

The angle of tilting of the motor swashplate holder 436 is adjustable by a tilting mechanism which is not shown but is connected to the motor swashplate holder 436. Details of the tilting mechanism will be omitted here.

An output shaft 439 penetrates the cylinder block 427 at its central part with the relative revolution constrained. This output shaft 439 has its one end supported by a ball bearing 440 provided in the input cylinder shaft 425 for free revolution relative to the input cylinder shaft 425. The output shaft 439 has its other end (on the lower side in FIG. 30) extending through the motor swashplate 434, the motor swashplate holder 436 and the motor swashplate anchor 437, with a ball bearing interposed to the motor swashplate anchor 437.

The cylinder block 427 has provided therein: annular inner and outer oil channels 442 and 443 arranged concentrically about the output shaft 439 between the cylinder holes 428 on the pump and the cylinder holes 432 on the motor side, first valve holes 444 and second valve holes 445, having the same number as the cylinder holes 428 and 432, respectively, radially penetrate the annular partition wall between the oil channels 442 and 443 and the outer peripheral wall of the outer oil channel 443, oil channels communicating the valve holes 444 and 445 to the outer oil channel 443, a pump ports "a" communicating the adjacent cylinder holes 428 and the first valve holes 444 to each other and a number of motor ports "b" communicating the adjacent cylinder holes 432 and the second valve holes 445 to each other.

The inner oil channel 442 is formed as an annular channel on the inner peripheral surface of the cylinder block 427, and its open side is closed by the outer peripheral surface of the output shaft 439.

Each of the first valve holes 444 has a spool type first distribution valve 446 slidably fitted. Each of said second valve holes 445 similarly has a spool type second distribution valve slidably fitted. A first eccentric 448 surrounds the external end of the first distribution valve 446. A second eccentric 448 surrounds the external end of the second distribution valve 447. Ball bearings 450 and 451 are provided.

The first eccentric 448 is integrally supported by the input cylinder shaft 425 and is positioned at a position biased a certain distance from the center of the input cylinder shaft 425 (center of the output shaft 439) along the assumed trunnion axis $O_1$. Also, the second eccentric 449 is held by the casing $C_2$ at a position deviated from the center of the output shaft 439.

According to the continuously variable transmission of this configuration, when relative revolution is produced between the input cylinder shaft 425 and the cylinder block 427, each first distribution valve 446 is caused by the first eccentric 448 to move reciprocally in the first valve hole 444 between the inner and outer positions in the radial direction of the cylinder block 427 with two times the eccentricity to the stroke. In the discharge region of the hydraulic pump P, the first distribution valve 446 moves to the inner side to communicate the corresponding pump port "a" to the outer oil channel 443 and disconnect the same from the inner oil channel 442. Then, the service oil is pressure fed from the cylinder hole 428 to the outer oil channel 443 by the pump plunger in the discharge process. Also, in the suction region, the first distribution valve 446 moves to the outer position to communicate the corresponding pump port "a" to the inner oil channel 442 and disconnect the same from the outer oil channel 443. Then, the service oil is fed into the cylinder hole 428 from the inner oil channel 442 by the pump plunger 429 in the suction process.

As the cylinder block 427 revolves, each second distribution valve 447 is caused to move by the second eccentric 449 reciprocally in the second valve hole 415 between the inner and outer positions in the radial direction of the cylinder block 427. In the expansion region of the hydraulic motor M, the second distribution valve 447 moves to the inner position to communicate the corresponding motor port "b" to the outer oil channel 443 and disconnect the same from the inner oil channel 442. Then, the high pressure service oil is fed from the outer oil channel 443 to the cylinder hole 432 of the motor plunger 433 in the expansion process. Also, in the contraction region, the second distribution valve 447 moves to the outer position to communicate the corresponding motor port "b" to the inner oil channel 442 and disconnect the same from the outer oil channel 443; and the service oil is discharged from the cylinder hole 432 of the motor plunger 433 in the contraction process to the inner oil channel 442.

The pump plunger 429, as it passes the discharge region, pressure feeds the service oil from the cylinder hole 428 to the outer oil channel 443, and as it passes the suction region, takes the service oil from the inner oil channel 442 to the cylinder hole 428. Further, the high pressure service oil fed to the outer oil channel 443 is supplied to the cylinder hole 432 of the motor plunger 433 present in the expansion region of the hydraulic motor M, while by the motor plunger 433 present in the shrinkage region, the service oil is discharged from its cylinder hole 432 to the inner oil channel 442.

By the sum of the reaction torque which the cylinder block 427 receives from the pump swashplate 430 via the pump plunger 429 in the discharge process and that which the cylinder block 427 receive from the motor swashplate 434 via the motor plunger 433 in the expansion process, the cylinder block 427 revolves, and its revolution torque is transmitted from the output shaft 439 to the drive shaft 410.

In this case, the transmission gear ratio of the output shaft 439 to the input cylinder shaft 425 is given by the formula.

Transmission gear ratio = 1 + Capacity of hydraulic motor M/Capacity of hydraulic pump P Therefore, by changing the capacity of the hydraulic motor M from zero to a certain value, it is possible to change the transmission gear ratio from unity to a certain required value. Here, the capacity of the hydraulic motor M is determined by the stroke of the motor plunger 433. By operating the motor swashplate holder 436 to change the motor swashplate 434 from the erect position to a certain tilted position, the transmission gear ratio is infinitely adjustable from unity to a certain value.

In the present embodiment, engagement of said plungers 429 and 433 and swashplates 430 and 434 is such that the projections formed on the swashplates 430 and 434 are adapted to fit into the recessed parts formed at the projecting ends of the plungers 429 and 433.

Such construction is employed in order to reduce the size of the projection of the plungers 429 and 433 over the cylinder block 427 and secure the strength of the swashplates 430 and 434 to make them thinner and thereby bring the swashplates 430 and 434 close to the cylinder block 427 to reduce the size in the diction of the revolving axis of the continuously variable transmission 409.

Then, according to the power plant 407 of the foregoing configuration, the continuously variable transmission 409 has the input cylinder shaft 425 as an input member and the output shaft 439 formed concentrically into a cylinder and has the function of transmission completed through the output shaft 439 so that the transmission mechanism is comprised of a single component. Further, it has the axis of revolution and the direction of output arranged in the same direction, and so by providing this continuously variable transmission 409 at a right angle to the crankshaft 412 of the engine 408, it is possible to connect the crankshaft 412 and the axle 411 of the rear wheel 415 along a single axis. It is possible to dispose the input shaft to the continuously variable transmission 409 and the output shaft to the rear wheel 415 on the same axis; and thus the continuously variable transmission 409 is coaxially disposed between the input shaft and the output shaft and is regarded as part of the drive shaft 410. Accordingly, by changing the length of the input shaft or output shaft connected to the continuously variable transmission 409, it is possible to dispose the continuously variable transmission 409 at any desired position between the crankshaft 412 and the axle 411.

The continuously variable transmission 409 is directly connected to the crankshaft with the bevel gear 413$b$ integrally provided on the input cylinder shaft. By changing the length of the drive shaft 410 connected to the output shaft 439, the spacing between the axle 411 and the crankshaft 412 is adjustable with ease. Thus, the freedom for location of the continuously variable transmission 409 is greatly enlarged, and at the same time, the range of applicable vehicles is expanded.

The weight of the power plant 407, that is, engine 408 and continuously variable transmission 409, is concentrated near the center of rotation of the power plant 407, and so the weight displaced from the center of rotation is reduced to reduce the unsprung load on the suspension bearing the rear wheel 415. Further, all of the coupling parts of the power transmission system including the output end of the crankshaft 412, the input and output ends of the continuously variable transmission 409, the input end of the axle 411 of the rear wheel and the drive shaft 410 are disposed on one side of the vehicle for ease of assembling and maintenance.

The shapes, sizes and arrangement of the component members shown in the foregoing embodiment are given as an example, and they can be changed as desired to suit the type of vehicle or the design requirements. For example, the foregoing shows the configuration having the bevel gear 413$b$ provided at the end of the input cylinder shaft 425 of the continuously variable transmission 409 for connection of the end of the input cylinder shaft 425 across the bevel gear 413$b$ to the crankshaft 12 of the engine 406. Instead, the bevel gear 413$b$ may be provided at about the middle part of the input cylinder shaft 425; and across this bevel gear 413$b$, the middle part of the input cylinder shaft 425 may be connected to the crankshaft 412 of the engine 408, as shown in FIG. 31. Through such a configuration, it is possible to connect the crankshaft 412 to a point in the course of a linear transmission route of power and thus further expand the adjustable range of the spacing between the axle 411 and the crankshaft 412. Also, by changing the position of engagement of the bevel gear 413$a$ with the bevel gear 413$b$, the revolution of the continuously variable transmission 409 itself and the output revolution from the continuously variable transmission 409 can be readily reversed. Accordingly, an adequate layout is enabled for any type of vehicle.

Furthermore, the construction of the spherical engagement of the plungers 429 and 433 with the swashplates 430 and 434 may be reversed to that shown in the foregoing embodiment in FIG. 31. For employment of such configuration, however, a change is required of the space for installation in the direction of length of the continuously variable transmission 409, as compared to the foregoing embodiment.

A sixth embodiment is described by FIGS. 32 through FIG. 34. In FIG. 32, a body frame 501 extends from the front to the rear of the body (from left to right in the figure), a front fork 502 is attached to the front end of the body frame 501, a front wheel 503 is supported at the top end of the front fork 502 so that it can rotate freely, a handle 504 is for steering the front wheel 503, a horizontal opposing type six cylinder engine 505 is supported by the body frame 501, a fairing 506 covers the body frame 501, the front and sides of the engine 505, and the front of a passenger who sits on a seat 507, a rear fork 508 has the front part supported by the body frame 501 so that it can swing freely, a rear wheel 509 is supported at the rear end of the rear fork 508, and a holder 510 is provided for small articles.

The rotation of the engine 505 is transmitted via a transmission system 511 to the rear wheel 509 which is the driving wheel. The transmission system 511 comprises, from the engine 505, continuously variable hydraulic transmission 512 (hereinafter called simply continuously variable transmission), a connecting unit 513, and a drive shaft 514 (the present invention adopts one which is generally called a shaft drive).

Before explaining the details of the transmission system 511, the engine 505 is explained. In FIG. 34, a crankshaft 516 is placed so that it extends in the longitudinal direction of the body, and is linked via connecting rods 517 with pistons 519 which are inserted in plural cylinders 518 extending from the near center of the body outwardly to both right and left. Though only cylinders 518 on one side are shown, actually there are provided three cylinders in each of the right and left cylinders. A camshaft 520 is linked via cam chains 520a to the crankshaft 516. The continuously variable transmission 512 comprises a swashplate type hydraulic pump 512P of the fixed capacity type, and a swashplate type hydraulic motor 512M of the variable capacity type. The hydraulic pump 512P comprises an input cylinder axis 522, a cylinder block 525 which is supported via a ball baring 524 by a support cylinder 523 which is bolted to the input cylinder 522, several pump plungers 527 which are inserted into the odd number of cylinder holes 526, the cylinder holes being formed in the front end face of the cylinder block 525 (in FIG. 34, the left side is the front and the right side is the rear of the body) at intervals around the rotation axis line and in parallel with the rotation axis line, and a pump swashplate 528 of which the front face is in contact with the outer ends of these pump plungers 527. The rear face of the pump swashplate 528 is supported via an angular contact bearing 529 by a holder part 522a of the input cylindrical axis 522, and is held in the inclined state at a certain angle to the axis line of the cylinder block 525 about a supposed trunnion axis line $O_1$ as the center, which crosses the axis line of the cylinder block 525 at right angles.

The angular contact bearing 529 is arranged so that it gives oscillating movement to the pump swashplate 528 in cooperation with the swashplate holder 522a of the input cylinder 522. The rotation of the crankshaft 516 is transmitted to the input cylinder via a rotation plate 530, a cylindrical body 531 and a damper mechanism which is linked to the outer end of the cylindrical body 531. The pump swashplate 528, when the input cylinder 522 rotates with the crank axis 516, gives reciprocal movement to pump plungers 527 to repeat suction and discharge processes.

The hydraulic motor 512M comprising the cylinder block 525 which is jointly used with the hydraulic pump 512P, several motor plungers 534 which are inserted so that they can slide into each of the odd number of cylinder holes 533 which are formed in the rear end face of the cylinder block 525 around the rotation axis line at regular intervals and in parallel with the rotation axis line, a motor swashplate 535 which is in contact with the outer end faces of these motor plungers 534, a motor swashplate holder 537 which supports the rear face of the motor swashplate 535 via an angular contact bearing 536, and a motor swashplate anchor 538 which supports the rear face of the motor swashplate holder 537. The opposing faces of mutually contacting motor swashplate holder 537 and motor swashplate anchor 538 are formed in a spherical face with its center at the intersection of the axis line of the cylinder block 523 and the trunnion axis line $O_2$.

In this hydraulic motor 512M the angular contact bearing 536 is composed so that it gives the aligning operation to the motor swashplate 535 in cooperation with the motor swashplate holder 537. The motor swashplate anchor 538 is fixed to the rear wall of the unit casing $C_1$ together with a cylinder holder 539. The cylinder holder 539 supports the cylinder block 525 at its near center via a ball bearing 540 so that it can rotate freely. The motor swashplate 535 is designed so that it moves between the perpendicular position which is normal to the axis line of the cylinder block 525 and the maximum inclined position at which it inclines with a certain angle by means of the rotation of the motor swashplate holder 537. In the inclined state, motor plungers 534 repeat the expansion and contraction processes by reciprocal movement following rotation of the cylinder block 525.

The inclined angle of the motor swashplate holder 537 can be adjusted either manually or automatically according to speed by an inclined movement mechanism, not shown in the figure, by which a tongue 537a which projects from the casing $C_1$ is adjusted. Here, details of the inclined movement mechanism are omitted.

In the center part of the cylinder block 525, an output shaft 541 is placed in parallel and coaxially with the crank axis 516 of the engine. The output shaft 541 is secured to the cylinder block 525 by splines 541a and 525a which fit together. The front end of the output shaft 541 passes through the pump swashplate 528 and the holder part 522a of the input cylinder 522, and further passes through the damper mechanism 532 and the rotator 531. Between the output shaft 541 and the input cylinder 522 and the cylindrical body 531, a bearing 542 is inserted.

The rear end of the output shaft 541 extends so that it passes through the motor swashplate 535, the motor swashplate holder 537 and the motor swashplate anchor 538; and a bearing 543 is inserted between the output shaft 541 and the motor swashplate anchor 538. To the outer end of the output shaft 541, a gear 544 is fitted.

When assembling the continuously variable transmission to the casing $C_1$, the input cylinder 522, via the ball bearing 547, is supported by holder 548 which is bolted to the casing $C_1$; and motor swashplate anchor 538 is attached by bolt 549 to the rear wall of the casing $C_1$. To the rear wall of the casing $C_1$, a cap 551 is attached which closes a maintenance hole provided there.

The cylinder block 525 between cylinder holes 533 on the motor side, is provided with an inner oil path 563 in a ring form and an outer oil path 554 which are arranged coaxially around the output shaft 541, first valve holes 565 and second valve holes 565, the number of which is respectively the same as that of the cylinder holes 526 and 533, which pass radially through a ring formed bulkhead between both oil paths 563 and 564 and the outer peripheral wall of the outer oil path 564, a connecting oil path which connects each of the valve holes 565 and 566 to the outer oil path 564, several pump ports "a" which mutually connect adjacent cylinder holes 526 and first valve holes 565, and several motor ports "b" which mutually connect adjacent cylinder holes 533 and second valve holes 566. The inner oil path 563 is formed as a ring formed groove in the inner cylindrical face of the cylinder block 525, and the open face is closed by the outer peripheral face of the output shaft 541.

The connection oil path, the pump port "a" and the motor port "b" which connect each of valve holes 565 and 566 are formed between the cylinder block 525 and members adhered to this block so that they completely surround the first and second valve holes 565 and 566.

To the first valve holes 565 spool type first distribution valves 569 and to the second valve holes 566 spool type second distribution valves 570 are fitted so that they can slide radially. To the outer ends of the first distribution valves 569 first eccentric rings 571 which surround them and to the second distribution valves 570 second eccentric rings 572 which surround them are connected respectively via ball bearings 573 and 574. The first eccentric rings 571 are formed as one with the support cylinder 523 and positioned so that the center of the ring is displaced by a prescribed distance from the center of the output cylindrical shaft 52 in the direction of the supposed trunnion axis line $O_1$.

According to the continuously variable transmission 512 of the above-stated composition, each of the first distribution valves 569, when the relative rotation occurs between the support cylinder 523 (which rotates as one with the input cylinder 522) and the cylinder block 525, are moved reciprocally between the inner position and outer position in the radial direction of the cylinder block 525 by the first eccentric rings 571, with a stroke corresponding to twice the eccentricity of the first eccentric ring 571. In the discharge zone of the hydraulic pump 512P, the first distribution valves 569 move to the inner position to open the corresponding pump ports "a" to the outer oil path 564 and to close them from the inner oil path 563, thereby operation oil is pressure fed by pump plungers 528 in the discharge process from the cylinder holes 527 to the outer oil path 564. In the suction zone, the first distribution valves 569 move to the said outer position side to open the corresponding pump ports "a" to the inner oil path 563 and to close them from the outer oil path 564, thereby removing operating oil in the suction process by the pump plungers 527 from the inner oil path 563 to cylinder holes 526.

When the cylinder block 525 rotates, the second distribution valves 570, by the second eccentric ring 572, are moved reciprocally between the inner position and outer position in the radial direction of the cylinder block 525 with a stroke corresponding to twice the eccentricity of the second eccentric ring 572. In the expansion zone of the hydraulic motor 512M the second distribution valves 570 move to the inner position side to open the corresponding motor ports "b" to the outer oil path 564 and close them from the inner oil path 563, thereby allowing high-pressure operating oil to pass from the outer oil path 564 to the cylinder holes 533 of the motor plungers 534, and in the contraction zone, the second distribution valves 570 move to the outer position to open the corresponding motor ports "b" to the inner oil path and close them from the outer oil path 564, thereby allowing the operating oil to be discharged from the motor plungers 534 which are in the contraction process, to the inner oil path 563.

The pump plungers 527, while passing through the discharge zone, pressure feed operating oil from the cylinder holes 526 to the outer oil path 64, and while passing through the suction zone, draw operating oil from the inner oil path 563 to the cylinder holes 526. The high-pressure operating oil supplied to the outer oil path 564 is supplied to the cylinder holes 533 of the motor plungers 534 which are in the expansion zone of the hydraulic motor 512M. At the same time, oil is discharged from the cylinder holes 533 to the inner oil path 563 by motor plungers 534 which are in the contraction zone.

Concurrently, the cylinder block 525 is rotated by the sum of the reaction torque which it receives from the pump swashplate 528 via the pump plungers 527 in the discharge process and the reaction torque which the cylinder block 525 receives from the motor swashplate 536 via the motor plungers 534 in the expansion process. The rotation torque is transmitted from the output shaft 541 to a counter shaft 585 which is described later.

The speed change ratio of the output shaft to the input cylinder 522 is given by the following formula:

$$\text{Speed change ratio} = 1 + \frac{\text{capacity of hydraulic motor } 512M}{\text{capacity of hydraulic pump } 512P}$$

Therefore, by changing the capacity of the hydraulic motor 512M from zero to a certain value, it is possible to change the speed change ratio from 1 to any required value. Since, the capacity of the hydraulic motor 512M is determined by the stroke of motor plungers 534, the speed change ratio can be controlled from 1 up to a certain value continuously by moving the motor swashplate 535 from the perpendicular position to a certain inclined position by operation of the motor swashplate holder 537.

The connection of the continuously variable transmission 512 to the engine 505, as described before, is done directly via the rotation plate 530 fitted to the crankshaft 516, the cylindrical body 531 and the damper mechanism 532. The connections between the rotation plate 530, cylindrical body 531 and damper mechanism 532 are covered by the casing $C_0$ to prevent ingress of rain water or dust into the inside. The casing $C_1$ is connected to the casing $C_0$.

A shaft 580 is placed on the right hand side of the output shaft 541 of the continuously variable transmission (in FIG. 34, the opposite side from the side which faces to us). This shaft 580 is supported by casing $C_0$ so that it can rotate freely and in parallel with the output shaft 541. The gear 581 is fixed to the shaft 580, meshed with the gear 582 which is bolted to the rotation plate 530, and rotated by rotations of the crankshaft 516. This rotation is transmitted via a coupling 583 to a generator 584.

A lay shaft 585 is supported by casing $C_1$ so that it can rotate freely and in parallel with the output shaft 541 of the continuously variable transmission. The counter shaft 585 of the rear wheel projects outside the casing $C_1$, and a gear 585 is adhered to the projected end. The gear 586 is meshed with a gear 544 fixed to the output shaft 541. The counter shaft 585 of the front end also projects outside the casing $C_1$, and a gear 587 is fitted to the projected end.

A connection shaft 590 is spline fitted to a rachet wheel 591 so that it can rotate as one with the connection shaft 590 and slide freely in the axis line direction. The rachet wheel 591 is pushed forward by a spring 592. To the front end of the connection shaft 590, a gear 593 is fixed and meshed with the gear 587. This gear 593 and the rachet wheel 591 are connected only when the rachet wheel 591 moves forward. Namely, in the connection shaft 590, the rachet wheel 591 is geared with the gear 593 which is normally pushed forward by a spring 592. However, when the transmission torque between both members 591 and 593 reaches or exceeds a prescribed value, the nail wheel, by the reaction force of a slope which is provided in the portion to be geared with the gear 593, moves rearwardly against the spring 592 and the connection of both members 591 and 593 are released to operate as a kind of torque limiter. The front end of the drive shaft 514 is connected to the rear end of the connection shaft 590 via an universal joint 594 and the rear end of the drive shaft 514 is connected with the rear wheel 509 which is the driving wheel.

A gear 596 is attached to the outer periphery of the connection shaft 590 which also works as a spring holder. The gear 596 is connected to a back gear system which is used during backward driving. A gear 597 is attached to the outer periphery of the cylindrical body 531 and is connected with a starter motor which is not shown in the figure.

According to the transmission system of the above-stated composition, the output shaft 541 of the continuously variable transmission 512 is placed in parallel and coaxially with the crankshaft 516. The continuously variable transmission 512 has a tubular form and is smaller in diameter than a transmission system which comprises plural gears, chains or V belts. Therefore it is possible to make the body compact in the width direction.

As the continuously variable transmission 512 is placed coaxially with the crank axis of the crankshaft 516 and is directly connected, it is possible to reduce the number of parts and aim at a lightweight unit compared with the case in which the connection is made by a combination of chains or gears and other special members. As the generator 584, the gear 597 for connecting the starter motor and other engine auxiliary devices are placed together at the joint of the end faces of both, improvements in the assembly and maintenance can also be realized.

FIG. 35 shows the modification of the sixth embodiment of the present invention. The point at which this modification differs from the aforementioned sixth embodiment, is that while the drive shaft 514 and the rear wheel 509 swing separately from the engine 505 side in the sixth embodiment, the drive shaft 514, the engine 505 and the continuously variable transmission 512 are made as a unit with a casing 595 and they swing as one. In particular, the embodiment is suitably used for motor bicycles of the scooter type.

Specifically, the drive shaft 514 is placed in parallel with the output shaft 541 of the continuously variable transmission 512 and offset in the left direction. The shaft 514 is connected via gears 596 and 597 with the output shaft 541. The rear end of the drive shaft 514 is connected with the rear wheel 509 via bevel gears 598 and 599. The above-stated engine transmission system 512 and rear wheel 509 are made as one to become a power unit P.

In the non-step hydraulic type speed change transmission, while concave portions are formed at the ends of plungers 527 and 534 for both the pump side and the motor side, convex portions are formed at the swashplates 528 and 535. These concave and convex portions are fitted together, forming the reverse fitting composition to those of the sixth embodiment.

By doing this, it is possible to reduce the amount of projection of the plungers 527 and 534 from the cylinder block 525 and the thickness of the swashplates 528 and 535 can be increased. Therefore, it is possible to reduce size for the same strength, and by the multiple effects of these, it is possible to reduce the axial length of the continuously variable transmission 512 by bringing swashplates 528 and 535 closer to the cylinder block 525.

That the output shaft 541 of the continuously variable transmission 512 is placed in parallel and coaxially with the engine crank axis 516, and that the axis 541 is not connected directly to the crankshaft 516 are the same as the aforementioned sixth embodiment. A universal joint which is fitted to the front end of the drive shaft 514 in the sixth embodiment is also not necessary.

The seventh embodiment is described in the following section. Integration of the transmission gear with the engine in the crankcase involves the following difficulties: (1) It is difficult to assemble the engine component parts and the transmission component parts independently and in parallel, and so the assembling is not readily made. (2) In the case of a failure of the engine or transmission gear, both have to be removed and so maintenance is troublesome. (3) The oil for lubrication of the engine and that of the transmission gear are mixed in the common crankcase, and so separate oils are not usable, while it is preferable to use separate oils suitable for the conditions of use (temperature, frequency, etc.) for lubrication of the engine and transmission.

This embodiment was particularly made in view of the single structure of the static hydraulic continuously variable transmission gear covered by a casing, as previously applied for patent by the present applicant, and is intended to provide, through use of the static hydraulic continuously variable transmission gear which is distinguished in assembly facility and maintenance and allows for use of exclusive lube oils for engine and transmission gear.

To achieve the foregoing object, the connecting structure of the present invention is characterized in that the engine and static hydraulic continuously variable transmission in separate structures covered by separate casings have their casings partly opened to present exposed surfaces which are connected to each other.

According to the foregoing configuration, the engine and the static hydraulic continuously variable transmission can be assembled separately in parallel and thereafter be integrated so that the assembling facility is improved. In the case of a failure of the engine or continuously variable transmission, only the component in failure need be taken out and disassembled for repair, and so the maintenance is enhanced. Further, on account of the end face connection, the internal space of the engine and that of the continuously variable transmission are separated with, say, a simple blind plate interposed therebetween, and so there is little possibility of communication between these spaces, and thus exclusive oils are usable for the engine and continuously variable transmission respectively.

The present invention will now be described with reference to an embodiment shown in the accompanying drawings in which FIGS. 36 and 37 are respectively side and front views of a motorcycle having the engine and static hydraulic continuously variable transmission connecting structure of the present invention.

In FIG. 36, a frame 601 extends from the front to the rear (from left to right in the drawing) of the vehicle. A front fork 602 is fitted to the front end of the frame 601. A front wheel 603 is rotatably supported at the extreme end of the front fork 602. A steering handle 604 controls the front wheel 603. A horizontally opposed 6-cylinder engine 605 is carried on the frame 601. A fairing 606 covers the front and side of the frame 601 and the engine 605 and also the front of the rider on the seat 607. A rear fork 608 has its front part rotatably supported by the frame 601. A rear wheel 609 is supported on the rear end of the rear fork 608, and a holder 610 is for storing small articles.

The rotation of said engine 605 is transmitted through a power transmission device 611 to the rear wheel 609 which is a drive wheel. The power transmission device 611 is comprised, sequentially from the engine 605 side, of a static hydraulic continuously variable transmission 612 (which will be referred to simply as "continuously variable transmission gear" in the following), a coupling unit 613 and a drive shaft 614.

The engine 605 has a crankshaft, shown by numeral 616 in FIG. 38, which extends in the longitudinal direction of the vehicle body (in the drawing left is the front of the vehicle, and right is the rear, and in the following, the front and rear will be referred to as such), said crankshaft 516 being coupled across a connecting rod 617 to a piston 619 fitting into one of a plurality of cylinders 618 extending from nearly the central part outward to the left and right of the vehicle body. In FIG. 38, only the cylinders 618 on one side are shown, but actually three cylinders 618 are provided in each of the left and right cylinder blocks. A camshaft 620 is coupled to the crankshaft 616 across a timing belt 620a.

As shown in FIG. 38, the engine 605 and the continuously variable transmission gear 612 are formed as separate structures covered by separate casings $C_1$ and $C_2$. The continuously variable transmission gear 612 is disposed in the rear of the engine 605, and the front opening of the transmission casing $C_2$ is against the rear opening of the engine casing $C_1$ to effect the end face connection of the continuously variable transmission gear 612 to the engine. In the embodiment, a coupling unit comprised of components 680a-680g having the direction of revolution arranged to the left and right direction of the vehicle body and covered by a casing $C_0$ is interposed between both the engine 605 and the continuously variable transmission gear 612.

Also, in the embodiment, there are assembled at the connecting ends of both the engine 605 and the transmission gear 612 or, more specifically, the coupling unit 680, auxiliary machines of the engine including a generator 681, an oil pump 682 and a starter motor 683 and also the drive shaft 614 inserted from the rear to the front of the vehicle body with the axes extended in the direction of front-to-rear of the vehicle body, as shown in FIG. 38.

Now, the structure of setting the continuously variable transmission gear 612 and the auxiliary machines to the engine 605 will be described. At the rear part of the crankshaft 616, the gear 680c, the unilateral clutch 680b and the gear 680c are firmly fitted, and to the shaft end, the oil pump 682 is assembled. The gear 680a is in engagement with the gear 680d set on a shaft 685 which is coupled across a coupling 686 to the generator 681.

The gear 680a is in engagement with the gear 680f which is rotatably fitted over the periphery of the output shaft 641 of the continuously variable transmission gear 612, and the revolution of the gear 680f is transmitted through a cylinder 631 rotatably supported on the periphery of the output shaft 641 and a damper mechanism 632 connected to the rear end of the cylinder 631 to the input cylinder shaft 622 of the continuously variable transmission gear 612. Further, before the gear 680f at the front end part of the output shaft 641 of the continuously variable transmission gear 612, there are firmly fitted a sprocket 680g leading to a worm pump, which is not shown, and a gear 680h.

Rotation of the gear 680h is transmitted via floating gears 680i and 680j to a gear 680k. Further, on a shaft 690 rotatably supporting the gear 680k, a ratchet wheel 680l is assembled which is adapted to rotate integrally with the shaft 690 and slide in the axial direction of the shaft through a spline fitting The ratchet wheel 680l is energized forward by a spring 692 to come normally into engagement with the gear 680k, but when the transmission torque between the ratchet wheel 680l and gear 680k increases over a certain value, the ratchet wheel 680l moves back against the spring 692 by the reaction force of a slope provided in the engagement of the ratchet wheel 680l with the gear 680k to release the engagement with the gear 680k, that is, the gear 680k, ratchet wheel 680l and spring 692 form a torque limiter.

Across a connector 694 to the rear end of the shaft 690, the front end of the drive shaft 614 is coupled across a cross joint in such a way as to be capable of tilting.

Also, on the periphery of the shaft 690 is firmly set a gear 680m, and this gear 680m comes into engagement with a gear 680n which is adapted to slide in the front-to-rear direction only when the latter gear moves forward. In the rear of the gear 680n, a gear 680o adapted to rotate integrally with the gear 680n is disposed. The gear 680o is normally in engagement with the output shaft of the starter motor 683. The starter motor 683 is in engagement with said gear 680c via a gear 680p fitted on its output shaft and a floating gear 680q. The starter motor 683 is thereby coupled to the crankshaft 616 (FIG. 38 being a developed drawing of the gears so that these are not drawn in the state of engagement but are actually in engagement).

When the gear 680n is caused to move forward to engage the gear 680m and thus move the vehicle back by the starter motor 683 or start the engine 605, the clutch built in the continuously variable transmission gear 612 is set to off so that the drive force of the starter motor 683 is by no means transmitted to unnecessary parts.

Now, the static hydraulic continuously variable transmission gear 612 will be described. This continuously variable transmission gear 612 is comprised of a fixed capacity type swashplate hydraulic pump 612P and a variable capacity type swashplate hydraulic motor 612M.

The hydraulic pump 612P is comprised of an input cylinder shaft 622, a cylinder block 625 relatively rotatably supported via a ball bearing 624 on a support cylinder 623 bolted to the input cylinder shaft, a number of plungers 627 slidably fitted into a number of cylinder holes formed on the front end of the cylinder block 625 with a mutual spacing and in parallel to the axis of revolution of the cylinder block, and a pump swashplate 628 having its front surface in contact with the external ends of the pump plungers 627. The pump swashplate 628 has its back surface supported by a holder 622a of said input cylinder shaft 622 across an angular contact bearing 629 and is held in a tilted condition for a certain angle to the axis of the cylinder block about an assumed trunnion axis $O_1$ which is rectangular to the axis of the cylinder block 625.

The angular contact bearing is so constructed as to give an aligning effect to the pump swashplate 628 in cooperation with the swashplate holder 622a on the input cylinder shaft 622. As the input cylinder shaft 622 revolves with the crankshaft 612, the pump swashplate 628 gives a reciprocal movement to the pump plungers 627 to repeat the suction and discharge processes.

The hydraulic motor 612M is comprised of the cylinder block 625 which is commonly used with the hydraulic pump 612P, a number of motor plungers slidably fitted into a number of cylinder holes 633 formed on the rear end face of the cylinder block with a spacing provided to one another around and in parallel to the axis or revolution of the cylinder block, a motor swashplate 635 engaging the outside end surfaces of these motor plungers, a motor swashplate holder 637 supporting the back of the motor swashplate 6235 across an angular contact bearing 636, and a motor swashplate anchor 638 supporting the back of the motor swashplate holder 637.

Both the pump and the motor have respectively recessed parts formed on the ends on the sides of the plungers 627 and 634, while corresponding projections are formed on the swashplates 628 and 635. These projections are adapted to fit into the recesses. By this, projection of the plungers 627 and 634 over the cylinder block 625 can be reduced. Further, the swashplates 628 and 635 have certain thicknesses secured, and so when a certain strength is set, their sizes can be reduced. On account of the synergetic effect of these, there is provided an advantage that the swashplates 628 and 635 can be brought close to the cylinder block 625 to reduce the size in the axial direction of the continuously variable transmission gear 612.

Also, the opposing surfaces of the motor swashplate holder 637 and motor swashplate anchor 638 in engagement with each other are formed in a spherical surface about the point of crossing of the axis of the cylinder block 623 and the trunnion axis $O_2$. In this hydraulic motor 612M, the angular contact bearing 636 is so constructed as to give an aligning effect to the motor swashplate 635 in cooperation with the motor swashplate holder 637. The motor swashplate anchor 638 is fixed, together with a cylindrical cylinder holder 639 linked to its front end to the rear side wall of the transmission casing $C_1$. This cylinder holder 639 supports the periphery of nearly the central part of the cylinder block 625 rotatably across a ball bearing 640.

The motor swashplate 635 is adapted to move between the erect position at right angles to the axis of the cylinder block 625 and a maximum tilting position at which it is tilting at a certain angle through rotation of the motor swashplate holder 637. Under the tilted condition, the swashplate 635 gives a reciprocal movement to the motor plungers. with revolution of the cylinder block 625.

The angle of tilting of the motor swashplate holder 637 is manually or automatically adjustable with speed as a tongue 637a projecting over the casing $C_1$ actuates a tilting mechanism which is not shown. Here, details of the tilting mechanism will be omitted.

The cylinder block 625 has an output shaft 641 penetrating at the central part. This output shaft 641 is so disposed as to extend in the front-to-rear direction of the vehicle in parallel with the engine crankshaft 616. The output shaft 641 and the cylinder block 625 have the relative rotation around the output shaft 641 constrained as the splines 641a and 625a formed in each part fit to each other.

The front end part of the output shaft 641 penetrates through the pump swashplate 628, the holder unit 622a of the input cylinder shaft 622, a damper mechanism 632 and a revolving body 631 Between the output shaft 641 and the input cylinder shaft 622, a bearing 642 is interposed. The rear end of the output shaft 641 extends so as to penetrate through the motor swashplate 635, motor swashplate holder 637 and motor swashplate anchor 638, with a bearing 643 interposed to the motor swashplate anchor 638.

When the continuously variable transmission gear 612 is set to the casing $C_2$, the input cylinder shaft 622 is supported across a ball bearing 647 on a holder 648 bolted to the casing $C_2$, and the motor swashplate anchor 638 is fixed to the rear side wall of the casing $C_2$ by means of bolt 649. On the rear side wall of the casing $C_2$, a cap 651 is set which is adapted to close the maintenance hole opened there.

In the cylinder block 625, there are provided annular inner and outer oil channels 663 and 664 concentrically arranged about the output shaft 641 between the cylinder holes 626 on the pump side and the cylinder holes 633 on the motor side, first and second valve holes 665 and 666 respectively in the same number with said cylinder holes 626 and 633, the first and second valve holes radially penetrating through the annular partition wall between both oil channels 663 and 664 and the outer peripheral wall of the outer oil channel 664, connecting oil channels communicating said valve holes 665 and 656 to said outer oil channel 664, pump ports "a" communicating the adjacent cylinder holes 626 and first valve holes 665 to each other, and a number of motor ports "b" communicating the adjacent cylinder holes 633 and second valve holes 666 to each other.

The inner oil channel 663 is formed as an annular groove on the inner surface of the cylinder block 625, and its open side is closed by the outer surface of the output shaft 641. The connecting oil channel communicating the valve holes 665 and 666, the pump ports "a" and the motor ports "b" are so formed as to surround the first and second valve holes 665 and 666 over the whole surface between the cylinder block 625 and the member fixed on this block 625.

The first valve hole 665 has a spool type first distribution valve 669, and said second valve hole 666 has a spool type second distribution valve 660, slidably fitted, respectively. To the outer end of the first distribution valve 669, a first eccentric 671 is fitted to surround the valve. To the outer end of the second distribution valve 670, a second eccentric 672 is fitted to surround the valve, respectively across ball bearings.

The first eccentric 671 is integrally formed with a bearing cylinder 623 and is positioned at a position biased a certain distance from the center of the output cylinder shaft 622 along the assumed trunnion axis $O_1$.

The second eccentric 672 is rotatably provided about a pin 673 on the cylinder holder 639 and is changeable to either a "clutch off" condition to increasing eccentricity or a "clutch on" condition to adequate setting of the eccentricity by operating means which is not shown. In the case of input to the continuously variable transmission gear 612 via the input cylinder shaft 622 under the "clutch off" condition, the second distribution valve 670 makes only a reciprocal movement in the valve hole 666, and as the second distribution valve 670 comes to the inner and outer positions, it opens the outer oil channel to other than the cylinder block 625, and so no power transmission is experienced.

According to the continuously variable transmission gear 612 of the foregoing configuration, when relative revolution is produced between the bearing cylinder 623 (revolving integrally with the input cylinder shaft 622) and the cylinder block 625, each first distribution valve 669 is caused to move by the first eccentric 671 reciprocally in the first valve hole 665 between the inner and outer positions in the radial direction of the cylinder block 625 with two times the eccentricity as a stroke. And, in the discharge region of the hydraulic pump 612P, the first distribution valve 669 moves to said inner position to communicate the corresponding pump port "a" to the outer oil channel 664 and disconnect the same from the inner oil channel 663. Then, the service oil is pressure fed from the cylinder hole 627 to the outer oil channel by the pump plunger 628 in the discharge process. Also, in the suction region, the first distribution valve 669 moves to the outer position to communicate the corresponding pump port "a" to the inner oil channel 663 and disconnect the same from the outer oil channel 664. Then, the service oil is fed into the cylinder hole 626 from the inner oil channel 663 by the pump plunger in the suction process.

On the other hand, as the cylinder block 625 revolves, each second distribution valve 670 is caused to move by the second eccentric 672 reciprocally in the second valve hole 666 between the inner and outer positions in the radial direction of the cylinder block 625 with two times the eccentricity as a stroke. In the expansion region of the hydraulic motor 612M, the second distribution valve 670 moves to the inner position to communicate the corresponding motor port "b" to the outer oil channel 664 and disconnect the inner oil channel 663. The high pressure service oil is fed from the outer oil channel 664 to the cylinder hole 633 of the motor plunger 634 in the expansion process. In the shrinkage region, the second distribution valve 670 moves to the outer position to communicate the corresponding motor port "b" to the inner oil channel 663 and disconnect the same from the outer oil channel. In this way the service oil is discharged from the cylinder hole 633 of the motor plunger 634 in the shrinkage process to the inner oil channel 663.

The pump plunger 627, as it passes the discharge region, pressure feeds the service oil from the cylinder hole 626 to the outer oil channel 664. As it passes the suction region, it intakes service oil from the inner oil channel 663 to the cylinder holes 626. Further, the high pressure service oil fed to the outer oil channel 664 is supplied to the cylinder hole 633 of the motor plunger 634 in the expansion region of the hydraulic motor 612M. The service oil is discharged from its cylinder hole 633 to the inner oil channel 663 by the motor plunger 634 present in the expansion region.

By the sum of the reaction torque which the cylinder block 625 receives from the pump swashplate 628 via the pump plunger 627 in the discharge process and that which the cylinder block 625 receives from the motor swashplate 636 via the motor plunger 634 in the expansion process, the cylinder block 625 revolves, and its revolution toque is transmitted from the output shaft 641 through the gears 680i and 680j to the drive shaft 614.

In this case, the transmission gear ratio of the output shaft 641 to the input cylinder shaft 622 is given by the formula $$\text{Transmission gear ratio} = 1 + \frac{\text{Capacity of hydraulic motor } 612M}{\text{Capacity of hydraulic pump } 612P}$$

Therefore, by changing the capacity of the hydraulic motor 612M from zero to a certain value, it is possible to change the transmission gear ratio from unity (i.e., 1) to a certain required value. Here, the capacity of the hydraulic motor 612M is determined by the stroke of the motor plunger 634, and so by operating the motor swashplate holder 637 to tilt the motor swashplate 635 from the erect position to a certain position, the transmission gear ratio is infinitely adjustable from unity (i.e., 1) to a certain value.

According to the foregoing connecting structure, the engine 605 and continuously variable transmission gear 612 are separately constructed, and so the engine 605 and continuously variable transmission gear 612 are fabricated separately and in parallel and are then connected integrally. Thus, the assembling facility is enhanced as compared to the conventional system.

In the case of a failure of the engine 605 or continuously variable transmission gear 612, it is enough to remove only the component in failure (605 or 612), without removing the other component (612 or 605) for repair. Thus, the maintenance is made with ease. Furthermore, both are endconnected, and the gears 680f, 680g and 680h interposed therebetween perform the function of a blind plate, and so the space in the engine 605 and that in the continuously variable transmission gear 612 are separated, and thus there is little possibility of communication between these spaces. Then exclusive lube oils are usable for the engine and transmission gear, respectively, resulting in improvement of the durability of the parts.

In the foregoing embodiment, not only the continuously variable transmission gear 612 but the generator 681 and motor starter 683 and other auxiliary machines of the engine are endface connected to the engine and in this respect, maintainability of the auxiliary machines of engine is improved.

As described above, according to the connecting structure of the invention, the engine and the static hydraulic continuously variable transmission gear are assembled separately and in parallel and then integrated so that the assembling facility is enhanced. Further, in the case of a failure of the engine or continuously variable transmission gear, only the component in failure should be removed and disassembled for repair, and thus maintainability is improved. Still more, the end-face connection is employed so that by interposing a simple blind plate, the internal space of the engine and that of the continuously variable transmission gear are clearly separated with little possibility of communication of both spaces so that exclusive oils are usable for the engine and the continuously variable transmission gear, respectively, to ensure improvement in durability.

An eighth embodiment of the present invention is explained by way of an example illustrated in FIG. 39 and FIG. 40. In FIG. 39, A motorcycle 701 is shown to which the present invention is applied. The motorcycle 701 consists of a body frame 702 extending from the front to the back part of the body, which is illustrated from the left to the right in FIG. 39, a front fork 703 installed in front of the body frame 702, a front wheel 704 sustained under the front fork 703 in a rotation-free way, a steering handle 705 installed on the upper position of the said front fork 703, a rear fork 706 extended toward the said front fork 703, a rear fork 706 extended toward the rear side of the vehicle body sustained with the body frame 702 in a vibration-free way at the vibrational edge of the rear fork 706, a front cowl 708 covering the front part of the steering handle 705 and the front part of the body frame 702, a rear cowl 709 covering the rear part of the body frame 702 and both sides thereof and finally a power plant 710 directly concerning the present invention which is installed approximately in the middle of the body frame 702 and the rear wheel 707. A fuel tank 711 and a seat 712 are also illustrated in FIG. 39.

The power plant 710 consists of an engine 713 installed approximately in the middle of the body frame 702, a continuously variable hydraulic transmission 714 (hereinafter called continuously variable transmission) annexed to the underneath of the engine 713, and a driving shaft 716 connecting the continuously variable hydraulic transmission 714 and a body axis 715 of the rear wheel 707.

The engine 713 is, as shown in FIG. 40, connected with the crankcase $C_1$ installed in a rotation-free way, and two sides of the cylinder block 713a are separately installed about the crankshaft 717 (only one side of the cylinder block 713a is shown in FIG. 40). In each of the cylinder blocks 713a, a horizontally face-to-face 6-cylinder type engine is defined by three cylinders 713b. The crankshaft 717 extends along the direction of the main length of the body. The said continuously variable transmission 714 is assembled with the power output axis 718 in parallel to the crankshaft 717, and, as shown in FIG. 39 and FIG. 40, connected to the drive shaft 716 through the counter shaft 719 installed in parallel to the power output axis. This is the approximate assembly structure of the motorcycle.

Explaining further certain details of the engine 713, a pair of driving pullies 721 is fixed in the same direction with the axis where the cam belt 720 is rolled at one end of the crankshaft 717. The camshaft 722 is installed in a rotation-free way in the cylinder head 713c annexed to the cylinder block 713a. The cam belt 720 is rolled on the driven pulley 723 attached to one end of the camshaft 722 to connect with the crankshaft 717. The camshaft 722 synchronously rotates with the crankshaft 717. In each cylinder 713b of the said cylinder block 713a, a piston 724 is slidably included, which piston 724 is then connected to the crankshaft 717 through a connecting rod 725. Further, the drive gear 726 for power output is attached at the other end of the crankshaft 717. The oil pump 727 is connected along the same axis in order to feed the lubricant oil to each lubrication part of the engine 713. The driven gear 729 of the generator 728 which is attached to one end of the crankcase $C_1$ is connected to the drive gear 726 to rotate the generator 728.

As to the continuously variable transmission 714, it includes a constant volume type of swashplate oil-pressure pump P. The oil pump P consists of the power input cylinder axis 731 supported with the transmission case $C_2$ adjoined to the crankcase $C_1$ by the ball bearing 730 in a rotation free way. A cylinder block 734 is connected with a support cylinder 732 by a bolt to a power input cylinder axis 731 through a ball bearing 733 in a rotation-free way. At one end of the cylinder block 734, pump plungers 736 are connected in a sliding-free manner to each of an odd number of cylinder holes 735 which are in parallel to the rotation axis line and at an appropriate distant apart around the rotation axis line. A pump swashplate 737 is supported from behind by a power input cylinder axis 731 through an angular contact bearing 738 and is inclined at a constant angle to the axis of the cylinder block 734 centering the virtual trunnion axis line $O_1$ perpendicularly crossed to the axis line of the cylinder block 734. The angular contact bearing 738 provides a tuning effect to the pump swashplate 737 in cooperation with the power input cylinder axis. The pump swashplate 737, as the input cylinder axis 731 rotates, provides the back and forth movement to the pump plungers 736 for repeating the intake and exhaust processes.

An oil-pressure motor M consists of the common cylinder block 734 with the oil pump P, motor plungers 740 connected on the side of the rear part in a sliding-free manner to each of the even number of the cylinder holes 739 which are in parallel with the rotational axis line, a motor swashplate 741 connected to the outer end surface of these motor plungers 740, a motor swash holder 743 supported through an angular contact bearing 742 behind the motor swashplate 741, and a motor anchor 744 supporting behind the motor swashplate holder 743 between an angle from the vertical position perpendicular to the axis of the cylinder 734 toward the most inclining position, creating the back and forth movement under the inclining condition for the motor plunger 740 to repeat the expansion and contraction processes by the rotation of the cylinder block 734.

Further, the inclined angle of the motor swashplate holder 743 can be adjusted by the inclining mechanism, which is not shown in this Figure but which is installed in the outer part of the transmission case $C_2$, for example. The automatic adjusting mechanism operates in accord with the rotational cycle of the engine 713 or the speed of the vehicle or the degree of opening of the throttle. The details of this inclining mechanism is herein abbreviated.

The power output axis 718 extends through the center of the cylinder block 734. This power output axis 718 is arranged in the parallel direction to the crankshaft 717 of the engine 713. The said power output axis 718 and the cylinder block 73 are restricted in their relative rotational motion along the power output axis 718 by the spline 746 and 747. One end of the power output axis is extends through the motor swashplate 741 and the motor swashplate holder 743 and the motor swashplate anchor 744, and is assembled so as to rotate with the motor swashplate anchor 744 in the relative rotation-free manner by installing at the end of the power output to fix the gear 750 which is then fixed to one end of the counter shaft 719.

The other end of the power output axis 718 is positioned at the other edge of the pump swashplate 737 and the input cylinder axis 731. The flange 751 is formed on the position within this input cylinder 731 to be anti-directional to the axis line of the inner surface of the input cylinder axis 731.

Since the needle bearing 752 is included between the outer surface of the flange 751 and the inner surface of the input cylinder axis 731, and also the thrust roller bearing 753 is included along the axis direction between the flange 751 and the input cylinder 731, the pressure from the pump plunger 736 to the input cylinder 731 provides effective tension toward the output axis 718 through the thrust roller bearing 753 and the flange 751.

In the cylinder block 734, there are the following: the circularly positioned inner oil path 754 and the outer oil path 755 along the axis centering the output power axis 718 between the cylinder holes 735 on the side of the pump and the circularly separated wall between both oil paths 754 and 755, the outer wall of the outer oil path 755 penetrated by the power output axis 718, the cylinder holes 735-739 and the same number of each first valve holes 756 and second valve holes 757, the connecting oil path of each valve hole 756-757 to the outer oil path 755, the pump port "a" connecting the annexed cylinder hole 735 and the first valve hole 756, and many of the motor ports "b" mutually connecting the annexed cylinder holes 739 and the second valve holes 757.

The said inner surface 754 is formed as a circular channel on the inner surface of the cylinder block 734 and the open side is closed by the outer surface of the power output axis 718. Further, the oil path of each valve hole 756-757, pump port "a" and motor port "b" are formed to surround the whole range of the holes of the said first and second valves 756-757 between the cylinder block 734 and the connected parts thereof.

The first distributing valve of the spool type 758 in the first valve hole 756 and the second valve hole in the second distributing valve 759 are attached by way of sliding-free connection. The outer end of the first distributing valve 758 is surrounded by the first eccentric ring 760 and the outer end of the second distributing valve 759 is surrounded by the second eccentric ring 761.

The first eccentric ring 760 is connected to the supporting cylinder 732 through the ball bearing 762, and is positioned along the virtual trunnion axis line $O_1$ from the output cylinder axis 718 to the position of the predetermined eccentric position through the ball bearing 763 to the motor swashplate anchor 744.

In the assembled continuously variable transmission 714, when the relative rotation motion is generated between the supporting cylinder 732 (rotating synchronously with the power input cylinder 731) and the cylinder block 734, each of the first distributing valves 758 move back and forth between the outer and the inner position within the radius of the cylinder block 734 at a stroke of twice the distance of the eccentric amount at the first valve hole 756 by means of the first eccentric ring 760. In the area of extrusion of the oil pump P, the first distributing valve 758 is moved to the side of the inner position side and the corresponding pump port "a" is open to the passage to the inner oil path 754 and at the same time closed to the outer oil path 755. The lubrication oil is withdrawn to the cylinder hole 735 from the inner oil path 754 through the pump plunger 735 during the process of the withdrawal.

When the cylinder block 734 rotates, each of the second distributing valves 759 moves back and forth between the outer and inner position within the radius of the cylinder block 734 at a stroke of twice the distance of the eccentric amount at the second distributing valve 757 by means of the second eccentric ring 761 and in the expansion area of the oil pressure motor port "b" is open to the outer oil path 755 and closed to the inner oil path 754. By the motor plunger 740 in its expansion process, the high pressure lubrication oil is supplied to the cylinder hole 739. Further, in the contraction area, the second distributing valve 759 is moved to the outer position side and the corresponding motor port "b" is open to the passage to the inner oil path 754 and closed to the outer path 755. The lubricating oil is extruded from the cylinder hole 739 of the motor plunger 740 to the inner oil path 754.

The pump plunger 736, during the passage through the extrusion area, presses the lubricating oil from the cylinder hole 735 to the outer oil path 755. During the passage through the withdrawal area, the lubricating oil is withdrawn to the cylinder hole 735 from the inner oil path 754. Again, the high pressured lubricating oil is sent to the outer oil path 755, supplying the pressured lubricating oil to the expansion area of the cylinder hole 739 of the motor plunger 740 in the expansion area of the oil pressure motor. The motor plunger 740 in the stage of the contraction area withdraws lubricating oil from the cylinder 739 to the inner oil path 754. During this period, the reaction torque applied to the cylinder block 734 from the pump swashplate 737 through the pump plunger 736 in its expansion process are both added to rotate the cylinder block 734 and this rotating torque is transmitted to the counter shaft 719 though a pair of gears 749 and 750 from the power output axis 718. In this case, the reduction rate of the output axis 718 against the power input cylinder axis 731 is given below:

$$\text{Ratio} = 1 + \frac{\text{Volume of oil pressure motor } M}{\text{Volume of oil pressure motor } P}$$

Therefore if the volume of the motor is varied from zero to a constant value, the reduction ratio can be varied from 1 to the desired value. Further, since the volume of this oil pressure motor M is determined by the stroke of the motor plunger 736, the motor swashplate 741 can be moved by means of the motor swashplate holder 743 from the vertical position to a certain slanting position, and accordingly the reduction ratio can be regulated from 1 to a desired value.

Connection between the continuously variable transmission 714 and the engine 713 can be made at will by the starting clutch 764 which is installed between the other end of the power input axis 731 and the crankshaft 717. The starting clutch 764 is installed, as is the generator 728, at the other end of the engine 713 (shown in the lower part of FIG. 3, the backward side of the body) in a relative rotation-free way through the ball bearing 765 at the outer end of the surface of the power input cylinder 731. The starting clutch 764 consists of a driven gear 766 connected with the drive gear 726 attached to the crankshaft 717, a connecting axis 767 rotating with the power input cylinder axis 731, spline-connected to the other end of the inner surface of the power input cylinder axis 731, a clutch outer 768 fixed to the cylinder 766, a clutch inner 769 attached to the connection axis 767 in a way of relative rotation-free in the inner direction of the clutch outer 768. The multi-clutch disc is positioned in the direction of the rotatory axis line and is alternately connected to the clutch outer 768 and clutch inner 769. A pressure plate 771 controls the multi-clutch disc.

The cylinder 766a is supported in a rotatory free way to the clutch case $C_1$ through the ball bearing 772 around the outer circumference. On one side, the clutch disc 770 of the pressure plate 771 is positioned and also on the opposite side, there is an oil pressure room 773 to generate the oil pressure for driving the pressure plate 771 to the clutch disc 770.

The regulation of oil pressure in the oil pressure room 773 is conducted by the clutch lever L of the oil pressure generating instrument installed nearby the steering handle of the vehicle. Therefore, the rotating power of the clutch shaft 717 is transmitted to the power input cylinder 731 through the drive gear 766m clutch outer 768, clutch inner 769 and the conducting axis 767 and then to the counter shaft 719 through the power output 718, and gears 749, 750 after the change of speed by the continuously variable transmission 714.

The counter shaft 719 is supported in a rotation-free way to the transmission case $C_2$ through the ball bearing 774-775 on both ends in the direction of the counter shaft 719. On one other end, the gear 776 is fixed to the counter shaft 719 as one part. The counter shaft 719 is coupled through the gear 776 to the rear part of the final shaft 777. This final shaft 777 is supported in a rotatory fee way to the transmission case $C_2$ through a pair of ball bearings 778-779. There is a neutral clutch 780 between the one end of the final shaft 777 and the gear 776 attached to the counter shaft 719 and connected to the reverse mechanism 781 approximately positioned in the middle of the direction of the length.

The neutral clutch 780 consists of a sleeve 783 connected through a spline 782 at the final shaft 777. The driven gear 784 is maintained in an engaged condition with the gear 776 of the counter shaft 719 at the one end of the sleeve 783. The slider 785 is connected with the driven gear 784 by sliding toward the length of the sleeve 783 which is spline-connected to the outer part of the sleeve 783. The slider 785 is also connected to the shift lever 786 to regulate the connecting position in a relative rotation-free way.

The neutral clutch 780 can be disconnected from the drive gear 784 by moving the slider 785 with the shift lever 786 during the backward movement of the vehicle in order to disconnect the final shaft 777 and the counter shaft 719.

Therefore the power transmission system ahead of the counter shaft 719 is disconnected from the final shaft 777 during backward movement. The reverse mechanism 781 consists of a drive gear 787 as one part approximately in the middle of the final shaft 777, a select gear 789 enabling the sliding movement along the direction of the length of an idle shaft 788 by spline-connection to the idle shaft 788 supported in a rotatory-free way with the transmission case $C_2$, an idle gear 792 always geared to a drive gear 791 of a starter motor 790 installed nearby the idle shaft 788, and a cam mechanism 793 for sliding movement of the select gear 789.

The cam mechanism 793 functions cooperatively with the shift lever 786 of the neutral clutch 780, consisting of an operational rod 794 forming a spiral cam channel 794a, a cylinder type cam floor 795 restricted in the rotary motion around the axis, but connected in a sliding free way along the direction of the length of the operational rod 794 and a pin 796 connected in a sliding free way to the cam channel 794a which is attached as one part to a cam floor 795 in a sliding free way. The cam floor 795 is attached free to rotate with the select gear 789, but with the select gear always fixed in the direction of sliding.

The starter motor 790 is connected with the said crankshaft 717 through a reduction gear 797 and a one way clutch 798. The continuously variable transmission 714, the counter shaft 719, the final shaft 777, and the starer motor 790 can also be arranged so as to surround the crankshaft 717 as illustrated in FIG. 40.

Thus, in the assembly of the power plant 710, since the rotary axis of the continuously variable transmission 714 is positioned in a parallel direction with the power transmission line, the continuously variable transmission 714 and the crankshaft 717 can be positioned in close so that the drive gear 726 and the driven gear 766 are accordingly in close. Even if the crankshaft 717 is arranged in a direction of the length of the vehicle, the power transmission line between the engine 713 and the continuously variable transmission 714 need not be altered.

Since the continuously variable transmission 714 is arranged underneath the crankshaft $C_1$, there is no protrusion toward the backward direction of the engine 713. Even when the engine 713 is installed as mentioned previously, there are no obstacles in space between the engine 713 and the back wheel 707. Since the continuously variable transmission 714 is in cylinder type and small in diameter, there is also a relatively small protrusion toward the underside of the engine 713 to satisfy the requirement for ground clearance. In the case of the application to the horizontal face-to-face opposed type engine 713 as mentioned previously, there is no protrusion from the cylinder block 713a extending to both sides of the crankshaft 717 and no interference in space with the cylinder head 713c and the continuously variable transmission 714. Therefore, the layout freedom of the instruments around the power plant 710 is synergistically increased.

Since the crankshaft 717 and the continuously variable transmission 714 are installed in parallel to each other, the continuously variable transmission 714 acts as a balancer for reaction torque for the crankshaft 717 to reduce the engine vibration. Since the continuously variable transmission 714 is mutually geared to the counter shaft 717 in parallel, the rotational mass of the continuously variable transmission 714 against the crankshaft 717 becomes larger and in turn antitorque balancing effectiveness is enhanced.

If the continuously variable transmission 714 is installed underneath the crankcase $C_1$ and its forward part is exposed on the vehicle, traveling wind directly impacts on the continuously variable transmission 714. In this way, the cooling effect can be highly enhanced. For the continuously variable transmission 714, especially in the case of the static oil pressure type of the continuously variable transmission 714, the high pressure of the lubricant oil will lead to large amounts of the heat generation. This cooling effect is especially valuable.

It should be understood that the example of each structure and size of the constituent parts are solely by way of examples. Further alteration can be introduced on the basis of the requirements depending on the type of vehicles and design for the application. For example, it is illustrated in the example that the connection of the continuously variable transmission 714 and the counter shaft 719 be made by a pair of gears 749–750 installed on the one end of the power output axis 718 and on the other end of the counter shaft 719. But, in place of this example, a pair of the gears 799–700 can be installed as one part approximately in the middle of the said cylinder block 734 along the direction of the length and also in the same way a pair of the gears 799–700 can be installed to the corresponding counter shaft 719.

The example is illustrated by the arrangement that the starting clutch 764 is installed between the crankshaft 717 and the continuously variable transmission 714. But, it is also possible to have the continuously variable transmission 714 also act as the starting clutch 764 to abbreviate the said starting clutch 764. By changing the eccentric amount or the eccentric direction of the first eccentric ring 760 or the second eccentric ring 761 to regulate the movement of the distribution valve 758–759 in order to release the closed oil pressure circuit inside the cylinder block 734 outwardly by leaking the working oil, or by circulation the working oil only within the oil pressure pump or the oil pressure motor to stop the movement of the working oil between the oil pump P and the oil pump M, it is possible to generate the starting clutch function. In this case, since the clutch is accommodated within the continuously variable transmission 714, the space for the engine can be even more compact.

Further, it is possible to abbreviate a neutral clutch 780 as shown in the said example. In this case, the clutch 764 or the continuously variable transmission 714 itself acts as the clutch function. The backward movement can be conducted by opening the connection between the crankshaft 717 and the subsequent structural parts.

In the example, by connecting the concave part at the end of the outer side of each plunger 736–740 to which the convex part of each swashplate 737–741 is complementarily fixed, this assembly makes the protrusion of each plunger 736–740 from the cylinder block 734 restricted in space and makes the swashplate 737–741 stronger in strength and thinner in thickness. By employing this approach, the swashplate 737–741 can be moved closer to the cylinder block 734 so that the length and/or size of the continuously variable transmission 714 can be smaller. If the space available is sufficient, each plunger 736–740 and each swashplate 737–741 can also be complementarily fixed in contrast to the example in the text.

A ninth embodiment of the present invention is explained based on FIGS. 41 and 42. An engine 813 is described in the following. As shown in FIG. 41, a pair of drive pulleys 821, to which a cam belt 820 is wound, are fixed coaxially to one end of a crankshaft 817 (in FIG. 41, the upper part and the front side of the vehicle), and, a camshaft 822 is mounted so that it can rotate freely in a cylinder head 813c which is provided continuously with each of the cylinder blocks 813a. With the cam belt 820 wound around a slave pulley 823 which is attached to one end of this camshaft 822, the camshaft 822 and the crankshaft 817 are linked, and thereby the camshaft 822 is rotated synchronously with the crankshaft 817.

In each of cylinders 813b which are formed in the cylinder block 813a, pistons 824 are inserted so that they can slide freely and connected via connecting rods 825 to the crankshaft 817.

To one end of the crankshaft 817 which is inside the drive pulley 821, a drive gear 826 for output is attached to the crankshaft 817. To the other end (in FIG. 41, the lower side and the rear side of the vehicle), an oil pump 827 for supplying lubricant to each of the lubricated parts of the engine 813 is connected coaxially. A generator drive gear 830 and a driven gear 829 of a generator 828 attached to the crankcase $C_1$ is coupled with the crankshaft 817, and thereby the generator 828 is rotated.

The continuously variable transmission 814 is explained in the following. The continuously variable transmission 814 comprises a swashplate type hydraulic pump P of the fixed capacity type and a swashplate type hydraulic motor M of the variable capacity type. The hydraulic pump P comprises an input cylindrical axis 832 which is supported, via a ball bearing 830 so that it can rotate freely, by a transmission case $C_2$ which is provided with a crankcase $C_1$, a cylinder block 835 which is supported, via a ball bearing 834 so that it can freely perform relative rotation, by a support cylinder 833 which is bolted to the input cylindrical axis 831, pump plungers 837 which are inserted so that they can slide into each of an odd number of cylinder holes 836 which are formed at the front of the cylinder block 835 at intervals around the rotation axis line and in parallel with the rotation axis line, and a pump swashplate 838 the front face of which is in contact with the outer ends of the pump plungers 837.

The pump plungers 837 and pump swashplate 838, by fitting of spherical concave parts 837a formed at the front end of the former and projected portions 838a formed in one with the latter, are restricted in their relative rotation around the rotation axis line of the output axis 818.

The pump swashplate 838 at this rear face is supported via an angular contact bearing 839 by the input cylindrical axis 832 and retained in that state and inclined by a certain angle against the rotation axis line of the cylinder block 835 with a supported trunnion axis line $O_1$ which intersects the axis line of the cylinder block 835 at right angles as the center. The angular contact bearing 839, in cooperation with the input cylindrical axis 832, gives the aligning operation to the pump swashplate 838. The pump swashplate 838, when the input cylindrical axis 832 rotates, gives reciprocal movement to pump plungers 837 and makes them repeat the suction and discharge process.

The hydraulic motor M comprises a cylinder block 835 which is jointly used by the hydraulic pump P, motor plungers 841 which are placed behind the former and inserted in the odd number of cylinder holes 840 which are formed around the rotation axis line at intervals and in parallel with the rotation axis line, a motor swashplate 842 which is in contact with the outer end faces of these motor plungers, a swashplate holder 844 which supports this motor swashplate 842 at its rear face via an angular contact bearing 843, and a motor swashplate anchor 845 which supports this motor swashplate holder 844 at its rear face.

The relative rotational movement around the output axis 818 of the motor plunger 841 and motor swashplate 842 is restricted by a fitting of the spherical concave portions 841a which are formed on the outer end faces of the motor plungers 841 and the projected portions 842a which are formed in one in the motor swashplate 842. The contact face of the mutually contacting motor swashplate holder 844 and motor swashplate anchor 845 is formed in a spherical face with the intersection of the axis line of the cylinder block 835 and the trunnion axis line $O_2$ as the center.

As seen in FIG. 41, the end face (or side face) of the hydraulic motor M through which the motor plungers 841 are inserted is formed in such a manner as to be inclined with respect to the axis of the cylinder bock 835, the side face being tapered toward the motor swashplate 842. Likewise, the end face (or side face) of the hydraulic pump P through which the pump plungers 837 are inserted is formed in such a manner as to be inclined with respect to the axis of the cylinder block 835, the side face being tapered toward the pump swashplate 838.

In this hydraulic motor M as well, the angular contact bearing 843 is composed so that it gives the aligning operation to the motor swashplate 842 in cooperation with the motor swashplate holder 844. The motor swashplate anchor 845 at its other end is adhered to the transmission case $C_2$ and supports the cylinder block 835 via a ball bearing 846 so that the cylinder block 835 can rotate freely.

The motor swashplate 842 is designed to perform reciprocal movement between the perpendicular position which intersects normally with the axis line of the cylinder block 835 and the maximum inclined position at which it is inclined with a certain angle. In the inclined state, it gives reciprocal movement to motor plungers 841 following the rotation of the cylinder block 835 to make them repeat the expansion and contraction processes.

The inclination angle of the motor swashplate holder 844 is adjusted automatically by an inclined movement mechanism (not shown in the figure) placed outside the transmission case $C_2$, for example according to the rotation speed of the engine 813, or speed of the vehicle or throttle opening.

The cylinder block 835 through its center pierces the output axis 818. This output axis 818 is placed in parallel with the crankshaft of the engine 813 and the output axis 818 and the cylinder block 835 are connected in a state that relative rotation around the output axis 818 is restricted by splines 847 and 848.

The output axis 818 pierces the pump swashplate 838 and is positioned in one end of the input cylindrical axis 832. A flange 849 is formed in the part where the one end of the output axis 818 is positioned in this input cylindrical axis 832 and is opposed to the inner face of the input cylindrical axis 832 in the axis line direction and in the radius direction.

Between the outer peripheral face of this flange 849 and the inner peripheral face of the input cylindrical axis 832, there is inserted a needle bearing 850. Between the opposing faces in the axis line direction of the flange 849 and the input cylindrical axis 832, there is inserted a thrust roller bearing 851. The pressure applied from the pump plungers 837 to the input cylindrical axis 832, via the thrust roller bearing 851 and the flange 849, acts as the tensile force to the output axis 818.

The other end of said output axis 818 extends to pierce the motor swashplate 842, the motor swashplate holder 844 and the motor swashplate anchor 845. A ball bearing 852 is inserted between the motor swashplate anchor 845. Thereby, the output axis 818 is supported by this motor swashplate anchor 845 so that it can perform freely the relative rotation.

In the cylinder block 835 are found a ring formed inner oil path 853 and outer oil path 854 placed coaxially with the output axis 818 as the center, first valve holes 855 and second valve holes 856, respectively the same number as that of the cylinder holes 836 and 840 which pierce a ring formed bulkhead between both oil paths 853 and 854 and the outer peripheral wall of the outer oil path 854 radially, a connection oil path which connects each of valve holes 855 and 856 to the outer oil path 854, pump ports "a" which mutually connect adjacent cylinder holes 840 and second valve holes 856.

The inner oil path 853 is formed in the ring form in the inner peripheral face of the cylinder block 835, and the open face is closed by the outer peripheral face of the output axis 818.

To the first valve holes 855 a spool type first distribution valve 857 and to the second valve hole 856 the same spool type second distribution valves 858 are respectively fitted so that they can slide. To the outer ends of first distribution valve 857 a first eccentric wheel 859 which surrounds them and to the outer ends of second distribution valve 858 second eccentric wheel 860 which surrounds them are connected, respectively.

The first eccentric wheel 859 is attached via a ball bearing to the support cylinder, and positioned at a point which is deviated by prescribed distance from the center of the output cylindrical axis 818 along the trunnion axis line $O_1$. The second eccentric wheel 860 is attached via a ball bearing 862 to the motor swashplate anchor 845 and held at a prescribed deviated position.

According to this continuously variable transmission 814, each of the first distribution valves 857, when the relative rotation occurs between the support cylinder 833 (which rotates in one with the input cylinder axis 832) and the cylinder block 835, are moved reciprocally by the first eccentric wheel 859 between the inner position and the outer position in the radius direction of the cylinder block 835 with a stroke corresponding to a distance twice the amount of eccentricity in the first valve holes 855. And, in the discharge zone of the hydraulic pump P, the first distribution valves 857 are moved to the inner position side, and the corresponding pump ports "a" are connected with the outer oil path 854 and disconnected from the inner oil path 853, thereby operation oil is pressure fed from cylinder holes 836 to the outer oil path 854 by pump plungers 837 in the discharge process. In the suction zone, first distribution valves 857 are moved to the outer position side, and the corresponding pump ports "a" are connected with the inner oil path 853 to the cylinder holes 836 by the pump plungers 837 in the suction process.

When the cylinder block 835 rotates, second distribution valves 858 are moved reciprocally by a second eccentric wheel 860 between the inner position and the outer position in the radius direction of the cylinder block 835 with a stroke corresponding to a distance twice the amount of eccentricity in the second valve holes 856. In the expansion zone of the hydraulic motor M, the second distribution valves 858 are moved reciprocally by the second eccentric wheel 860 between the inner position and the outer position in the radius direction of the cylinder block 835 with a stroke corresponding to a distance twice the amount of eccentricity in the second valve holes 856. In the expansion zone of the hydraulic motor M, second distribution valves 858 are moved to the inner position side, and the corresponding motor ports "b" are connected with the outer oil path 854 and disconnected from the inner oil path 853. Thereby high-pressure operation oil is supplied from the outer oil path 854 to cylinder holes 840 by the motor plungers 841 in the expansion process, and in the contracting zone, the second distribution valves 858 are moved to the said outer position side, and the corresponding motor ports "b" are connected with the inner oil path 853 and disconnected from the outer oil path 854. Thereby operation oil is discharged from cylinder holes 840 of the motor plungers 841 in the contraction process.

The pump plungers 837, while passing through the discharge zone, pressure feed operation oil from the cylinder holes 836 to the outer oil path 854, and while passing through the suction zone, absorb operation oil from the inner oil path 853 to the cylinder holes 836. The high-pressure operation oil which is supplied to the outer oil path 854, while it is supplied to the cylinder holes 840 of the motor plungers 841 which exist in the expansion zone of the hydraulic motor M, is discharged by motor plungers 841 which exist in the contraction zone from their cylinder holes 840 to the inner oil path 853.

Concurrently, the cylinder block 835 is rotated by the sum of reaction torque which the cylinder block 835 received from the pump swashplate 838 via the pump plungers 837 in the discharge process and reaction torque which the cylinder block 835 receives from the motor swashplate 842 via the motor plungers 841 in the expansion process. The rotation torque is transmitted from the output axis 818 through a pair of gears 863 and 864 to the idle shaft 819.

In this case, the speed change ratio of the output axis 818 to the input cylinder axis 831 is given by the following formula.

$$\text{speed change ratio} = \frac{1 + \text{capacity of hydraulic motor } M}{\text{capacity of hydraulic pump } P}$$

Therefore, by varying the capacity of the hydraulic motor M from zero to a certain value, it is possible to vary the speed change ratio from 1 to a necessary value. And yet, the capacity of the hydraulic motor M is governed by the stroke of the motor plungers 841. Therefore, by inclining the motor swashplate 842 from the perpendicular position to a certain inclined position by operating the motor swashplate holder 844, the speed change ratio can be adjusted from 1 to a certain value without steps.

The connection of the continuously variable transmission 814 and the engine 813 is performed by means of a clutch 865, which is provided between one end of the input cylindrical axis 832 and the crankshaft 817, so that connection and detachment are available.

This clutch 865 is given as a start clutch, and like a generator 828, it is positioned at one end of the engine 813 (front side of the body), and is placed coaxially in the line extended from the rotation axis line of an input cylindrical axis 832. It is attached via a ball bearing 866 to the transmission case $C_2$ so that it can rotate freely. The clutch comprises a driven gear 867 which is geared with a drive gear 886 which is attached to said crankshaft 817, a connection axis 868 which is spline fitted to the inner peripheral face at one end of the input cylindrical axis 832 and is rotated together with this input cylindrical axis 832, a clutch outer 869 which is attached to the drive gear 867, a clutch inner 870 which is adhered to the connection axis 868 and positioned inside the clutch outer 869 so that it can rotate relatively freely, plural clutch disks 871 which are connected alternately with these clutch outer 869 and clutch inner 870 and superposed in their rotational axis direction, and a pressure plate 872 which is attached to the clutch inner 870 so that the clutch disks 871 between the clutch inner 870 and the pressure plate 872 can slide freely in the direction of the rotational axis of the clutch inner 870.

The driven gear 867 of the boss portion 867a is formed in the cylinder form in which the connection axis 868 pierces. They can rotate relatively by means of a needle bearing 873 which is placed in the inside.

On the opposing side where the clutch disks 871 of the pressure plate 872 are positioned, there is provided an oil chamber 874 for generating hydraulic pressure for pressing the pressure plate 872 to the clutch disk 871. The adjustment of the hydraulic pressure in this oil chamber 874 is performed by a hydraulic pressure generation system which is operated by a clutch lever L which is provided adjacent to the handle 705 of the vehicle. Therefore, the rotation of the crankshaft 817, when clutch 865 is in the connected state, is transmitted through the driven gear 867, clutch outer 869, clutch disks 871, clutch inner 870 and connection axis 868 to the input cylindrical axis 832, and after speed changed at the continuously variable transmission 814, is transmitted via the output axis 818 and gear 863 and 864 to the idle shaft 819.

This idle shaft 819 is supported at its both ends in the longitudinal direction by ball bearings 875 and 876 by the transmission case $C_2$ so that it can rotate freely. At one end it is attached to a gear 877 in one with the idle shaft 819. The idle shaft 819 is connected via this gear 877 to the final shaft 878 in the subsequent step.

This final shaft 878 is supported by the transmission case $C_2$ via a pair of ball bearings 879 and 880 so that it can rotate freely. Between its one end and the gear 877 which is attached to the idle shaft 819 a neutral clutch 881 is provided. At the near middle part of its length direction is continuously provided a reverse mechanism 708.

The neutral clutch 881 comprises a sleeve 884 which is attached via a spline 883 to the final shaft 878, a driven gear 885 which is fitted to one end of this sleeve 884 so that it can rotate relatively and freely and normally engaged with the gear 877 of the idle shaft 819, and a slider 886 which is spline fitted to the driven gear 885 by the slide in the length direction of the sleeve 884 and connected with and detached from the driven gear 885 by the slide in the length direction of the sleeve 884. To the slider 886 is connected a shift lever 887 for controlling the position of connection and detachment so that it can rotate relatively and freely.

This neutral clutch 881, when the backward operation of the vehicle is performed, releases the connection of the final shaft 878 and the idle shaft 819 by moving the slider by means of the shift lever 887 to release the connection with the driven gear 885. Therefore, in the backward operation, the drive system ahead of the idle shaft 819 is detached from the final shaft 878.

The reverse mechanism 708 comprises a driven gear 888 which is attached in one to the near center of the final shaft 878, a select gear 890 which is spline fitted to an idle shaft 889, which is supported by the transmission case $C_2$ so that it can rotate freely, so that it can slide in the length direction of the idle shaft 889, an idle gear 893 which is normally maintained in the geared state with the drive gear of a starter motor 891 which is attached in one to the idle shaft 889 and placed adjacent to the idle shaft 889, and a cam mechanism 894 which performs the sliding movement of the select gear 890.

This cam mechanism 894 is interlocked with the shift lever 887 of the neutral clutch 881 for turning operation, and comprises an operation rod 895 in which a cam groove 895a in the spiral form is formed, a cam follower 896 slid onto the operation rod 50 that it can slide freely without relative rotation, and a pin 897 which is attached to the cam follower 896 and connected with the cam groove 895a so that it can slide freely, wherein the cam follower 896 is maintained rotation free against the selected gear 80 normally in a connected state in the sliding direction of the select gear 890. The starter motor 891 is connected via reduction gears 898 (898a through 898c) and a one-way clutch 899 to the crankshaft 817. The continuously variable transmission 814, idle shaft 819, generator 828, final shaft 878 and starter motor 891, as shown in FIG. 42, are provided so that they surround the crankshaft 817.

Therefore, according to the drive shaft 810 of the above-stated composition, since the continuously variable transmission 814 is designed so that the rotation axis direction and the transmission direction coincide, the connection of the engine 813 and the continuously variable transmission 814 can be performed by driven gear 826 and driven gear 867, which are near each other, by placing this continuously variable transmission parallel with the crankshaft 817, and thereby speed changing is possible, even when the engine 813 is placed along the length direction of the vehicle, without performing any change of the transmission path between the engine 813 and the continuously variable transmission 814.

Also, as the continuously variable transmission 814 is placed under the crankcase $C_1$, there is no projection of the continuously variable transmission in the rear of the engine 813, and a space is secured between the engine 813 and the rear wheel even when the engine is placed as above. Thereby not only is the setting of the wheel base improved; but it is also possible, since the continuously variable transmission 814 is tubular and small in diameter, to secure minimum ground height even with the amount of projection downwardly of the engine 813.

And yet, even when the present invention is applied to the engine 813 of the horizontal opposing type as above, projection of the cylinder block 813a to both sides of the crankshaft 817 and interference between the cylinder head 813c and continuously variable transmission 814 can be avoided. Therefore, by the multiple effect of these, the freedom of layout of the drive system 810 and the related devices can be improved.

Since the continuously variable transmission 814 is placed under the crankcase $C_1$ and the clutch 865 is placed in its front side, namely the clutch 865 is exposed in the running direction of the vehicle and the continuously variable transmission 814 is exposed at the lower part of the vehicle, both the clutch 865 and the continuously variable transmission 814 are directly exposed to running winds, and thereby sufficient cooling effect of both can be expected. In particular, in the case of the hydraulic continuously variable transmission, in which high pressure due to the compression of operation oil and consequent heat generation is seen, and in the clutch 865 heat generation during hard-clutching is seen, this kind of cooling effect is quite effective in improving the operation efficiency and the transmission efficiency.

Moreover, in the present embodiment, the composition of the contact portions of the plungers 837 and 841 with the swashplates 838 and 842 of the Continuously variable transmission 814 is designed so that the projected portions 838a and 842a formed on the swashplates 838 and 842 are fitted to the concave portions 837a and 841a formed on the projected ends of the plungers 837 and 841. Therefore, the amount of projection of the plungers 837 and 841 from the cylinder block 835 is reduced, and, by securing the strength of the swashplates 838 and 842, their thickness is reduced. Thereby, the swashplates 838 and 842 are brought closer to the cylinder block 835 and thus the dimension in the rotation axis direction of the continuously variable transmission 814 can be reduced. From this point as well the environs, the engine 813 can be made compact.

Shapes and dimensions of each of the component members shown in the embodiment are an example, and these shapes and dimensions can be changed variously based on the type of each vehicle to which the present invention is applied and on the design requirements. For example, in said embodiment, it is also possible to omit the neutral clutch 881. The backward operation may be performed by said clutch 865 under the condition that the crankshaft 817 and subsequent transmission members are disconnected.

Also, in the embodiment, the concave portions 837a and 841a are formed in the outer ends of plungers 837 and 841 to which projected portions 838a and 842a formed on swashplates 838 and 842 are fitted into contact for their positioning. However, if the permissible dimension in the direction is sufficient, it is also possible to arrange fitting and contact in the reverse composition from that of the embodiment.

A tenth preferred embodiment of this invention will be now described by referring to FIG. 43 to FIG. 46. In FIG. 43, a motorcycle 901 is an example of a motor vehicle to which this invention is applied and this motorcycle comprises a power unit 910 which comprises an engine 913 installed almost at midpoint of the motorcycle body, a continuously variable hydraulic transmission 914 (hereinafter called "continuously variable hydraulic transmission") installed below and monolithically with the engine 913, and a drive shaft 916 connecting the continuously variable transmission 914 to an axle of the motorcycle rear wheel. As shown in FIG. 45 to FIG. 46, the engine 913 is connected to a crankcase $C_1$ to which the crankshaft 917 is mounted in a manner assuring its free rotation, a pair of cylinder blocks 913a are installed separately at both sides of crankshaft 917 (only the cylinder block 913a at one side is shown in FIG. 45), each cylinder block 913a has three cylinders 913b thereby forming a horizontal opposed type six cylinder engine, a crankshaft 917 is installed in the longitudinal direction of the body, the continuously variable transmission 914 is located below the engine 913 as shown in FIG. 43 to FIG. 46, and the continuously variable transmission 914 is arranged as shown in FIG. 45 in such a manner that the shaft line of the output shaft 918 of the non-stage transmission becomes parallel to the shaft line of the crankshaft 917 and that a part of the output shaft 918 is overlapped with the crankshaft 917 in a direction perpendicular to the line of the crankshaft.

The engine 913 will be further described below in detail. As shown in FIG. 45, at one end (upper end portion in FIG. 45, which is located at the front portion of the motorcycle) of said crankshaft 917, a pair of drive pulleys 921 for turning a cam belt 920 is fixed to the crankshaft. A camshaft 922 is mounted in a manner permitting its free rotation inside the cylinder head 913c installed to each cylinder block 913a. The camshaft 922 is coupled with the crankshaft 917 when the cam belt 920 is turned on a driven pulley 923 attached to the one end of the camshaft 922. This permits the rotation of the camshaft 922 in synchronization with the crankshaft 917.

A piston 924 is located in a manner permitting its free sliding inside each cylinder formed in the cylinder block 913a, and these pistons 924 are connected to the crankshaft 917 through connecting rods 925.

Also, to the other end portion (lower end portion in Fig. 45, which is at the rear side of motorcycle) of the crankshaft 917, a drive gear 926 for output is fixed monolithically, and an oil pump 927 is connected to the end portion of the shaft for supplying lubricating oil to each part to be lubricated in the engine 913. A driven gear 929 for a generator 928 attached to the end face of the crankcase $C_1$ is interlocked with the drive gear 926 for rotating and driving the generator 928.

The continuously variable transmission 94 will be further described. This continuously variable transmission 914 comprises a cam plate type hydraulic pump P of constant capacity type and a cam plate type hydraulic motor M of variable capacity type. The hydraulic pump P comprises an input cylindrical shaft 931 supported in a manner permitting its free rotation through a ball bearing 930 by a transmission case $C_2$ installed to the crankcase $C_1$, a cylinder block 934 supported in a manner permitting its free relative rotation through a ball bearing 933 by the input cylindrical shaft 931, a number of pump plungers 936 slidably fitted to an odd number of cylinder holes 935 formed at certain intervals around and in parallel to the rotating shaft line of the cylinder block 934 at an end side of the cylinder block, and a pump cam plate 937, the front face of which is contacted to the external ends of these pump plungers 936.

The input cylindrical shaft 931 is divided into two portions in longitudinal direction, and the two portions are coupled by a bolt B. To the periphery of an almost intermediate portion of the input cylindrical shaft, a driven gear 932 interlocking with a drive gear 926 installed to the crankshaft 917 is formed as one body, by which the input cylindrical shaft 931 is driven and rotated by the crankshaft 917.

The rear face of the pump cam plate 937 is born by the input cylindrical shaft 931 through an angular contact bearing 938, and the pump cam plate is kept tilting at a constant angle with the shaft line of cylindrical block 934 about a virtual trunnion shaft line $O_1$ as center which perpendicularly intersects the shaft line of the cylinder block 934. The angular contact bearing 938 can give the aligning action to the pump cam plate in cooperation with the input cylindrical shaft 931.

The pump cam plate 937 gives a reciprocating action to the pump plungers 936 thereby repeating suction and discharge processes when the input cylindrical shaft 931 rotates.

On the other hand, the hydraulic motor M comprises a cylinder block 934 which is used commonly with the hydraulic pump P, a number of motor plungers 940 slidably fitted to an odd number of cylinder holes 939 formed at certain intervals around and in parallel to the rotating shaft line of the cylinder block at the other end side of cylinder block, a motor cam plate 941 contacting the external end face of these motor plungers 940, a motor cam plate holder 943 for bearing the rear face of the motor cam plate 941 through an angular contact bearing 942, and a motor cam plate anchor 944 for bearing the rear face of the motor cam plate holder 943. Also, the contact face between the motor cam plate holder 943 and motor cam plate anchor 944 is formed as a spherical surface with its center located at the point of intersection between the shaft line of the cylinder block 934 and the trunnion shaft line $O_2$.

In the hydraulic motor M, the angular contact bearing 942 can give an aligning action to the motor cam plate 941 in cooperation with the motor cam pate holder 943. The motor cam plate anchor 944 is fixed at its other end portion to the transmission case $C_2$ with a bolt B and bears, at an end portion, the cylinder block 934 in a manner permitting free rotation through a ball bearing 945. As in the case of the input cylindrical shaft 931, this motor cam plate anchor 944 is divided into two portions in longitudinal direction and these two portions are coupled together by a bolt B.

The motor cam plate 941 can be tilted between the upright position perpendicular to the shaft line of the cylinder block 934 and the maximum tilt position tilted with a certain angle by means of the rotation of motor cam plate holder 943. Under this tilting condition, a reciprocating motion is given to the motor plungers 940 by the rotation of the cylinder block 934, thereby permitting the repetitions of expansion and contraction strokes. The angle of tilt of said motor cam plate holder 943 can be automatically adjusted in response to such as the number of revolutions of engine 913, vehicle speed or the opening of throttle by a tilting mechanism (not shown in drawings) installed outside of the transmission case $C_2$. Details of the tilting mechanism will be omitted here.

Each contact portion between the plungers 936 and 940 and cam plates 937 and 941 is arranged by fitting a projection made on each cam plate 937 and 942 to a concave portion formed on the projected end portion of each plunger 936 and 940. This configuration is provided for reducing the clearance between each cam plate 937 and 941 and the cylinder block 934 and thereby reducing the dimensions of the continuously variable transmission 914 in the direction of the rotating shaft line by reducing the projection from the cylinder block 934 of each plunger 936 and 940 and also by reducing the thickness of the cam plate 937 and 941 after increasing the strength of the cam plate. If there are no space restrictions, it is of course possible to provide a configuration opposite to the above relation.

The output shaft 918 is located through the central portion of the cylinder block 934, the output shaft 918 is arranged in parallel to the crankshaft 917 of the engine 913, and the relative rotation of the output shaft 918 and cylinder block 934 around the output shaft 918 is restricted by splines 946 and 947. Also, one end of said output shaft 918 is located through the pump cam plate 937 and input cylindrical shaft 931 and is supported in a manner permitting free rotation by the input cylindrical shaft 931 through a ball bearing 948.

A drive gear 939 is attached monolithically to the portion projected outwardly from the input cylindrical shaft 931 of the output shaft 918 and is interlocked with the driven gear 952 of a counter shaft 919 attached in a manner permitting free rotation relative to the transmission case C$_2$ through a pair of ball bearings 950 and 951.

On the other hand, the outer end portion of the output shaft is extended through the motor cam plate 941, the motor cam plate holder 943 and the motor cam plate anchor 944 and is supported in a manner permitting free relative rotation by the motor cam plate anchor 944 via a ball bearing 953.

The cylinder block 934 between the group of cylinder holes 935 at the pump side and the group of cylinder holes 939 at the motor side has a ring-shaped inner-side oil way 954 and an outer-side oil way 955 arranged concentrically around the output shaft 918 as center. The cylinder block 944 also includes first valve holes 956 and second valve holes 957, the number of which is respectively the same as that of the cylinder holes 935 and 939, passing radially through the ringshaped bulkhead between both the oil ways 954 and 955 and through the peripheral wall of outer-side oil way 955, interconnecting oil ways connecting the valve holes 956 and 957 to the outer-side oil way 955, a number of pump ports "a" for mutually connecting the cylinder holes 935 to the adjacent first valve holes 956, and a number of motor ports "b" connecting adjacent cylinder holes 939 and second valve holes 957 to each other.

The inner-side oil way 954 is formed as a ring-shaped groove on an inner peripheral surface of cylinder block 934, and its open surface is closed by the outer peripheral surface of the output shaft 918.

A spool type first distribution valve 958 is fitted slidably in the first valve hole 956, and also a spool type second distribution valve 959 is fitted in the second valve hole 957 in the same manner. To the outer end of the first distribution valve 958, a first eccentric ring 960 surrounding it is attached. To the outer end of the second distribution valve 959, a second eccentric ring 961 surrounding it is attached.

The first eccentric ring 960 is attached to the input cylindrical shaft 931 through a ball bearing 962 and is positioned at the location having a predetermined eccentricity from the center of the output cylindrical shaft 918 along the virtual trunnion shaft line O$_1$. The second eccentric ring 961 is attached to the motor cam plate anchor 944 via a ball bearing 963 and is kept at a predetermined eccentric position.

According to the continuously variable transmission 914 having this configuration, if relative rotation occurs between the input cylindrical shaft 931 and the cylinder block 934, then each first distribution valve 958 is reciprocated with the stroke equal to two times the eccentricity by the first eccentric ring 960 at the first valve hole 956 between the radial inward position and outward position of the cylinder block 934. In the discharge region of the hydraulic pump P, the first distribution valve 958 is moved to the inward position side, the corresponding pump port "a" is interconnected to the outer-side oil way 955 and disconnected from inner-side oil way 954, and hydraulic fluid is forcibly fed from the cylinder hole 935 to the outer-side oil way 955 by the pump plunger 936 during the discharge stroke. In the suction range, the first distribution valve 958 is moved to the outward position side, corresponding pump port "a" is interconnected to the inner-side oil way 954 and disconnected from outer-side oil way 955, and hydraulic fluid is sucked from the inner-side oil way 954 to the cylinder hole 935 by the pump plunger 936 during the suction stroke.

When the cylinder block 934 rotates, each second distribution valve 959 is reciprocated with the stroke equal to two times the egocentricity by the second eccentric ring 961 at the second valve hole 957 between the radial inward position and outward position of the cylinder block 934. In the expansion region of the hydraulic motor M, the second distribution valve 959 is moved to the inward position side, corresponding motor port "b" is interconnected to the outer-side oil way 955 and disconnected from inner-side oil way 954, and high-pressure hydraulic oil is supplied from the outer-side oil way 955 to cylinder hole 939 in expansion stroke. In the contraction region, the second distribution valve 959 is moved to the outward position side, corresponding motor port "b" is interconnected to inner-side oil way 954 and disconnected from the outer-side oil way 955, and hydraulic fluid is discharged from the cylinder hole 939 of motor plunger 940 in contraction stroke to the inner-side oil way 954.

The pump plunger 936 forcibly feeds hydraulic fluid from cylinder hole 935 to outer-side oil way 955 during the passage through the discharge region and hydraulic fluid from the inner-side oil way 954 to cylinder hole 935 during the passage through suction region. Also, high-pressure hydraulic fluid fed to the outer-side oil way 955 is supplied to the cylinder hole 939 of the motor plunger 940 located in the expansion region of the hydraulic motor M and hydraulic fluid is discharged from the cylinder hole 939 to inner-side oil way 954 by the motor plunger 940 located in the contraction region.

During the operation stated above, the cylinder block 934 is rotated by the sum of the reaction torque given from the pump cam plate 937 to the cylinder block 934 through the pump plunger 936 during discharge stroke and the reaction torque given to the cylinder block 934 from the motor cam plate 941 through the motor plunger 940 during expansion stroke. Its rotating torque is transmitted from the output shaft 918 to the counter shaft 919 through a pair of intermeshed gears 949 and 952.

In this case, the change gear ratio of the output shaft 918 to the input cylindrical shaft 931 is given by the following equation:

$$\text{Change gear ration} = 1 + \frac{\text{Capacity of hydraulic motor } M}{\text{Capacity of hydraulic pump } P}$$

Therefore, if the capacity of the hydraulic motor M is changed from zero to a certain value, then the gear change ratio can be changed from 1 to a certain required value. Moreover, since the capacity of the hydraulic motor M is determined by the stroke of the motor plunger 936, the gear change ratio can be continuously adjusted from 1 to a certain value by tilting the motor cam plate 941 from the upright position to a certain tilting position by means of the operation of the motor cam plate holder 943.

To the other end portion of the counter shaft 919, a gear 964 is attached as one body, and the counter shaft is connected to a final shaft 965 in post stage through the gear 964.

This final shaft 965 is supported in a manner permitting free rotation by the transmission case C$_2$ through a pair of ball bearings 966 and 967. To the one end portion of the final shaft, a gear 968 to be intermeshed with the gear 964 of the counter shaft 919 is attached in a manner permitting free relative rotation. Also, near the gear 968, a ratchet wheel 969 is attached by a spline fitting in such a manner that its relative rotation is restricted but it can be slid in the shaft line direction.

The ratchet wheel 969 is pushed toward the gear 968 by a spring 970 and is attached to the gear 968 in rotating direction. When the transmission torque between the two parts 968 and 969 exceeds a predetermined value, the ratchet wheel 969 is moved against the elastic force of the spring 970 by the reaction from a slope provided at the attaching portion to the gear 968, and then the connection between both the parts 968 and 969 is temporarily released. That is, it forms a kind of torque limiter.

Near the final shaft 965, a starter motor 971 is installed and fixed to the other end portion of the crankcase $C_1$ away from the generator 928. This starter motor 971 is connected to the crankshaft 917 through the grouped reduction gears 972 (972a to 972c) and a one way clutch 973 provided at the other end portion of the crankshaft 917.

Moreover, in this preferred embodiment, a reverse mechanism 974 is provided between the starter motor 971 and the final shaft 965.

This reverse mechanism 974 comprises a driven gear 975 attached monolithically to an almost intermediate portion of the final shaft 965, a select gear 977 which is spline-fitted to an idle shaft 976 supported by the crankcase $C_1$ in a manner permitting free rotation and which is made freely slidable in the length direction of the idle shaft 976, an idle gear 979 retained always in an intermeshed state with a drive gear 978 attached monolithically to the starter motor 971, and a cam mechanism 980 which slides the select gear 977.

The cam mechanism 980 comprises an operating rod 981 on which a helical cam groove 981 is formed, a tubular cam follower 982 which is fitted to the outer face of the operating rod 981 in such a manner that the cam follower is freely slidable in the direction of the length of the rod and the rotation around the shaft line of the cam follower is restricted, and a pin 983 which is installed as one body to the cam follower 982 and attached to the cam groove 981a in a manner permitting its free sliding. The cam follower 982 rotates freely relative to the select gear 977 and is kept always in an attached state in the sliding direction of the selected gear 977.

To the operating rod 981, an operating lever 984 for rotating the operating rod 981 and for sliding the select gear 977 is installed. This operating lever 984 slides the cam follower 982 in the shaft line direction of the idle shaft 976 by rotating the operating rod 981 in order to interlock the elect gear 977 with the driven gear 975 or to release the interlock.

When the starer motor 971 is started while the select gear 977 is intermeshed with the driven gear 975, the final shaft 965 and the drive shaft 916 connected to the final shaft 965 are rotated in reverse direction, and the backing operation of the motor vehicle is performed. At this time, the connected condition between the final shaft 965 and the crankshaft 917 must be released. As one of the methods of this release, the power transmission between the hydraulic pump P and the hydraulic motor M can be interrupted by changing the eccentricity of the distributing valve 958 (959) of continuously variable transmission 914, by opening the hydraulic close circuit formed in the cylinder block 934 to the outside, and by leaking the hydraulic fluid from hydraulic circuit to the outside, or by circulating hydraulic fluid within hydraulic pump P or hydraulic motor M.

As another method, a separate clutch may be installed in the middle of power transmission route from the non-state transmission 914 to final shaft 965.

As shown in FIG. 46, the continuously variable transmission 914, the counter shaft 919, the generator 928, the final shaft 965 and the starter motor 971 are so arranged that they surround the crankshaft 917. According to the power unit 910 having this configuration the direction of the rotating shaft line of the continuously variable transmission 914 and the direction of power transmission of the continuously variable transmission are the same. Thus, by installing the continuously variable transmission 914 in parallel to the crankshaft 917, the connection between the engine 913 and continuously variable transmission 914 can be made by using the drive gear 926 and the driven gear 932 located closely to each other. Because of this, it is not necessary to change the power transmission route between the engine 913 and the continuously variable transmission 914 even though the crankshaft 917 is installed in the longitudinal direction of motor vehicle.

Also, since the continuously variable transmission 914 is overlapped with the crankshaft 917 of the engine 913 in the direction perpendicular to the shaft line of the crankshaft 917, the amount of projection of the continuously variable transmission 914 toward the rear of the engine 913 can be reduced and the increase in the distance between the engine 913 and rear wheel 907 can be restricted.

Even though the continuously variable transmission 914 is located below the crankcase $C_1$ of the engine 913 as indicated in this preferred embodiment, the amount of projection of the continuously variable transmission from the bottom of the engine 913 can be restricted and minimum ground clearance can be obtained more easily because the continuously variable transmission 914 has a pillar shape and a small diameter.

In addition, even if this invention is applied to an engine 913 of the horizontally opposed type as described before, there will be no interference between the continuously variable transmission 914 and the cylinder head 913c or the cylinder block 913a projected out at both the sides of the crankshaft 917. Therefore, by the above, a higher degree of freedom can be obtained in the layout of the power unit 910 and its surrounding equipment.

On the other hand, since the continuously variable transmission 914 is installed below the crankcase $C_1$, wind created by a running vehicle directly hits the continuously variable transmission 914, and thus the affect of cooling the continuously variable transmission 914 by wind can be expected. This kind of cooling effect is extremely effective for enhancing the operating efficiency of the hydrostatic continuously variable transmission 914 because its hydrostatic fluid has a high pressure and thus it is heated.

Shape, dimension and layout of the components described in the preferred embodiments should be considered as examples and can be changed depending on the kind and design requirements of each motor vehicle to which this invention is applied.

What is claimed is:

1. A power train for vehicles, the vehicles having engines, the power train comprising, a swashplate type continuously variable transmission having:
   (a) a transmission cylinder having an axis and supported rotatable about the axis, a plurality of pump plunger holes and motor plunger holes formed therein parallel to the axis and annularly about the axis, the transmission cylinder being connected to a crankshaft of the engine to be rotated thereby;

(b) a plurality of pump plungers having plunger heads and disposed slidable in respect pump plunger holes so that the plunger heads protrude out of the transmission cylinder, each of the heads having a concavity formed therein;

(c) a pump swashplate having an axis and a plurality of projections formed on a surface thereof, the pump swashplate being disposed so that the axis thereof is inclined to the axis of the transmission cylinder and the pump swashplate is rotatable about the axis thereof, the projections of the pump swashplate being received by the respective concavity in the head of the pump plungers, whereby the pump plungers pump out a fluid by a reciprocal movement thereof according to rotational movement of the transmission cylinder;

(d) a plurality of motor plungers having plunger heads and disposed slidable in respective motor plunger holes so that the heads protrude out of the transmission cylinder, each of the heads having a concavity formed therein;

(e) motor swashplate having an axis and a plurality of projections formed on a surface thereof, the projections of the motor swashplate being received by the respective concavity in the head of the motor plungers, the motor swashplate being disposed so that the angle formed between the axis thereof and the axis of the transmission cylinder is changeable and the motor swashplate is rotatable about the axis thereof, whereby the ratio of the rotational speed of the transmission cylinder and the motor swashplate being variable in accordance with the angle of the swashplate to the axis of the transmission cylinder.

2. A power train of vehicles according to claim 1 wherein the driving force is transmitted to the transmission at a side thereof and the driving force is transmitted from the transmission at the same side thereof.

3. A power train of vehicles according to claim 1 wherein the transmission cylinder and the crankshaft are so disposed that their axes are parallel to each other.

4. A power train of vehicles according to claim 3 wherein the transmission cylinder and the crankshaft are so disposed that their axes are parallel to a longitudinal direction of the vehicle.

5. A power train of vehicles according to claim 4 wherein the engine and the transmission are enclosed in a single unit.

6. A power train of vehicles according to claim 5 wherein the engine and the transmission are supported so as to be pivotable against the vehicle.

7. A power train of vehicles according to claim 1 wherein the engine nd the transmission are so disposed that their axes are parallel to an axis of a driving wheel of the vehicle.

8. A power train of vehicles according to claim 2 wherein the engine and the transmission are so disposed that their axes are parallel to an axis of a driving wheel of the vehicle.

9. A power train of vehicles according to claim 1 wherein the transmission is disposed at a higher level than a crankcase of the engine.

10. a power train of vehicles according to claim 7 wherein the transmission and the engine are so disposed that the axis of the transmission cylinder is located at a higher level that the crankshaft.

11. A power train of vehicles according to claim 10 wherein the transmission and the engine are enclosed in a single unit.

12. A power train of vehicles according to claim 1 wherein the transmission and the engine are so disposed that the axis of the transmission cylinder is perpendicular to the crankshaft.

13. A power train of vehicles according to claim 12 wherein the crankshaft is disposed horizontal and perpendicular to a longitudinal direction of the vehicle, and the axis of the transmission cylinder is approximately parallel to the longitudinal axis of the vehicle.

14. A power train of vehicles according to claim 1 wherein the crankshaft of the engine is disposed in a longitudinal direction of the vehicle and the transmission is disposed so that the transmission cylinder is collinear with the crankshaft.

15. A power rain of vehicles according to claim 14 wherein the transmission cylinder is connected directly to the crankshaft.

16. A power train of vehicles according to claim 1 wherein an enclosure of the engine and an enclosure of the transmission are of separate constructions and connected to each other.

17. A power train of vehicles according to claim 15 wherein an enclosure of the engine and an enclosure of the transmission are of separate constructions and connected to each other so that the transmission cylinder is connected with the crankshaft therethrough.

18. A power train of vehicles according to claim 1 wherein the crankshaft is disposed in a longitudinal direction of the vehicle and the engine comprises a plurality of pistons located on both sides of the crankshaft, and the transmission is disposed so that the transmission cylinder is parallel to the crankshaft.

19. A power train of vehicles according to claim 18 wherein the transmission cylinder is disposed at a lower level than the crankshaft.

20. A power train of vehicles according to claim 1 which further comprises a clutch disposed between the engine and the transmission.

21. A power rain of vehicles according to claim 19 which further comprises a clutch located at a front position of the transmission.

22. A power train of vehicles according to claim 3 wherein the crankshaft and the transmission cylinders are disposed in a longitudinal direction of the vehicle, and a front end of the transmission is disposed between front and rear ends of the crankshaft.

23. A power train of vehicles according to claim 19 wherein the crankshaft and the transmission cylinders are disposed in a longitudinal direction of the vehicle, and a front end of the transmission is disposed between front and rear ends of the crankshaft.

24. A swashplate type hydraulic pressure device comprising:

a cylinder having an axis;

a number of plungers axially slidably disposed in a number of cylinder bores which are arranged in said cylinder annularly around the axis thereof, each of the plungers having a spherical concave portion formed at a tip end thereof;

a swashplate holder disposed oppositely to the tip ends of said plunges; and a swashplate rotatably supported on said swashplate holder and having a number of spherical protruding portions formed on a surface thereof to be abutted by spherical concave portions of the plungers; wherein said spherical concave portions of the plungers are each formed to have a radius of curvature larger than that of the associated spherical protruding portions of the swashplate and a center point of engagement between the spherical concave portions of the plungers and the associated spherical protruding portions of the swashplate is displaceable in an inclined state of the swashplate, in response to sliding motion of the plunger in said cylinder bore, between a radially outer side position at which said center point of engagement is located radially outer than an axis of the plunger with respect to the cylinder axis and a radially inner side position at which said center point is located radially inner than said axis of the plunger with respect to the cylinder axis; and wherein radial forces acting on said swashplate at respective center points of engagement between the spherical concave portions of the plungers and the spherical protruding portions of swashplate are directed such that the radial forces appearing in the spherical protruding portions located on a substantially same diametrical line on the swashplate work to offset each other regardless of the angle of inclination of the swashplate so as to center said swashplate.

25. A device according to claim 24 wherein when said plunger is at a limit point of sliding stroke, said center point of engagement can assume said radially inner side position whereas when said plunger is at an intermediate point of sliding stroke, said center point of engagement can assume said radially outer side position.

26. A device according to claim 24 wherein a distance between a center of the spherical protruding portion and an axis of said swashplate is set larger than that between the axis of the plunger and the axis of the cylinder.

27. A device according to claim 24 wherein said cylinder has a side face, which is opposed to said swashplate, formed inclined with respect to the axis of the cylinder so as to be tapered toward the swashplate.

28. A device according to claim 27 wherein said cylinder bores are opened at said inclined side face of the cylinder.

29. A swashplate type hydraulic pressure device comprising:

a cylinder having an axis;

a number of plungers axially slidably disposed in a number of cylinder bores which are arranged in said cylinder annularly around the axis thereof, each of the plungers having a spherical concave portion formed at a tip end thereof;

a swashplate holder disposed oppositely to the tip ends of said plungers; and a swashplate rotatably supported on said swashplate holder and having a number of spherical protruding portions formed on a surface thereof to be abutted by spherical concave portions of the plungers;

wherein said spherical concave portions are each formed to have a radius of curvature larger than that of the associated spherical protruding portions of the swashplate and a distance between a center of the spherical protruding portion and an axis of the swashplate is set larger than that between an axis of the associated plunger and the axis of said cylinder.

30. A swashplate type hydraulic pressure device comprising:

a cylinder having an axis;

a number of plungers axially slidably disposed in a number of cylinder bores which are arranged in said cylinder annularly round the axis thereof, each of the plungers having a spherical concave portion formed at a tip end thereof;

a swashplate holder disposed oppositely to the tip ends of said plungers; and a swashplate rotatably supported on said swashplate holder and having a number of spherical protruding portions formed on a surface thereof to be abutted by spherical concave portions of the plungers;

wherein said spherical concave portions of plungers are each formed to have a radius of curvature larger than that of the associated spherical protruding portions of the swashplate and wherein a center point of engagement between the spherical concave portions of plungers and the associated spherical protruding portions of the swashplate is located radially outwardly of an axis of said plunger when said spherical protruding portions assume a position on a plane perpendicular to the axis of the cylinder.

* * * * *

UNITED STATES PATENT AND TRADEMARK OFFICE
CERTIFICATE OF CORRECTION

PATENT NO. : 5,085,053
DATED : February 4, 1992
INVENTOR(S) : TSUTOMU HAYASHI et al.

It is certified that error appears in the above-identified patent and that said Letters Patent is hereby corrected as shown below:

In claim 1 (col. 69, l. 5), delete "respect" and insert therefor -- respective --.

In claim 1 (col. 69, l. 25), after "(e)" insert -- a --.

In claim 15 (col. 70, l. 20), delete "rain" and insert therefor -- train --.

In claim 21 (col. 70, l. 44), delete "rain_ and insert therefor -- train --.

In claim 24 (col. 70, l. 66), delete "plunges" and insert therefor -- plungers --.

In claim 30 (col. 72, l. 27), delete "round" and insert therefor -- around --.

Signed and Sealed this

Thirteenth Day of December, 1994

*Attest:*

BRUCE LEHMAN

*Attesting Officer*  *Commissioner of Patents and Trademarks*